US012720227B2

(12) United States Patent
Matsuura

(10) Patent No.: US 12,720,227 B2
(45) Date of Patent: Aug. 25, 2026

(54) IMAGING DEVICE AND PHOTODETECTION DEVICE

(71) Applicant: Sony Semiconductor Solutions Corporation, Kanagawa (JP)

(72) Inventor: Tomohiro Matsuura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 44 days.

(21) Appl. No.: 18/869,167

(22) PCT Filed: May 15, 2023

(86) PCT No.: PCT/JP2023/018082
§ 371 (c)(1),
(2) Date: Nov. 25, 2024

(87) PCT Pub. No.: WO2024/014107
PCT Pub. Date: Jan. 18, 2024

(65) Prior Publication Data
US 2025/0350862 A1 Nov. 13, 2025

(30) Foreign Application Priority Data
Jul. 11, 2022 (JP) ................................ 2022-111406

(51) Int. Cl.
*H04N 25/673* (2023.01)

(52) U.S. Cl.
CPC ................................ *H04N 25/673* (2023.01)

(58) Field of Classification Search
CPC .. H04N 25/673; H04N 25/616; H04N 25/617; H04N 25/618; H04N 25/671;
(Continued)

(56) References Cited

U.S. PATENT DOCUMENTS

2019/0068902 A1* 2/2019 Nishino .................. G05F 3/262
2022/0174230 A1* 6/2022 Kim ..................... H04N 25/616
2022/0385846 A1* 12/2022 Higuchi .................. H02M 3/07

FOREIGN PATENT DOCUMENTS

JP H05347519 A 12/1993
JP 2020025249 A 2/2020
(Continued)

OTHER PUBLICATIONS

International Search Report (PCT/ISA/210), International Application No. PCT/JP2023/018082, dated Aug. 1, 2023.

*Primary Examiner* — Xi Wang
(74) *Attorney, Agent, or Firm* — Michael Best & Friedrich LLP

(57) ABSTRACT

In one example, an imaging device includes a light-receiving pixel, a first coupling terminal, a first voltage generation circuit, a drive circuit, a reference signal generation circuit, a noise correction circuit, a comparison circuit, and a processing circuit. The light-receiving pixel generates a pixel signal. The drive circuit is configured to drive the light-receiving pixel on the basis of a voltage from the first voltage generation circuit at the first coupling terminal. The reference signal generation circuit generates a reference signal having a ramp waveform. The noise correction circuit generates a noise correction signal corresponding to the voltage at the first coupling terminal, and superimposes the noise correction signal on the reference signal. The comparison circuit compares the pixel signal and the reference signal with the superimposed noise correction signal. The processing circuit calculates a pixel value based on a result of the comparison.

18 Claims, 30 Drawing Sheets

(58) Field of Classification Search
CPC ........ H04N 25/75; H04N 25/76; H04N 25/77; H04N 25/78; H04N 25/60
See application file for complete search history.

(56) References Cited

FOREIGN PATENT DOCUMENTS

| | | | |
|---|---|---|---|
| JP | 2021093697 | A | 6/2021 |
| WO | 2017159394 | A1 | 9/2017 |
| WO | 2020054629 | A1 | 3/2020 |

* cited by examiner

1
TVDDH
VDDH
12
DRIVING SECTION
11
P
20
DTO
17
SIGNAL PROCESSOR
DT
18
READOUT SECTION
IMAGING CONTROLLER
16
REFERENCE SIGNAL GENERATOR
RAMP
15
NOISE CORRECTION SECTION
14
CHARGE PUMP
VRL
TVRL
Cext1

[ FIG. 2 ]
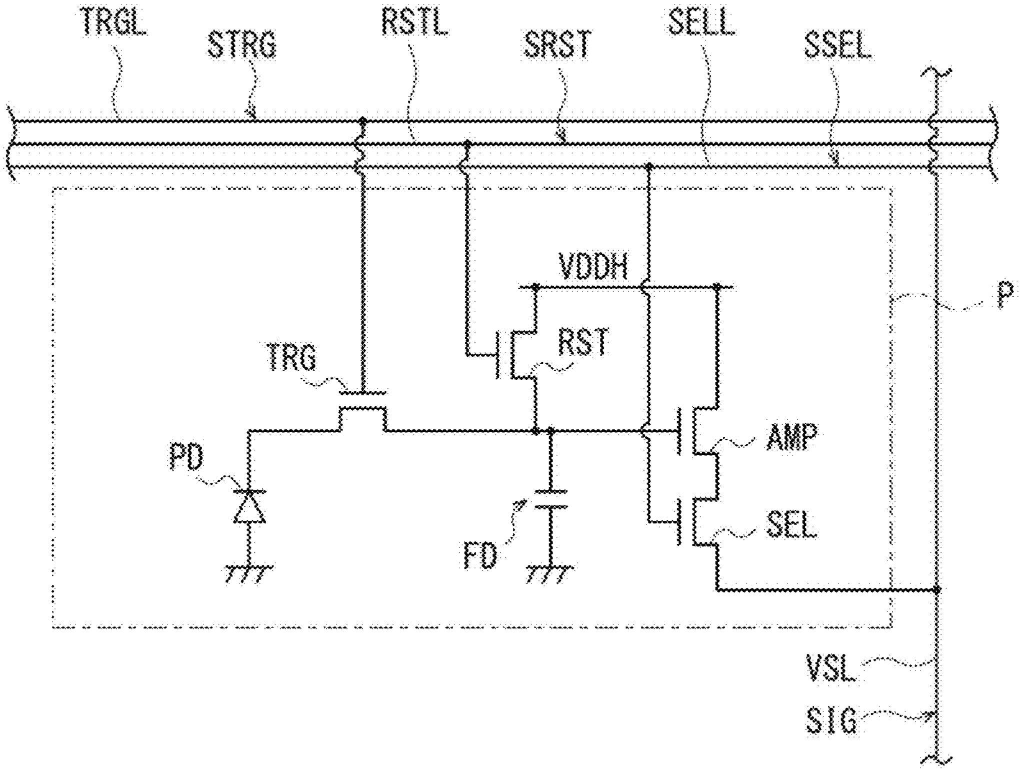
[ FIG. 3 ]
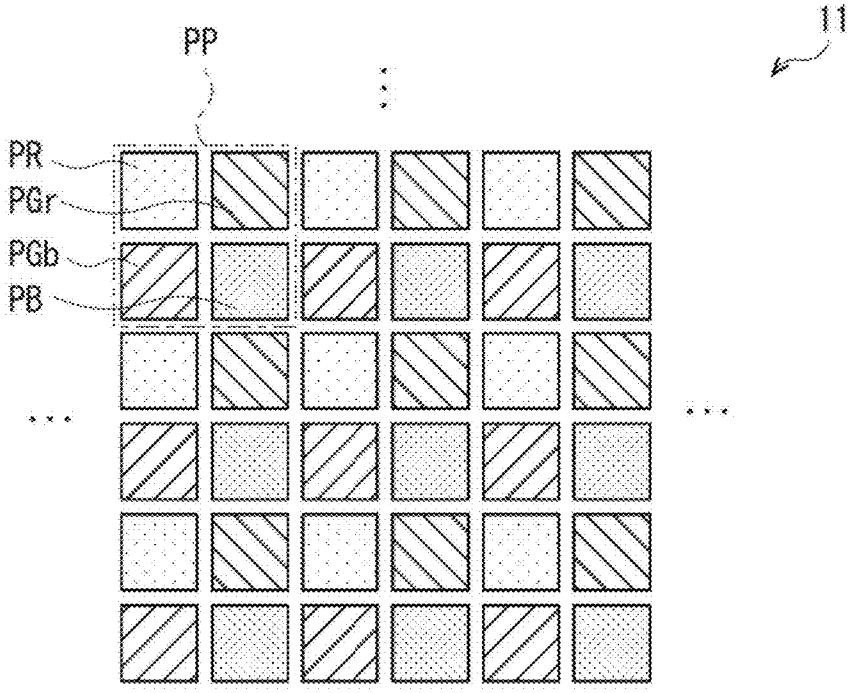

1
20
SIG
24
22
23
VSL
P
21
RAMP
AMP
SEL
16
62
SELL
RST
RSTL
TRGL
TRG
PD
FD
VDD
61
CONTROL CIRCUIT
63
12
40
50
53
15
43
STRG
SRST
SSEL
32
42
52
41
HPF
51
HPF
31
SIGNAL GENERATION CIRCUIT
14
CHARGE PUMP
VDDH
VRL
TVDDH
TVRL
Cext1

【FIG. 7A】
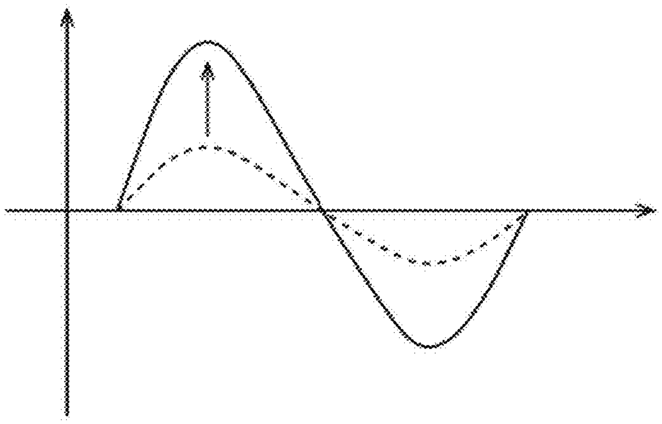
【FIG. 7B】
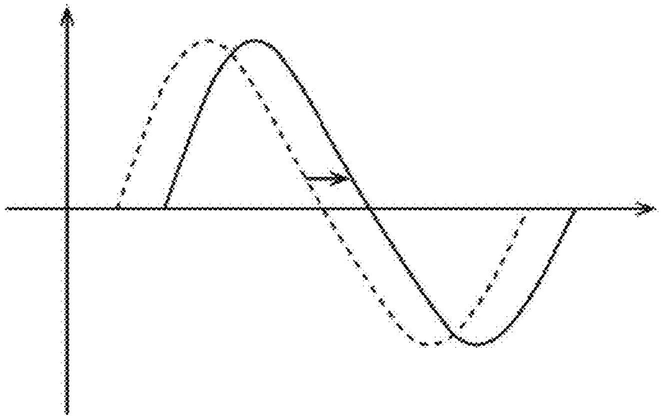
【FIG. 7C】
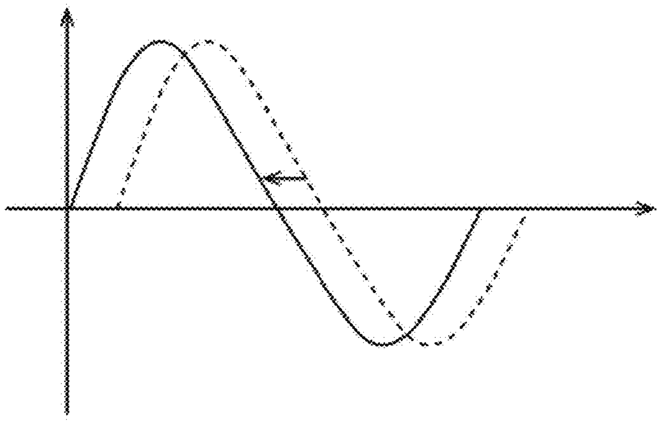

[ FIG. 8 ]
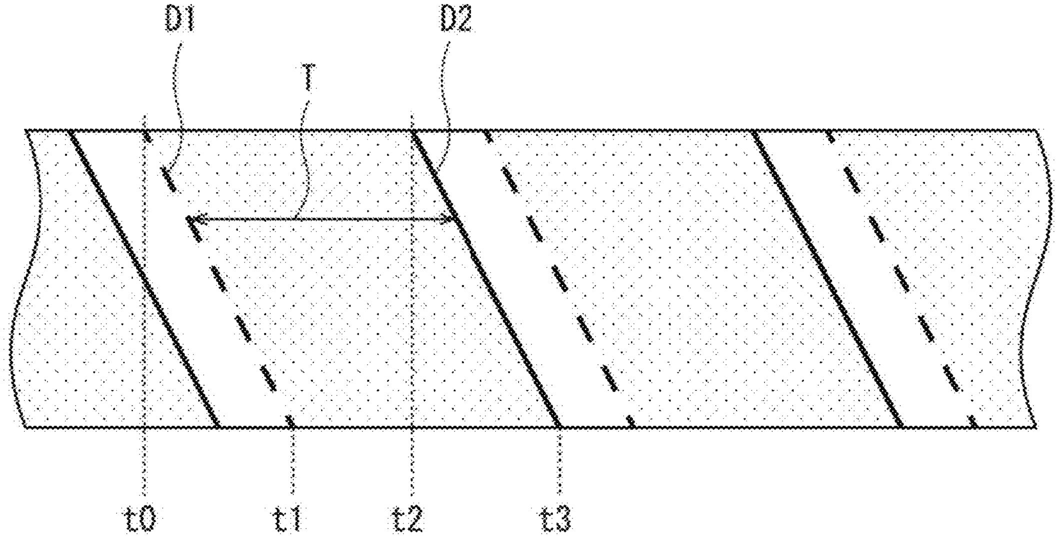

1
TVDDH
VDDH
TVRL
VRL
Cext1
14
CHARGE PUMP
12
31
SIGNAL GENERATION CIRCUIT
32
STRG
SRST
SSEL
TRGL
RSTL
SELL
P
TRG
PD
RST
FD
AMP
SEL
VSL
VDD
15
40
41
HPF
42
43
50
51
HPF
52
53
16
61
CONTROL CIRCUIT
62
63
20
21
22
23
24
SIG
RAMP

[ FIG. 11 ]
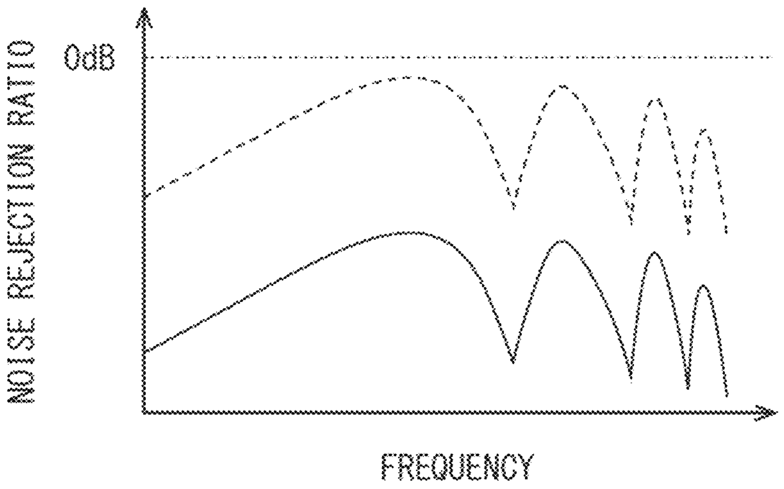

1
TVDDH
VDDH
31
SIGNAL GENERATION CIRCUIT
32
12
TRGL
RSTL
SELL
STRG
SRST
SSEL
TRG
RST
P
AMP
PD
FD
SEL
VSL
TVRL
VRL
Cext1
14
CHARGE PUMP
15
41
HPF
42
43
40
50
51
HPF
52
53
VDD
16
61
CONTROL CIRCUIT
62
63
20
SIG
21
22
24
RAMP
23

2
TVDDH
VDDH
74
BIAS CIRCUIT
TVRH
VRH
14
CHARGE PUMP
Cext2
TVRL
VRL
Cext1
72
DRIVING SECTION
71
P
20
READOUT SECTION
77
SIGNAL PROCESSOR
DT0
DT
75
NOISE CORRECTION SECTION
RAMP
16
REFERENCE SIGNAL GENERATOR
78
IMAGING CONTROLLER

2
20
SIG
VSL
RAMP
TGLL, FDGL, RSTL, FCGL, TSGL, SELL
P
16
CONTROL CIRCUIT
VDD
FCVDD
72
75
40
90
HPF
SIGNAL GENERATION CIRCUIT
BIAS CIRCUIT
CHARGE PUMP
VDDH
VRH
VRL
PVDDH
TVRH
TVRL
Cext1
Cext2

(A) HORIZONTAL SYNCHRONIZATION SIGNAL XHS
(B) CONTROL SIGNAL SSEL
(C) CONTROL SIGNAL SRST
(D) CONTROL SIGNAL SFDG
(E) CONTROL SIGNAL STGL
(F) CONTROL SIGNAL SFCG
(G) CONTROL SIGNAL STGS
(H) REFERENCE SIGNAL RAMP
(I) PIXEL SIGNAL SIG
(J) COUNTER 25
V1
SIG
RAMP
VP5
VP6
VP7
VP8
CODE5
CODE6
CODE7
CODE8
T5
T6
T7
T8
t155 t157 t163 t165 t173 t175 t185 t187 t192 t193
t151 t153 t156 t161 t162 t164 t171 t172 t174 t181 t186 t191
t152 t154 t182 t184
t183

[ FIG. 19A ]
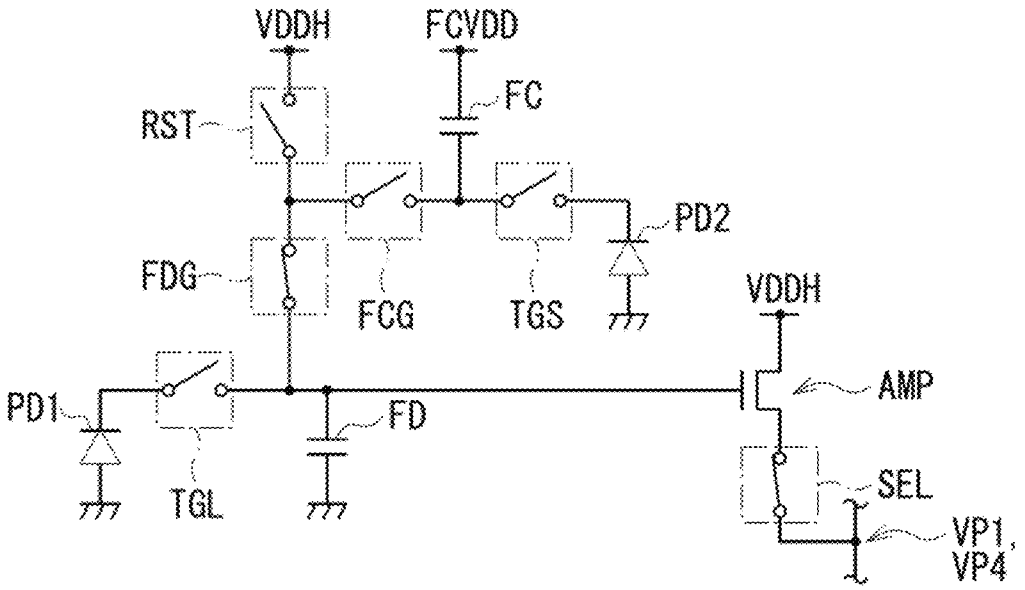
[ FIG. 19B ]
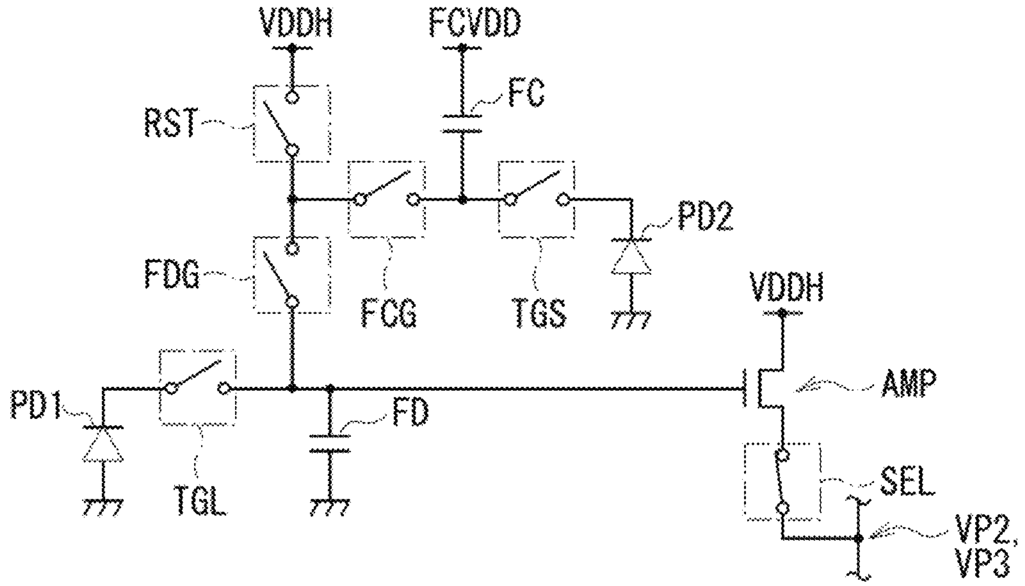

[ FIG. 19C ]
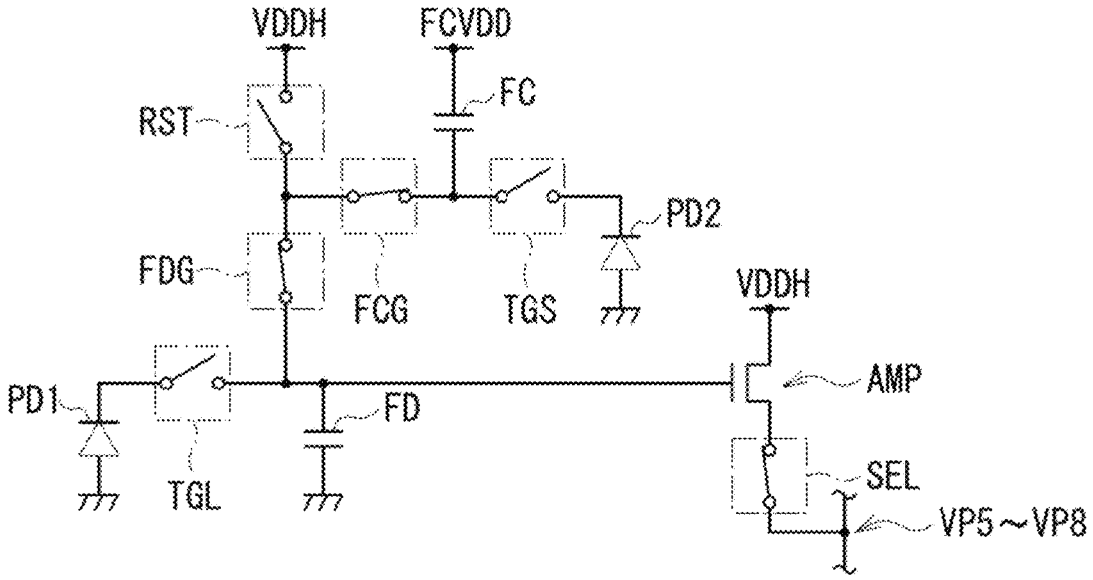

2A
PVDDH
VDDH
TVRH
Cext2
74
BIAS
CIRCUIT
VRH
72
81
SIGNAL GENERATION
CIRCUIT
82
TGLL, FDGL, RSTL,
FCGL, TSGL, SELL
P
FCVDD
83
VRL
TVRL
Cext1
14
CHARGE
PUMP
75A
40
41
HPF
42
43
90A
91
HPF
97
92
93
94
HPF
16
VDD
61
CONTROL
CIRCUIT
62
63
20
VSL
SIG
21
22
24
RAMP
23

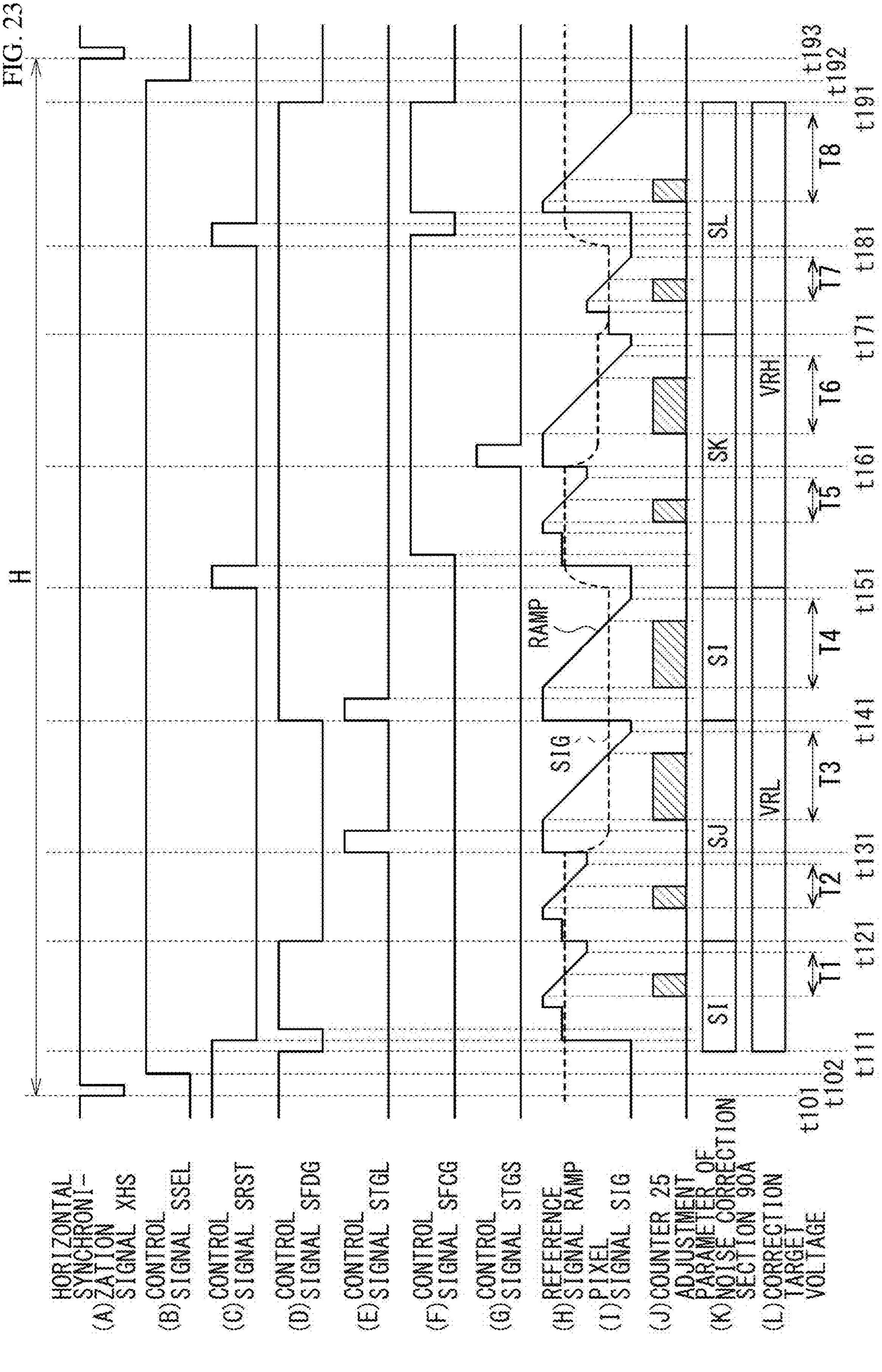

FIG. 23
H
(A) HORIZONTAL SYNCHRONIZATION SIGNAL XHS
(B) CONTROL SIGNAL SSEL
(C) CONTROL SIGNAL SRST
(D) CONTROL SIGNAL SFDG
(E) CONTROL SIGNAL STGL
(F) CONTROL SIGNAL SFCG
(G) CONTROL SIGNAL STGS
(H) REFERENCE SIGNAL RAMP
(I) PIXEL SIGNAL SIG
(J) COUNTER 25
(K) ADJUSTMENT PARAMETER OF NOISE CORRECTION SECTION 90A
(L) CORRECTION TARGET VOLTAGE
SIG
RAMP
SI
SJ
SI
SK
SL
VRL
VRH
T1
T2
T3
T4
T5
T6
T7
T8
t101
t102
t111
t121
t131
t141
t151
t161
t171
t181
t191
t192
t193

2B
TGLL, FDGL, RSTL,
FCGL, TSGL, SELL
P
VSL
20
SIG
24
22
23
21
RAMP
16
62
61
CONTROL CIRCUIT
63
VDD
72
FCVDD
83
82
81
SIGNAL GENERATION CIRCUIT
75B
40
90B
93
43
42
92
41
HPF
91
HPF
98
VDDH
74
BIAS CIRCUIT
VRH
VRL
14
CHARGE PUMP
PVDDH
TVRH
Cext2
TVRL
Cext1

20
READOUT SECTION
16
62
61
CONTROL CIRCUIT
63
78B
90B
93
MP2
92
C3
MP1
C2
IMAGING CONTROLLER
VDD
CS2
MN2
R2
SW1
C1
91
CS1
R1
MN1
SW4
98
VRH
VRL

[ FIG. 27 ]
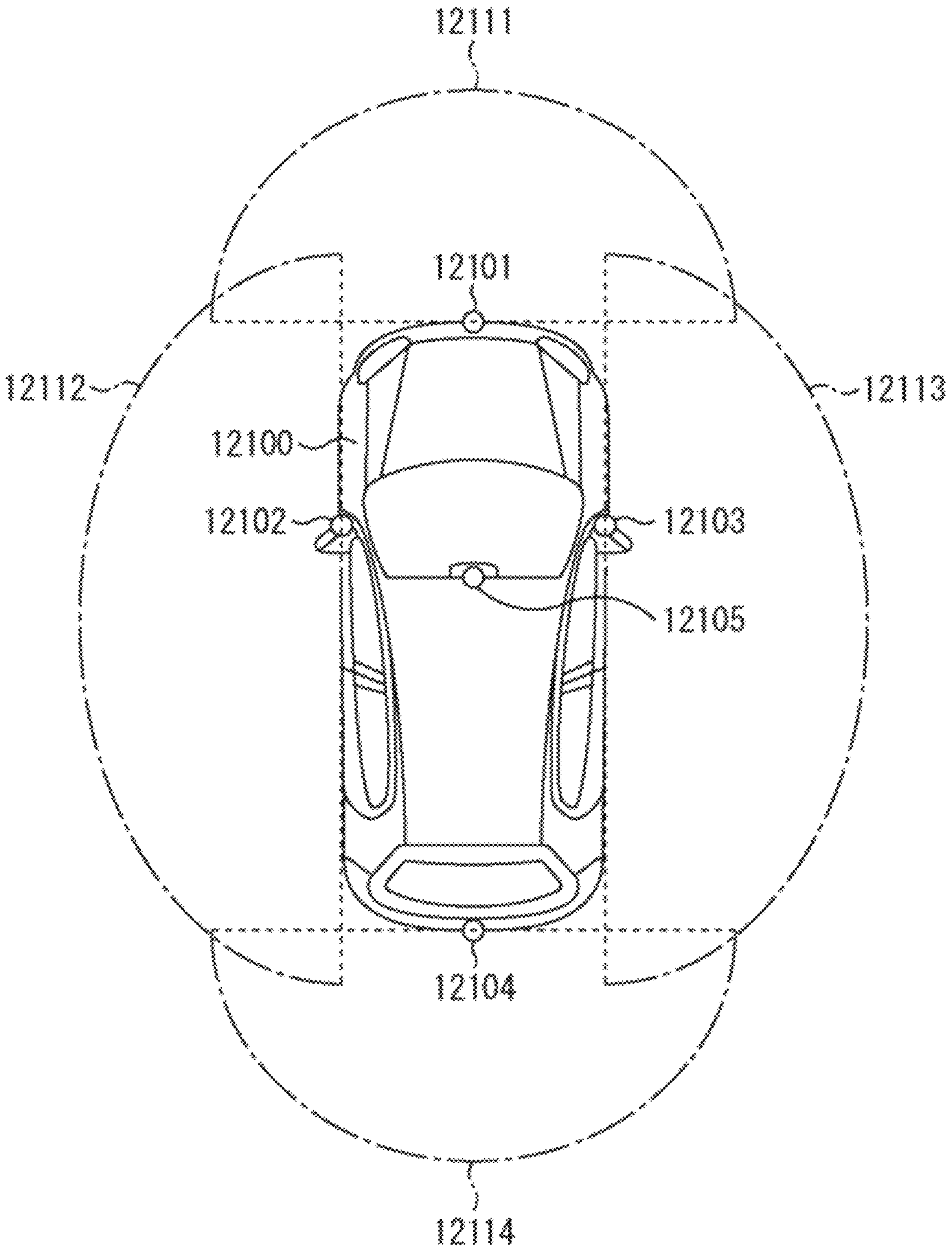

[ FIG. 28 ]
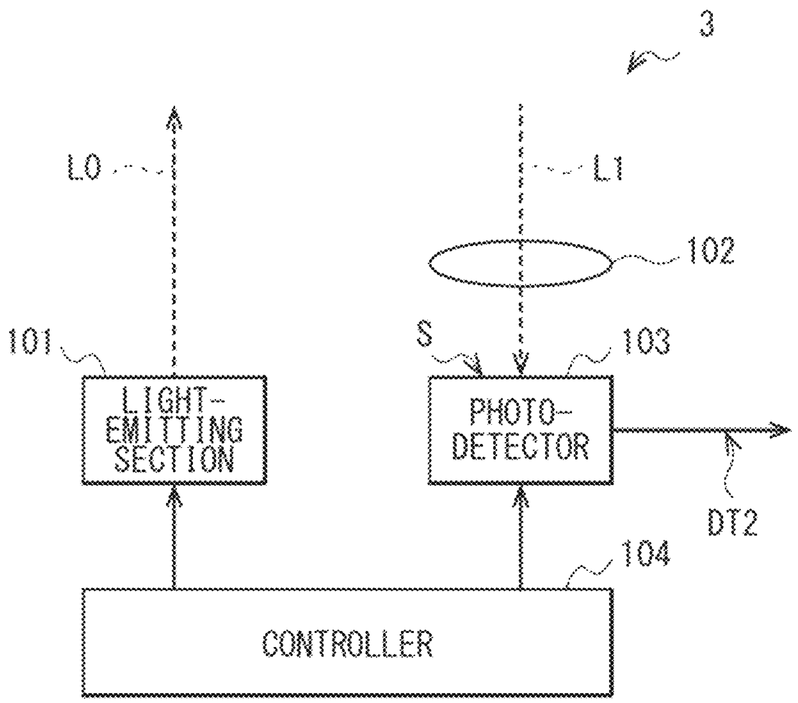

IMAGING DEVICE AND PHOTODETECTION DEVICE

TECHNICAL FIELD

The present disclosure relates to an imaging device that captures an image of a subject, and a photodetection device that detects light.

BACKGROUND ART

For example, in an imaging device, image quality of a captured image may deteriorate due to various noises. PTL 1 discloses a technology in which a noise correction circuit is provided to reduce deterioration in image quality caused by power supply noise.

CITATION LIST

Patent Literature

PTL 1: International Publication No. WO2017/159394

SUMMARY OF THE INVENTION

Incidentally, in an imaging device and a photodetection device, various voltages are generated. These voltages are frequently stabilized by an external capacitor. Noise may be superimposed even on these voltages. Accordingly, it is desired to reduce an influence of the noise on a result of imaging and a result of detection.

It is desirable to provide an imaging device and a photodetection device that each make it possible to reduce an influence of noise.

An imaging device according to one embodiment of the present disclosure includes a light-receiving pixel, a first coupling terminal, a first voltage generation circuit, a drive circuit, a reference signal generation circuit, a noise correction circuit, a comparison circuit, and a processing circuit. The light-receiving pixel is configured to generate a pixel signal including a pixel voltage corresponding to an amount of received light. The first coupling terminal is coupled to a first external capacitor. The first voltage generation circuit is configured to generate a voltage at the first coupling terminal. The drive circuit is configured to drive the light-receiving pixel on the basis of the voltage at the first coupling terminal. The reference signal generation circuit is configured to generate a reference signal having a ramp waveform. The noise correction circuit is configured to generate a noise correction signal corresponding to the voltage at the first coupling terminal, and is configured to superimpose the noise correction signal on the reference signal. The comparison circuit is configured to perform comparison between the pixel signal and the reference signal with the superimposed noise correction signal. The processing circuit is configured to calculate a pixel value on the basis of a result of the comparison by the comparison circuit.

A photodetection device according to one embodiment of the present disclosure includes a light reception circuit, a first coupling terminal, a first voltage generation circuit, a drive circuit, a reference signal generation circuit, a noise correction circuit, a comparison circuit, and a processing circuit. The light reception circuit is configured to generate a detection signal including a voltage corresponding to an amount of received light. The first coupling terminal is coupled to a first external capacitor. The first voltage generation circuit is configured to generate a voltage at the first coupling terminal. The drive circuit is configured to drive the light reception circuit on the basis of the voltage at the first coupling terminal. The reference signal generation circuit is configured to generate a reference signal having a ramp waveform. The noise correction circuit is configured to generate a noise correction signal corresponding to the voltage at the first coupling terminal, and is configured to superimpose the noise correction signal on the reference signal. The comparison circuit is configured to perform comparison between the detection signal and the reference signal with the superimposed noise correction signal. The processing circuit is configured to calculate a detection value on the basis of a result of the comparison by the comparison circuit.

In the imaging device according to one embodiment of the present disclosure, the light-receiving pixel generates the pixel signal including the pixel voltage corresponding to the amount of received light. The first voltage generation circuit generates the voltage at the first coupling terminal coupled to the first external capacitor. The drive circuit drives the light-receiving pixel on the basis of the voltage at the first coupling terminal. The reference signal generation circuit generates the reference signal having a ramp waveform. The noise correction circuit generates the noise correction signal corresponding to the voltage at the first coupling terminal, and superimposes this noise correction signal on the reference signal. The comparison circuit performs comparison between the pixel signal and the reference signal with the superimposed noise correction signal. Thereafter, the processing circuit calculates the pixel value on the basis of the result of the comparison by the comparison circuit.

In the photodetection device according to one embodiment of the present disclosure, the light reception circuit generates the detection signal including the voltage corresponding to the amount of received light. The first voltage generation circuit generates the voltage at the first coupling terminal coupled to the first external capacitor. The drive circuit drives the light reception circuit on the basis of the voltage at the first coupling terminal. The reference signal generation circuit generates the reference signal having a ramp waveform. The noise correction circuit generates the noise correction signal corresponding to the voltage at the first coupling terminal, and superimposes the noise correction signal on the reference signal. The comparison circuit performs comparison between the detection signal and the reference signal with the superimposed noise correction signal. Thereafter, the processing circuit calculates the detection value on the basis of a result of the comparison by the comparison circuit.

BRIEF DESCRIPTION OF DRAWINGS

FIG. 2 is a circuit diagram illustrating a configuration example of a light-receiving pixel illustrated in FIG. 1.

FIG. 3 is an explanatory diagram illustrating an example of arrangement of the light-receiving pixels in a pixel array illustrated in FIG. 1.

FIG. 7A is an explanatory diagram illustrating an operation example of the noise correction section illustrated in FIG. 6.

FIG. 7B is an explanatory diagram illustrating another operation example of the noise correction section illustrated in FIG. 6.

FIG. 7C is an explanatory diagram illustrating another operation example of the noise correction section illustrated in FIG. 6.

FIG. 8 is a timing chart illustrating an operation example of the imaging device illustrated in FIG. 1.

FIG. 11 is a characteristic diagram illustrating a characteristic example of a noise rejection ratio in the imaging device illustrated in FIG. 1.

FIG. 19A is an explanatory diagram illustrating an example of an operation state of the light-receiving pixel illustrated in FIG. 14.

FIG. 19B is an explanatory diagram illustrating another example of the operation state of the light-receiving pixel illustrated in FIG. 14.

FIG. 19C is an explanatory diagram illustrating another example of the operation state of the light-receiving pixel illustrated in FIG. 14.

FIG. 23 is a timing waveform diagram illustrating an operation example of an imaging device according to the modification example of the second embodiment.

FIG. 27 is a diagram of assistance in explaining an example of installation positions of an outside-vehicle information detecting section and an imaging section.

FIG. 28 is a block diagram illustrating a configuration example of a distance measurement device to which the present technology is applied.

MODES FOR CARRYING OUT THE INVENTION

In the following, some embodiments of the present disclosure are described in detail with reference to the drawings. It is to be noted that description is given in the following order.

1. First Embodiment
2. Second Embodiment
3. Application Example to Mobile Body

1. First Embodiment

Configuration Example

Figure 1:
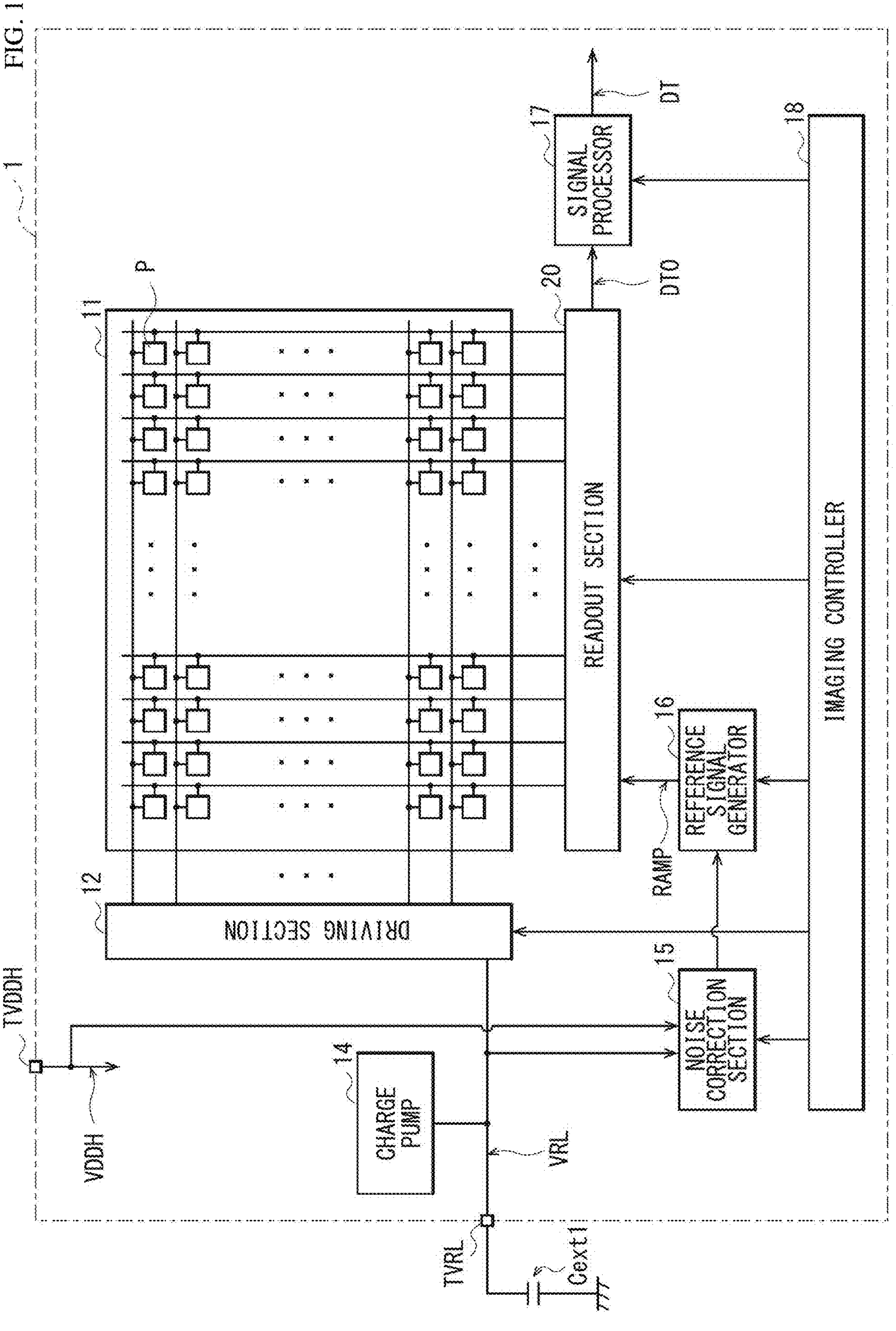
FIG. 1 is a block diagram illustrating a configuration example of an imaging device according to a first embodiment of the present disclosure.

FIG. 1 illustrates a configuration example of an imaging device (an imaging device 1) according to a first embodiment. The imaging device 1 includes a pixel array 11, a driving section 12, a readout section 20, a charge pump 14, a noise correction section 15, a reference signal generator 16, a signal processor 17, and an imaging controller 18.

The pixel array 11 includes a plurality of light-receiving pixels P arranged in a matrix. The light-receiving pixels P are each configured to generate a pixel signal SIG including a pixel voltage Vpix corresponding to an amount of received light.

FIG. 2 illustrates a configuration example of the light-receiving pixel P. The pixel array 11 includes a plurality of control lines TRGL, a plurality of control lines RSTL, a plurality of control lines SELL, and a plurality of signal lines VSL. The control lines TRGL extend in a horizontal direction (in a lateral direction in FIG. 2), and each have one end coupled to the driving section 12. The driving section 12 supplies a control signal STRG to the control lines TRGL. The control lines RSTL extend in the horizontal direction, and each have one end coupled to the driving section 12. The driving section 12 supplies a control signal SRST to the control lines RSTL. The control lines SELL extend in the horizontal direction, and each have one end coupled to the driving section 12. The driving section 12 supplies a control signal SSEL to the control lines SELL. The signal lines VSL extend in a vertical direction (in a longitudinal direction in FIG. 2), and each have one end coupled to the readout section 20. The signal lines VSL each transmit the pixel signal SIG generated by the light-receiving pixel P to the readout section 20. A plurality of light-receiving pixels P for one row provided side by side in the horizontal direction (in the lateral direction in FIGS. 1 and 2) constitute a pixel line L.

The light-receiving pixels P each include a photodiode PD, a transistor TRG, a floating diffusion FD, and transistors RST, AMP, and SEL. The transistors TRG, RST, AMP, and SEL are N-type MOS (Metal Oxide Semiconductor) transistors in this example.

The photodiode PD is a photoelectric conversion element that generates electric charge in an amount corresponding to the amount of received light and accumulates the electric charge therein. The photodiode PD has an anode grounded, and a cathode coupled to a source of the transistor TRG.

The transistor TRG has a gate coupled to the control line TRGL, the source coupled to the cathode of the photodiode PD, and a drain coupled to the floating diffusion PD.

The floating diffusion FD is configured to accumulate the electric charge transferred from the photodiode PD via the transistor TRG. The floating diffusion FD is configured using, for example, a diffusion layer formed on a surface of a semiconductor substrate. In FIG. 2, the floating diffusion FD is indicated by a capacitor symbol.

The transistor RST has a gate coupled to the control line RSTL, a drain coupled to a power supply node of a power supply voltage VDDH, and a source coupled to the floating diffusion FD.

The transistor AMP has a gate coupled to the floating diffusion FD, a drain coupled to the power supply node of the power supply voltage VDDH, and a source coupled to a drain of the transistor SEL.

The transistor SEL has a gate coupled to the control line SELL, the drain coupled to the source of the transistor AMP, and a source coupled to the signal line VSL.

With this configuration, in the light-receiving pixel P, the transistors TRG and RST are turned on, for example, on the basis of the control signals STRG and SRST to thereby discharge the electric charge accumulated in the photodiode PD to the power supply node of the power supply voltage VDDH. Thereafter, an exposure period T is started by turning off the transistors TRG and RST, and electric charge in the amount corresponding to the amount of received light is accumulated in the photodiode PD. Thereafter, after the exposure period T ends, the light-receiving pixel P outputs the pixel signal SIG including a reset voltage Vreset and the pixel voltage Vpix to the signal line VSL. Specifically, first, the light-receiving pixel P is electrically coupled to the signal line VSL by turning on the transistor SEL on the basis of the control signal SSEL. As a result, the transistor AMP is coupled to a constant current source 21 (to be described later) of the readout section 20, and operates as what is called a source follower. Thereafter, as described later, in a P-phase (Pre-charge phase) period TP after a voltage of the floating diffusion FD is reset by turning on the transistor RST, the light-receiving pixel P outputs, as the reset voltage Vreset, a voltage corresponding to the voltage of the floating diffusion FD at that time. In addition, in a D-phase (Data phase) period TD after electric charge is transferred from the photodiode PD to the floating diffusion FD by turning on the transistor TRG, the light-receiving pixel P outputs, as the pixel voltage Vpix, a voltage corresponding to the voltage of the floating diffusion FD at that time. A difference voltage between the pixel voltage Vpix and the reset voltage Vreset corresponds to the amount of light received by the light-receiving pixel P in the exposure period T. In this way, the light-receiving pixel P outputs the pixel signal SIG including the reset voltage Vreset and the pixel voltage Vpix to the signal line VSL.

FIG. 3 illustrates a configuration example of the pixel array 11. In the pixel array 11, unit pixels PP each including four light-receiving pixels P (light-receiving pixels PR, PGr, PGb, PB) are provided side by side. The pixel PR includes a red (R) color filter, and is configured to receive red light. The light-receiving pixels PGr and PGb each include a green (G) color filter, and are configured to receive green light. The light-receiving pixel PB includes a blue (B) color filter, and is configured to receive blue light. In the unit pixel PP, the light-receiving pixel PR is provided on the upper left, the light-receiving pixel PGr is provided on the upper right, the light-receiving pixel PGb is provided on the lower left, and the light-receiving pixel PB is provided on the lower right. In this way, the four pixels PR, PGr, PGb, and PB are arranged in what is called a Bayer arrangement.

The driving section 12 (FIG. 1) is configured to sequentially drive the plurality of light-receiving pixels P in the pixel array 11 in units of the pixel lines L on the basis of an instruction from the imaging controller 18. Specifically, the driving section 12 supplies each of a plurality of control signals STRG to a corresponding one of the plurality of control lines TRGL in the pixel array 11, supplies each of a plurality of control signals SRST to a corresponding one of the plurality of control lines RSTL in the pixel array 11, and supplies each of a plurality of control signals SSEL to a corresponding one of the plurality of control lines SELL in the pixel array 11, thereby driving the plurality of light-receiving pixels P in the pixel array 11 in units of the pixel lines L. A voltage VRL generated by the charge pump 14 is supplied to the driving section 12. The driving section 12 uses the voltage VRL as a low-level voltage of each of the control signals STRG, SRST, and SSEL to drive the plurality of light-receiving pixels P.

The readout section 20 is configured to generate image data DT0 on the basis of an instruction from the imaging controller 18 by performing AD conversion on the basis of the pixel signal SIG supplied from the pixel array 11 via the signal line VSL.

Figure 4:
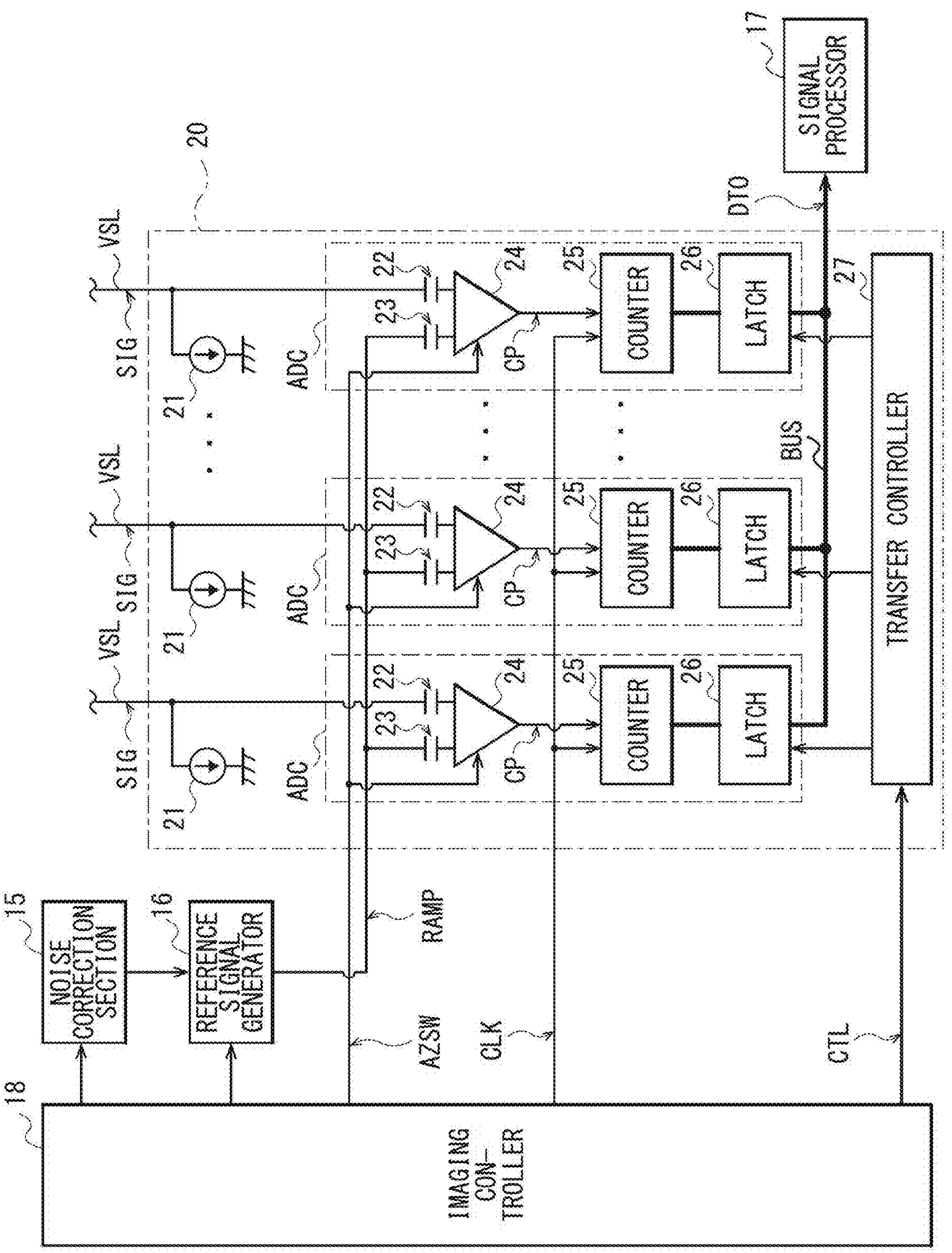
FIG. 4 is a block diagram illustrating a configuration example of a readout section illustrated in FIG. 1.

FIG. 4 illustrates a configuration example of the readout section 20. It is to be noted that FIG. 4 illustrates the noise correction section 15, the reference signal generator 16, the signal processor 17, and the imaging controller 18, in addition to the readout section 20. The readout section 20 includes a plurality of constant current sources 21, a plurality of AD (Analog to Digital) converters ADC, and a transfer controller 27. Each of the plurality of constant current sources 21 and each of the plurality of AD converters ADC are provided for a corresponding one of the plurality of signal lines VSL. The following describes the constant current source 21 and AD converter ADC corresponding to one certain signal line VSL.

The constant current source 21 is configured to cause a predetermined current to flow through the corresponding signal line VSL. The constant current source 21 has one end coupled to the corresponding signal line VSL, and another end coupled to a ground node.

The AD converter ADC is configured to perform AD conversion on the basis of the pixel signal SIG in the corresponding signal line VSL. The AD converter ADC includes capacitors 22 and 23, a comparison circuit 24, a counter 25, and a latch 26.

The capacitor 22 has one end that is coupled to the signal line VSL and is to be supplied with the signal SIG, and another end coupled to the comparison circuit 24. The capacitor 23 has one end to be supplied with a reference signal RAMP supplied from the reference signal generator 16, and another end coupled to the comparison circuit 24. The reference signal RAMP is a signal having what is called a ramp waveform whose voltage level gradually changes over time.

The comparison circuit 24 is configured to generate a signal CP by performing a comparison operation on the basis of the pixel signal SIG supplied from the light-receiving pixel P via the signal line VSL and the capacitor 22, and the reference signal RAMP supplied from the reference signal generator 16 via the capacitor 23. The comparison circuit 24 sets an operating point by setting the voltages of the capacitors 22 and 23 on the basis of a control signal AZSW supplied from the imaging controller 18. Thereafter, the comparison circuit 24 performs a comparison operation to perform comparison between the reset voltage Vreset included in the pixel signal SIG and a voltage of the reference signal RAMP in the P-phase period TP, and performs a comparison operation to perform comparison between the pixel voltage Vpix included in the pixel signal SIG and the voltage of the reference signal RAMP in the D-phase period TD.

The counter 25 is configured to perform a counting operation to count pulses of a clock signal CLK supplied from the imaging controller 18 on the basis of the signal CP supplied from the comparison circuit 24. Specifically, the counter 25 generates a count value CNT by counting down the pulses of the clock signal CLK until the signal CP transitions in the P-phase period TP, and counting up the pulses of the clock signal CLK until the signal CP transitions in the D-phase period TD. Thereafter, the counter 25 outputs the count value CNT as a digital code having a plurality of bits.

The latch 26 is configured to temporarily hold the digital code supplied from the counter 25, and output the digital code to a bus wiring BUS on the basis of an instruction from the transfer controller 27.

The transfer controller 27 is configured to control the latches 26 of the plurality of AD converters ADC on the basis of a control signal CTL supplied from the imaging controller 18 so as to cause the latches 26 of AD converters ADC to sequentially output the digital codes to the bus wiring BUS. The readout section 20 uses the bus wiring BUS to sequentially transfer, as the image data DT0, a plurality of digital codes supplied from the plurality of AD converters ADCs to the signal processor 17.

The charge pump 14 (FIG. 1) is configured to generate the voltage VRL by performing a predetermined pump operation. The charge pump 14 is coupled to a capacitor Cext1 via a terminal TVRL. The capacitor Cext1 is provided outside the imaging device 1. In this example, the voltage VRL is a voltage lower than a ground voltage. The charge pump 14 generates the voltage VRL by charging and discharging the capacitor Cext1.

The noise correction section 15 is configured to generate a noise correction signal corresponding to noise superimposed on the power supply voltage VDDH and a noise correction signal corresponding to noise superimposed on the voltage VRL and superimpose these noise correction signals on the reference signal RAMP generated by the reference signal generator 16, on the basis of an instruction from the imaging controller 18. The power supply voltage VDDH is supplied to the imaging device 1 via a power supply terminal TVDDH. The voltage VRL is generated by the charge pump 14 charging and discharging the capacitor Cext1 provided outside the imaging device 1. Accordingly, for example, noises caused by an external environment may be superimposed on the power supply voltage VDDH and the voltage VRL. The noise correction section 15 generates noise correction signals corresponding to the noises, and superimposes the generated noise correction signals on the reference signal RAMP generated by the reference signal generator 16.

The reference signal generator 16 is configured to generate the reference signal RAMP on the basis of an instruction from the imaging controller 18. The reference signal RAMP has what is called a ramp waveform whose voltage level gradually changes over time in two periods (the P-phase period TP and the D-phase period TD) in which the readout section 20 performs AD conversion. The reference signal generator 16 supplies such a reference signal RAMP to the readout section 20.

Figure 5:
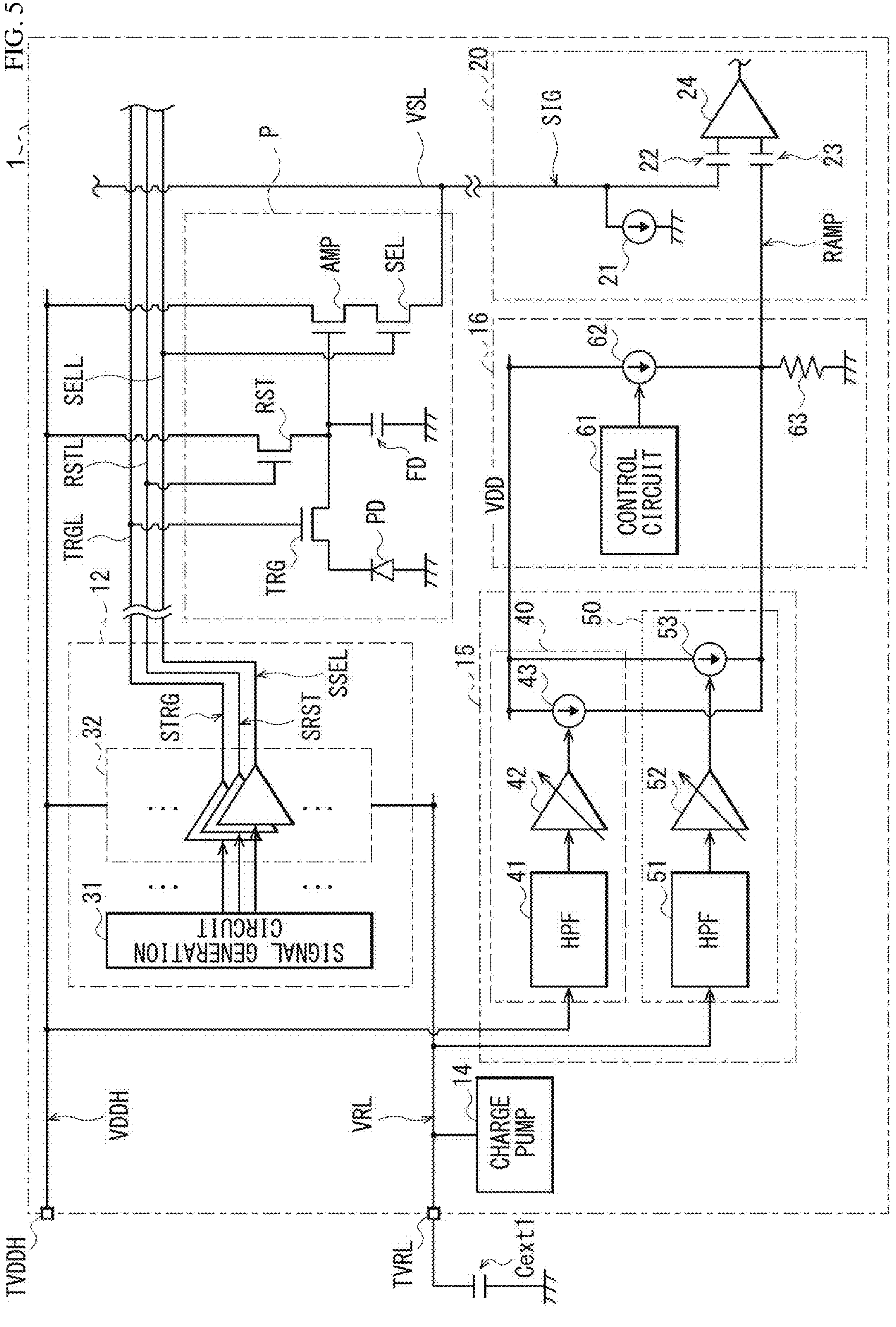
FIG. 5 is a block diagram illustrating a specific example of a noise correction section illustrated in FIG. 1.

FIG. 5 illustrates configuration examples of the driving section 12, the noise correction section 15, and the reference signal generator 16. It is to be noted that FIG. 5 illustrates the light-receiving pixel P, the charge pump 14, and the readout section 20, in addition to the driving section 12, the noise correction section 15, and the reference signal generator 16.

The driving section 12 includes a signal generation circuit 31 and a driver section 32. The signal generation circuit 31 is configured using, for example, a shift register, and is configured to generate a plurality of control signals as sources of the plurality of control signals STRG, a plurality of control signals as sources of the plurality of control signals SRST, and a plurality of control signals as sources of the plurality of control signals SSEL. The driver section 32 includes a plurality of drivers. The driver section 32 is configured to generate the plurality of control signals STRG, the plurality of control signals SRST, and the plurality of control signals SSEL on the basis of the plurality of control signals supplied from the signal generation circuit 31. The driver section 32 is supplied with the power supply voltage VDDH and the voltage VRL. The driver section 32 uses the power supply voltage VDDH as a high-level voltage and uses the voltage VRL as a low-level voltage to thereby generate the control signals STRG, SRST, and SSEL.

The noise correction section 15 includes a noise correction section 40 and a noise correction section 50. The noise correction section 40 is configured to generate the noise correction signal corresponding to the noise superimposed on the power supply voltage VDDH. The noise correction section 50 is configured to generate the noise correction signal corresponding to the noise superimposed on the voltage VRL.

The noise correction section 40 includes a high-pass filter (HPF) 41, an adjustment circuit 42, and a current source 43. The high-pass filter 41 is configured to supply, to the adjustment circuit 42, a noise signal superimposed on the power supply voltage VDDH. The noise signal is an alternating-current component. The adjustment circuit 42 is configured to adjust an amplitude and a phase of the noise signal supplied from the high-pass filter 41 on the basis of an instruction from the imaging controller 18. The current source 43 is configured to convert the noise signal adjusted by the adjustment circuit 42 into a current signal.

The noise correction section 50 includes a high-pass filter (HPF) 51, an adjustment circuit 52, and a current source 53. The high-pass filter 51 is configured to supply, to the adjustment circuit 52, a noise signal superimposed on the voltage VRL. The noise signal is an alternating-current component. The adjustment circuit 52 is configured to adjust an amplitude and a phase of the noise signal supplied from the high-pass filter 51 on the basis of an instruction from the imaging controller 18. The current source 53 is configured to convert the noise signal adjusted by the adjustment circuit 52 into a current signal.

The noise correction section 15 supplies the current signal generated by the noise correction section 40 to the reference signal generator 16 to thereby superimpose, on the reference signal RAMP, a noise correction signal that is a voltage signal corresponding to the current signal. Likewise, the noise correction section 15 supplies the current signal generated by the noise correction section 50 to the reference signal generator 16 to thereby superimpose, on the reference signal RAMP, a noise correction signal that is a voltage signal corresponding to the current signal.

The reference signal generator 16 includes a control circuit 61, a current source 62, and a resistor element 63. The control circuit 61 is configured to set an amount of a current that is to flow through the current source 62, on the basis of an instruction from the imaging controller 18. The current source 62 is coupled to the resistor element 63, and is configured to cause an amount of the current in accordance with an instruction from the control circuit 61 to flow through the resistor element 63. The resistor element 63 has one end coupled to the current source 62, and another end coupled to the ground node. The current supplied from the current source 62 flows through the resistor element 63. Thus, the reference signal generator 16 generates the reference signal RAMP that is a voltage signal corresponding to the current. The current signal supplied from the noise correction section 15 also flows through the resistor element 63. Thus, the noise correction signal that is the voltage signal corresponding to the current signal is superimposed on the reference signal RAMP.

Figure 6:
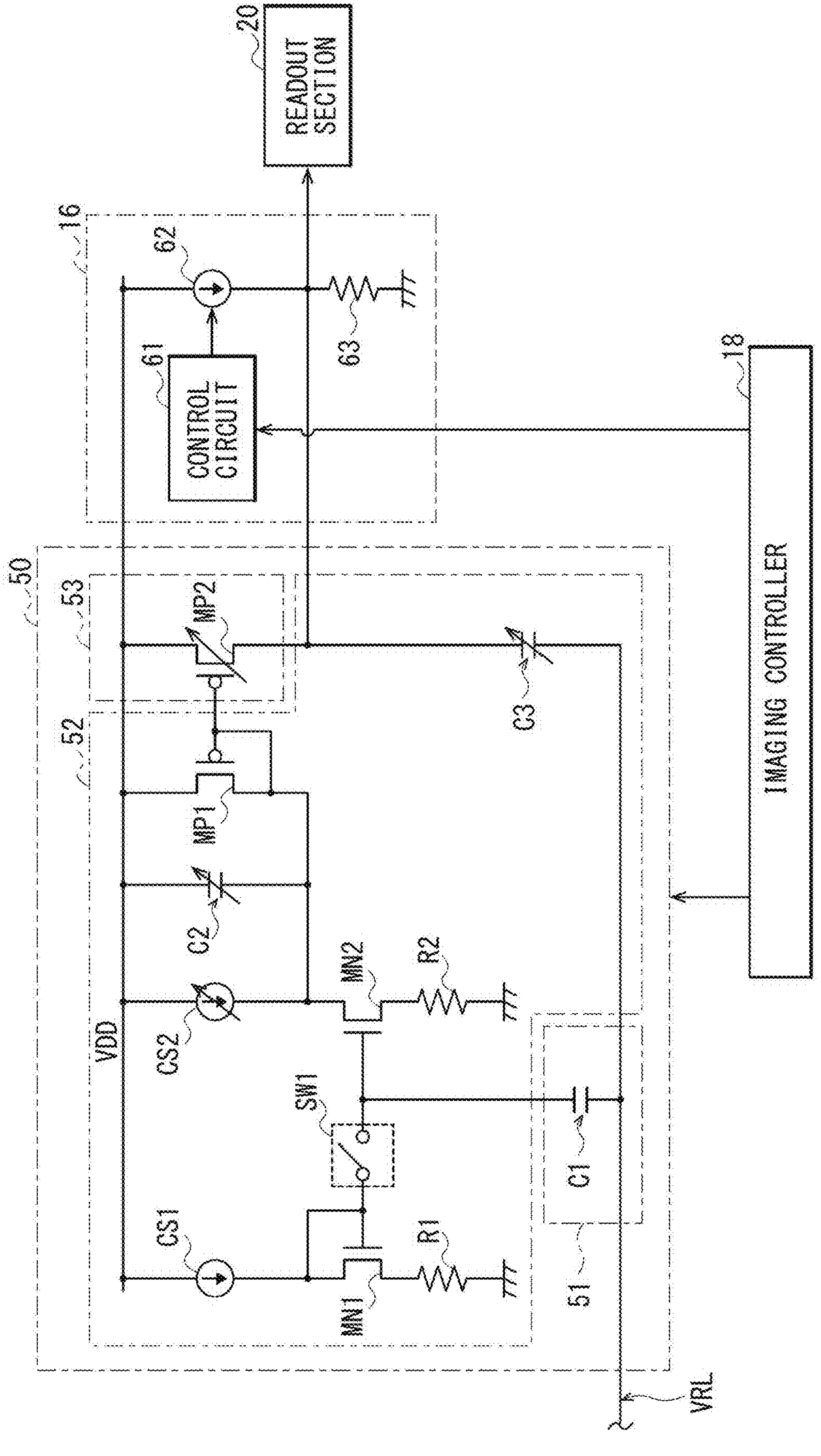
FIG. 6 is a circuit diagram illustrating a specific example of the noise correction section illustrated in FIG. 5.

FIG. 6 illustrates a configuration example of the noise correction section 50. It is to be noted that the same applies to the noise correction section 40. FIG. 6 illustrates the reference signal generator 16, an imaging controller 78A, and the imaging controller 18, in addition to the noise correction section 50. The noise correction section 50 includes a capacitor C1, a resistor element R1, a transistor MINI, a current source CS1, a switch SW1, a resistor element R2, a transistor MN2, a current source CS2, a capacitor C2, transistors MP1 and MP2, and a capacitor C3. The transistors MN1 and MN2 are N-type MOS transistors. The transistors MP1 and MP2 are P-type transistors. The capacitor C1 corresponds to the high-pass filter 51 illustrated in FIG. 5. The resistor element R1, the transistor MINI, the current source CS1, the switch SW1, the resistor element R2, the transistor MN2, the current source CS2, the capacitor C2, the transistor MP1, and the capacitor C3 correspond to the adjustment circuit 52 illustrated in FIG. 5. The transistor MP2 corresponds to the current source 53 illustrated in FIG. 5.

The capacitor C1 has one end to be supplied with the voltage VRL, and another end coupled to the switch SW1 and a gate of the transistor MN2. The resistor element R1 has one end coupled to a source of the transistor MN1, and another end coupled to the ground node. The transistor MINI has a gate coupled to the switch SW1, a drain of the transistor MN1, and the current source CS1, the drain coupled to the current source CS1, the gate of the transistor MN1, and the switch SW1, and the source coupled to the one end of the resistor element R1. The current source CS1 has one end coupled to a power supply node of a power supply voltage VDD, and another end coupled to the drain of the transistor MN1, the gate of the transistor MN1, and the switch SW1. The switch SW1 has one end coupled to the gate of the transistor MINI, the drain of the transistor MN1, and the other end of the current source CS1, and another end coupled to another end of the capacitor C1 and a gate of the transistor MN2. The switch SW1 is turned on or off on the basis of an instruction from the imaging controller 18. The resistor element R2 has one end coupled to a source of the transistor MN2, and another end coupled to the ground node. The transistor MN2 has the gate coupled to the other end of the capacitor C1 and the other end of the switch SW1, a drain coupled to the current source CS2, the capacitor C2, a drain of the transistor MP1, and gates of the transistors MP1 and MP2, and the source coupled to the one end of the resistor element R2. The current source CS2 has one end coupled to the power supply node of the power supply voltage VDD, and another end coupled to the drain of the transistor MN2, the capacitor C2, the drain of the transistor MP1, and the gates of the transistors MP1 and MP2. The current source CS2 is configured to change a current amount on the basis of an instruction from the imaging controller 18. The capacitor C2 has one end coupled to the power supply node of the power supply voltage VDD, and another end coupled to the drain of the transistor MN2, the other end of the current source CS2, the drain of the transistor MP1, and the gates of the transistors MP1 and MP2. The capacitor C2 is configured to change a capacitance value on the basis of an instruction from the imaging controller 18. The transistor MP1 has the gate coupled to the gate of the transistor MP2, the drain of the transistor MP1, the drain of the transistor MN2, the other end of the current source CS2, and the other end of the capacitor C2, a source coupled to the power supply node of the power supply voltage VDD, and the drain coupled to the gates of the transistors MP1 and MP2, the drain of the transistor MN2, the other end of the current source CS2, and the other end of the capacitor C2. The transistor MP2 has the gate coupled to the gate of the transistor MP1, the drains of the transistors MP1 and MN2, the other end of the current source CS2, and the other end of the capacitor C2, a source coupled to the power supply node of the power supply voltage VDD, and a drain coupled to the capacitor C3 and coupled to the reference signal generator 16. The transistor MP2 is configured to change a gate width of a transistor to be operated, on the basis of an instruction from the imaging controller 18. The capacitor C3 has one end to be supplied with the voltage VRL, and another end coupled to the drain of the transistor MP2 and coupled to the reference signal generator 16. The capacitor C3 is configured to change a capacitance value on the basis of an instruction from the imaging controller 18.

With this configuration, an operating point of the noise correction section 50 is set by turning on the switch SW1, and thereafter the switch SW1 is turned off. Accordingly, the noise signal that is superimposed on the voltage VRL and is an alternating-current component is applied to the gate of the transistor MN2, and a current corresponding to the voltage of the gate of the transistor MN2 is caused to flow through the transistor MN2. The current source CS2 causes a direct current to flow. This causes a current, excluding the direct current of the current source CS2, of the current flowing through the transistor MN2 to flow through the transistor MP1. The transistors MP1 and MP2 constitute a current mirror circuit, and a current corresponding to the current flowing through the transistor MP1 flows through the transistor MP2. This causes the noise correction section 50 to output the current signal corresponding to the noise signal superimposed on the voltage VRL. The current signal flows through the resistor element 63 of the reference signal generator 16. Thus, the noise correction signal that is a voltage signal corresponding to the current signal is generated.

The current source CS2, the capacitors C2 and C3, and the transistor MP2 in the noise correction section 50 operate on the basis of an adjustment parameter supplied from the imaging controller 18. This allows the adjustment circuit 52 of the noise correction section 50 to adjust an amplitude and a phase of the noise correction signal.

FIGS. 7A to 7C each illustrate an operation example of the adjustment circuit 52. FIG. 7A illustrates an example in which the amplitude of the noise correction signal is adjusted, and FIGS. 7B and 7C illustrate an example in which the phase of the noise correction signal is adjusted.

For example, in a case where a gate width of a transistor to be operated in the transistor MP2 is changed, a current mirror ratio in the transistors MP1 and MP2 changes. This changes a gain in the noise correction section 50, which changes the amplitude of the noise correction signal as illustrated in FIG. 7A. Specifically, the adjustment circuit 52 is configured to increase the amplitude of the noise correction signal by increasing the gate width of the transistor to be operated in the transistor MP2.

It is possible to represent an amplitude ΔVo of the noise correction signal by the following expression.

$$\Delta Vo = 1/Rs \times m \times Ro \times \Delta V$$

Here, ΔV is a voltage amplitude of a noise signal in the transistor MN2, Rs is a resistance value of the resistor element R2, and m is a current mirror ratio in the transistors MP1 and MP2, and represents a current flowing through the transistor MP2 based on a current flowing through the transistor MP1 as "1". Ro is a resistance value of the resistor element 63. Accordingly, changing the current mirror ratio makes it possible to change the amplitude of the noise correction signal.

For example, in a case where the capacitance value of the capacitor C2 is changed, the phase of the noise correction signal changes as illustrated in FIG. 7B. Specifically, the adjustment circuit 52 is configured to delay the phase of the noise correction signal by increasing the capacitance value of the capacitor C2.

For example, in a case where the capacitance value of the capacitor C3 is changed, the phase of the noise correction signal changes as illustrated in FIG. 7C. Specifically, the adjustment circuit 52 is configured to advance the phase of the noise correction signal by increasing the capacitance value of the capacitor C3.

The signal processor 17 (FIG. 1) is configured to generate image data DT by performing predetermined image processing, on the basis of the image data DT0 and an instruction from the imaging controller 18. Examples of the predetermined image processing include black level correction processing for correcting a black level, and processing for reducing noise.

The imaging controller 18 is configured to supply control signals to the driving section 12, the readout section 20, the noise correction section 15, the reference signal generator 16, and the signal processor 17 and control the operations of these circuits, thereby controlling an operation of the imaging device 1. Specifically, the imaging controller 18 supplies the control signal to the driving section 12 to thereby control the driving section 12 so that the driving section 12 sequentially drives the plurality of light-receiving pixels P in the pixel array 11 in units of the pixel lines L. In addition, the imaging controller 18 supplies the control signal to the noise correction section 15 to thereby control the noise correction section 15 so that the noise correction section 15 adjusts, for example, the amplitude and the phase of the noise correction signal. In addition, the imaging controller 18 supplies the control signal to the reference signal generator 16 to thereby control the reference signal generator 16 so that the reference signal generator 16 generates the reference signal RAMP. In addition, the imaging controller 18 supplies the control signal to the readout section 20 to thereby control the readout section 20 so that the readout section 20 generates the image data DT0 by performing AD conversion on the basis of the pixel signal SIG. In addition, the imaging controller 18 supplies the control signal to the signal processor 17 to thereby control image processing in the signal processor 17.

Here, the light-receiving pixel P corresponds to a specific example of a "light-receiving pixel" in one embodiment of the present disclosure. The terminal TVRL corresponds to a specific example of a "first coupling terminal" in one embodiment of the present disclosure. The capacitor Cext1 corresponds to a specific example of a "first external capacitor" in one embodiment of the present disclosure. The charge pump 14 corresponds to a specific example of a "first voltage generation circuit" in one embodiment of the present disclosure. The driving section 12 corresponds to a specific example of a "drive circuit" in one embodiment of the present disclosure. The reference signal RAMP corresponds to a specific example of a "reference signal" in one embodiment of the present disclosure. The reference signal generator 16 corresponds to a specific example of a "reference signal generation circuit" in one embodiment of the present disclosure. The noise correction section 50 corresponds to a specific example of a "noise correction circuit" in one embodiment of the present disclosure. The comparison circuit 24 corresponds to a specific example of a "comparison circuit" in one embodiment of the present disclosure. The counter 25 corresponds to a specific example of a "processing circuit" in one embodiment of the present disclosure.

Operation and Workings

Next, description is given of the operation and workings of the imaging device 1 according to the present embodiment.

Overview of Overall Operation

First, an overview of an overall operation of the imaging device 1 is described with reference to FIGS. 1 and 4. The charge pump 14 charges and discharges the capacitor Cext1 provided outside the imaging device 1 to thereby generate the voltage VRL. The driving section 12 sequentially drives the plurality of light-receiving pixels P in the pixel array 11 in units of the pixel lines L on the basis of an instruction from the imaging controller 18. The reference signal generator 16 generates the reference signal RAMP on the basis of an instruction from the imaging controller 18. The noise correction section 15 generates the noise correction signal corresponding to the noise superimposed on the power supply voltage VDDH, and the noise correction signal corresponding to the noise superimposed on the voltage VRL, on the basis of an instruction from the imaging controller 18, and superimposes these generated noise correction signals on the reference signal RAMP generated by the reference signal generator 16. The light-receiving pixels P each output the reset voltage Vreset as the pixel signal SIG in the P-phase period TP, and each output the pixel voltage Vpix corresponding to the amount of received light as the pixel signal SIG in the D-phaser period TD. The readout section 20 generates the image data DT0 on the basis of the pixel signals SIG supplied from the pixel array 11 via the signal lines VSL, the reference signal RAMP supplied from the reference signal generator 16, and an instruction from the imaging controller 18. Specifically, in the readout section 20, the AD converters ADC each perform AD conversion on the basis of the pixel signal SIG and the reference signal RAMP to thereby generate the count value CNT, and outputs the count value CNT as the digital code having a plurality of bits. The readout section 20 sequentially supplies, as the image data DT0, a plurality of digital codes generated by the plurality of AD converters ADC to the signal processor 17 via the bus wiring BUS. The plurality of digital codes includes the count values CNT. The signal processor 17 performs the predetermined image processing on the basis of the image data DT0 and an instruction from the imaging controller 18 to thereby generate the image data DT.

Detailed Operation

In the imaging device 1, the plurality of light-receiving pixels P each accumulates electric charge corresponding the amount of received light, and generates the pixel signal SIG including the pixel voltage Vpix corresponding to the amount of received light. Thereafter, the readout section 20 performs AD conversion on the basis of the pixel signals SIG and the reference signal RAMP. The following describes this operation in detail.

FIG. 8 illustrates an example of an operation of scanning the plurality of light-receiving pixels P in the pixel array 11 in units of the pixel lines L.

In a period from a timing to t0 a timing t1, the imaging device 1 performs exposure start driving D1 on the pixel array 11 sequentially from the top in the vertical direction. Specifically, the driving section 12 generates, for example, the control signals STRG and SRST to thereby sequentially select the pixel lines L, and sequentially turn on the transistors TRG and RST in the light-receiving pixels P for a predetermined length of time. This causes the voltage of the floating diffusion FD and the voltage of the cathode of the photodiode PD to be set to the power supply voltage VDDH in each of the light-receiving pixels P. Thereafter, in a case where the transistors TRG and RST are turned off, the photodiode PD starts to accumulate electric charge in accordance with the amount of received light. In this way, the exposure period T starts sequentially in the plurality of light-receiving pixels P.

Thereafter, in a period from a timing t2 to a timing t3, the imaging device 1 performs readout driving D2 on the pixel array 11 sequentially from the top in the vertical direction. Specifically, as described below, the driving section 12 generates the control signals STRG, SRST, and SSEL to sequentially select the pixel lines L. This causes the light-receiving pixels P to output the reset voltage Vreset as the pixel signal SIG in the P-phase period TP and output the pixel voltage Vpix as the pixel signal SIG in the D-phase period TD. The readout section 20 performs AD conversion on the basis of the pixel signals SIG each including the reset voltage Vreset and the pixel voltage Vpix outputted from the light-receiving pixels P.

The imaging device 1 repeats such exposure start driving D1 and such readout driving D2. This allows the imaging device 1 to obtain a series of captured images.

Next, the readout driving D2 is described in detail. The following focuses on a certain light-receiving pixel P, and describes operations of this light-receiving pixel P and the AD converter ADC coupled to the light-receiving pixel P.

Figure 9:
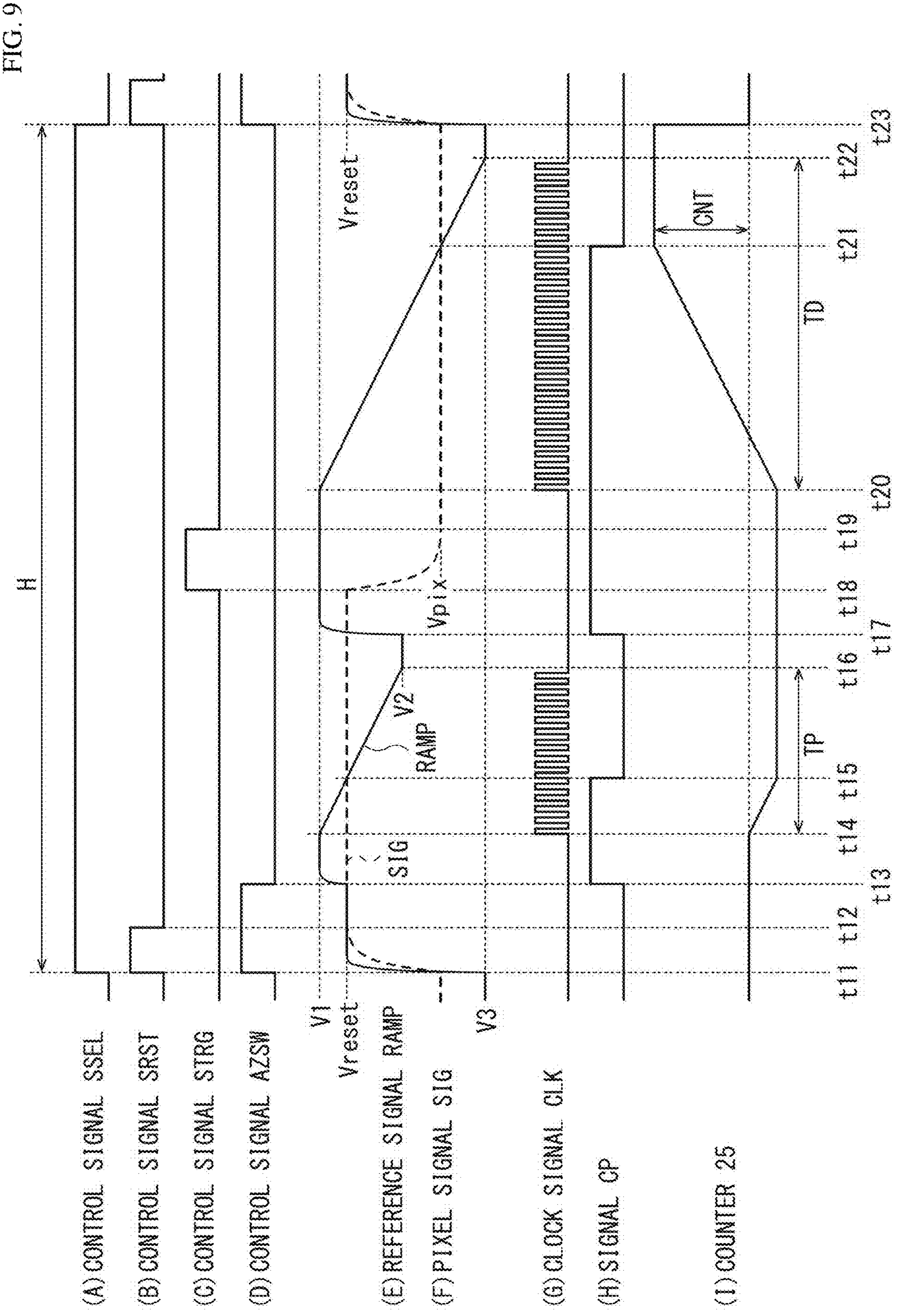
FIG. 9 is a timing waveform diagram illustrating an operation example of the imaging device illustrated in FIG. 1.

FIG. 9 illustrates an operation example of the readout driving D2, where (A) illustrates a waveform of the control signal SSEL, (B) illustrates a waveform of the control signal SRST, (C) illustrates a waveform of the control signal STRG, (D) illustrates a waveform of the control signal AZSW, (E) illustrates a waveform of the reference signal RAMP, (F) illustrates a waveform of the pixel signal SIG, (G) illustrates a waveform of the clock signal CLK, (H) illustrates a waveform of the signal CP, and (I) illustrates the counting operation of the counter 25. In (E) and (F) of FIG. 9, the waveforms of the reference signal RAMP and the pixel signal SIG are illustrated using the same voltage axis. In this description, the waveform of the reference signal RAMP illustrated in (E) of FIG. 9 is a waveform of a voltage supplied to an input terminal of the comparison circuit 24 via the capacitor 23, and the waveform of the pixel signal SIG illustrated in (F) of FIG. 9 is a waveform of a voltage supplied to the input terminal of the comparison circuit 24 via the capacitor 22.

First, at a timing t11, a horizontal period H starts. This causes the driving section 12 to change a voltage of the control signal SSEL from a low level to a high level ((A) of FIG. 9). This turns on the transistor SEL in the light-receiving pixel P, and the light-receiving pixel P is electrically coupled to the signal line VSL. At this timing t11, the driving section 12 changes a voltage of the control signal SRST from the low level to the high level ((B) of FIG. 9). This turns on the transistor RST in the light-receiving pixel P, and the voltage of the floating diffusion FD is set to the power supply voltage VDDH (a reset operation). Thereafter, the light-receiving pixel P outputs a voltage corresponding to the voltage of the floating diffusion FD at this time. At this timing t11, the imaging controller 18 changes a voltage of the control signal AZSW from the low level to the high level ((D) of FIG. 9). This causes the comparison circuit 24 of the AD converter ADC to set voltages of the capacitors 22 and 23, thereby setting the operating point. In this way, a voltage of the pixel signal SIG is set to the reset voltage Vreset, and the voltage of the reference signal RAMP is set to the same voltage as the voltage (the reset voltage Vreset) of the pixel signal SIG ((E) and (F) of FIG. 9).

Thereafter, at a timing t12, the driving section 12 changes the voltage of the control signal SRST from the high level to the low level ((B) of FIG. 9). This turns off the transistor RST in the light-receiving pixel P, and the reset operation ends.

Next, at a timing t13, the imaging controller 18 changes the voltage of the control signal AZSW from the high level to the low level ((D) of FIG. 9). This causes the comparison circuit 24 to finish setting the operating point.

In addition, at this timing t13, the reference signal generator 16 sets the voltage of the reference signal RAMP to a voltage V1 ((E) of FIG. 9). This makes the voltage of the reference signal RAMP higher than the voltage of the pixel signal SIG. Thus, the comparison circuit 24 changes a voltage of the signal CP from the low level to the high level ((H) of FIG. 9).

Thereafter, in a period from a timing t14 to a timing t16 (the P-phase period TP), the AD converter ADC performs AD conversion on the basis of the pixel signal SIG. Specifically, first, at the timing t14, the reference signal generator 16 starts to decrease the voltage of the reference signal RAMP from the voltage V1 at a predetermined change rate ((E) of FIG. 9). Further, at this timing t14, the imaging controller 18 starts to generate the clock signal CLK ((G) of FIG. 9). The counter 25 of the AD converter ADC performs a counting operation with down-counting to thereby count the pulses of this clock signal CLK ((I) of FIG. 9).

Thereafter, at a timing t15, the voltage of the reference signal RAMP falls below the voltage (the reset voltage Vreset) of the pixel signal SIG ((E) and (F) of FIG. 9). This causes the comparison circuit 24 of the AD converter ADC to change the voltage of the signal CP from the high level to the low level ((H) of FIG. 9). The counter 25 of the AD converter ADC stops the counting operation on the basis of this transition of the signal CP ((I) of FIG. 9). A change amount of the count value from the timing t14 to the timing 115 is a value corresponding to the reset voltage Vreset.

Next, at a timing t16, the imaging controller 18 stops generating the clock signal CLK at the end of the P-phase period TP ((G) of FIG. 9). Further, the reference signal generator 16 sets the voltage of the reference signal RAMP to a voltage V2 at this timing t16 ((E) of FIG. 9).

Next, at a timing t17, the imaging controller 18 sets the voltage of the reference signal RAMP to the voltage V1 ((E) of FIG. 9). This makes the voltage of the reference signal RAMP higher than the voltage of the pixel signal SIG (the reset voltage Vreset). Thus, the comparison circuit 24 changes the voltage of the signal CP from the low level to the high level ((H) of FIG. 9).

Next, at a timing t18, the driving section 12 changes a voltage of the control signal STRG from the low level to the high level ((C) of FIG. 9). This turns on the transistor TRG in the light-receiving pixel P, and the electric charge generated by the photodiode PD is transferred to the floating diffusion FD (an electric charge transfer operation). Thereafter, the light-receiving pixel P outputs a voltage corresponding to the voltage of the floating diffusion FD at this time. In this way, the voltage of the pixel signal SIG is set to the pixel voltage Vpix ((F) of FIG. 9).

Thereafter, at a timing t19, the driving section 12 changes the voltage of the control signal STRG from the high level to the low level ((C) of FIG. 9). This turns off the transistor TRG in the light-receiving pixel P, and the electric charge transfer operation ends.

Thereafter, in a period from a timing t20 to a timing t22 (the D-phase period TD), the AD converter ADC performs AD conversion on the basis of the signal SIG. Specifically, first, at the timing t20, the reference signal generator 16 starts to decrease the voltage of the reference signal RAMP from the voltage V1 at a predetermined change rate ((E) of FIG. 9). Further, at this timing t20, the imaging controller 18 starts to generate the clock signal CLK ((G) of FIG. 9). The counter 25 of the AD converter ADC performs a counting operation with up-counting to thereby count the pulses of this clock signal CLK ((I) of FIG. 9).

Thereafter, at a timing t21, the voltage of the reference signal RAMP falls below the voltage (the pixel voltage Vpix) of the pixel signal SIG ((E) and (F) of FIG. 9). This causes the comparison circuit 24 of the AD converter ADC to change the voltage of the signal CP from the high level to the low level ((H) of FIG. 9). The counter 25 of the AD converter ADC stops the counting operation on the basis of this transition of the signal CP ((I) of FIG. 9). A change amount of the count value from the timing t20 to the timing 121 is a value corresponding to the pixel voltage Vpix. The latch 26 holds the count value (the count value CNT) of the counter 25 at this time. The count value CNT corresponds to a difference voltage between the pixel voltage Vpix and the reset voltage Vreset, and corresponds to the amount of light received by the light-receiving pixel P in the exposure period T. Thus, the imaging device 1 obtains a pixel value corresponding to the amount of light received by the light-receiving pixel P with use of the principle of correlated double sampling (CDS; Correlated double sampling).

Next, at the timing t22, the imaging controller 18 stops generating the clock signal CLK at the end of the D-phase period TD ((G) of FIG. 9). Further, at this timing 122, the reference signal generator 16 sets the voltage of the reference signal RAMP to a voltage V3 ((E) of FIG. 9). Thereafter, in a period from this timing t22 or a later timing, the readout section 20 supplies the count value CNT held by the latch 26 as the image data DT0 to the signal processor 17.

Next, at a timing t23, the driving section 12 changes the voltage of the control signal SSEL from the high level to the low level ((A) of FIG. 9). This turns off the transistor SEL in the light-receiving pixel P, and the light-receiving pixel P is electrically decoupled from the signal line VSL. Thereafter, the counter 25 resets the count value ((I) of FIG. 9).

In this way, the readout section 20 supplies the image data DT0 including the count value CNT to the signal processor 17. The signal processor 17 performs predetermined processing on the basis of, for example, the count value CNT included in the image data DT0 to thereby generate the image data DT.

The noise correction section 15 generates the noise correction signal corresponding to the noise superimposed on the power supply voltage VDDH and the noise correction signal corresponding to the noise superimposed on the voltage VRL, and superimposes these noise correction signals on the reference signal RAMP generated by the reference signal generator 16. The following describes operations of the noise correction section 50 and the noise correction section 40 in detail.

(About Operation of Noise Correction Section 50)

Figure 10A:
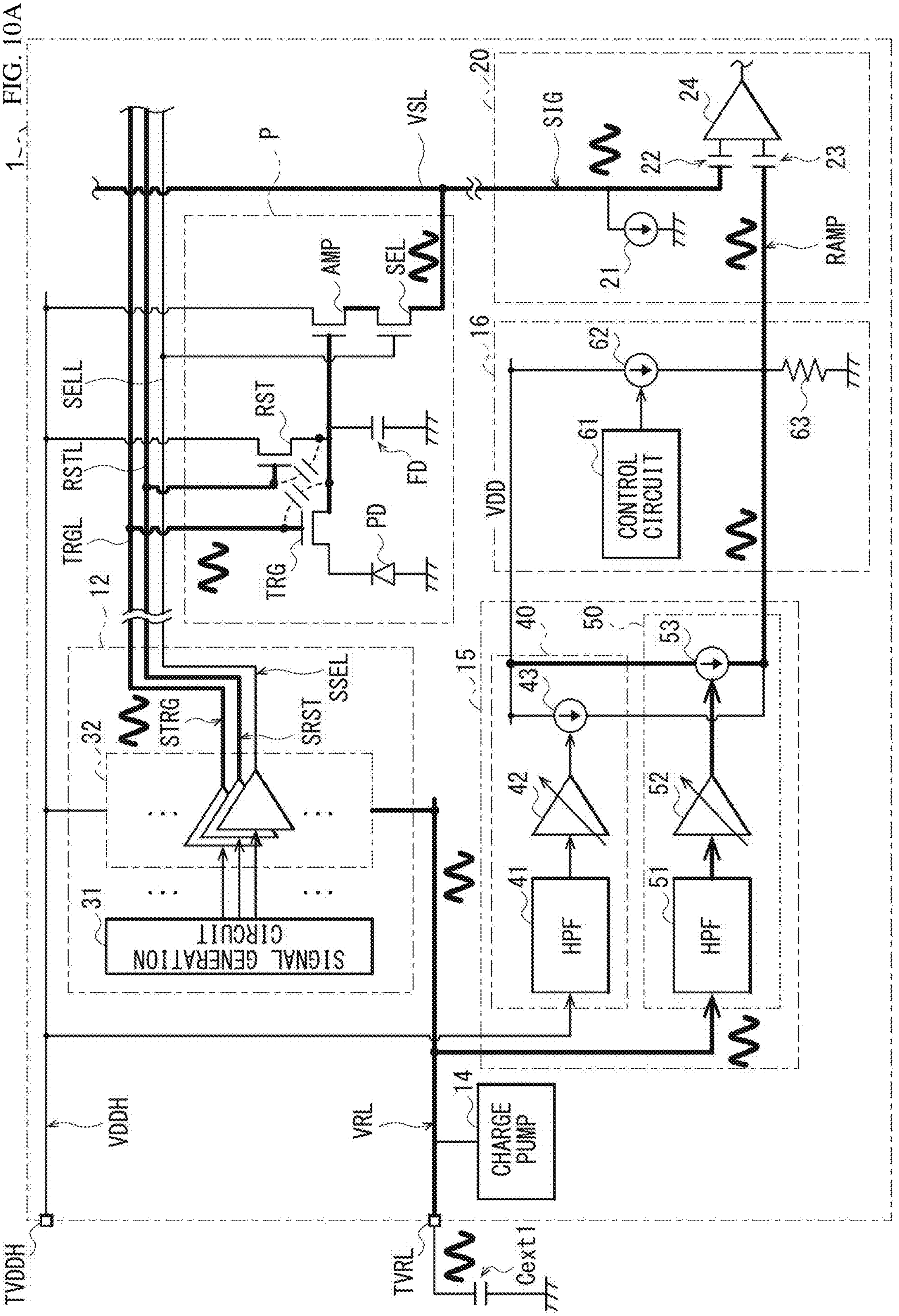
FIG. 10A is an explanatory diagram illustrating an example of noise correction according to the first embodiment.
Figure 10B:
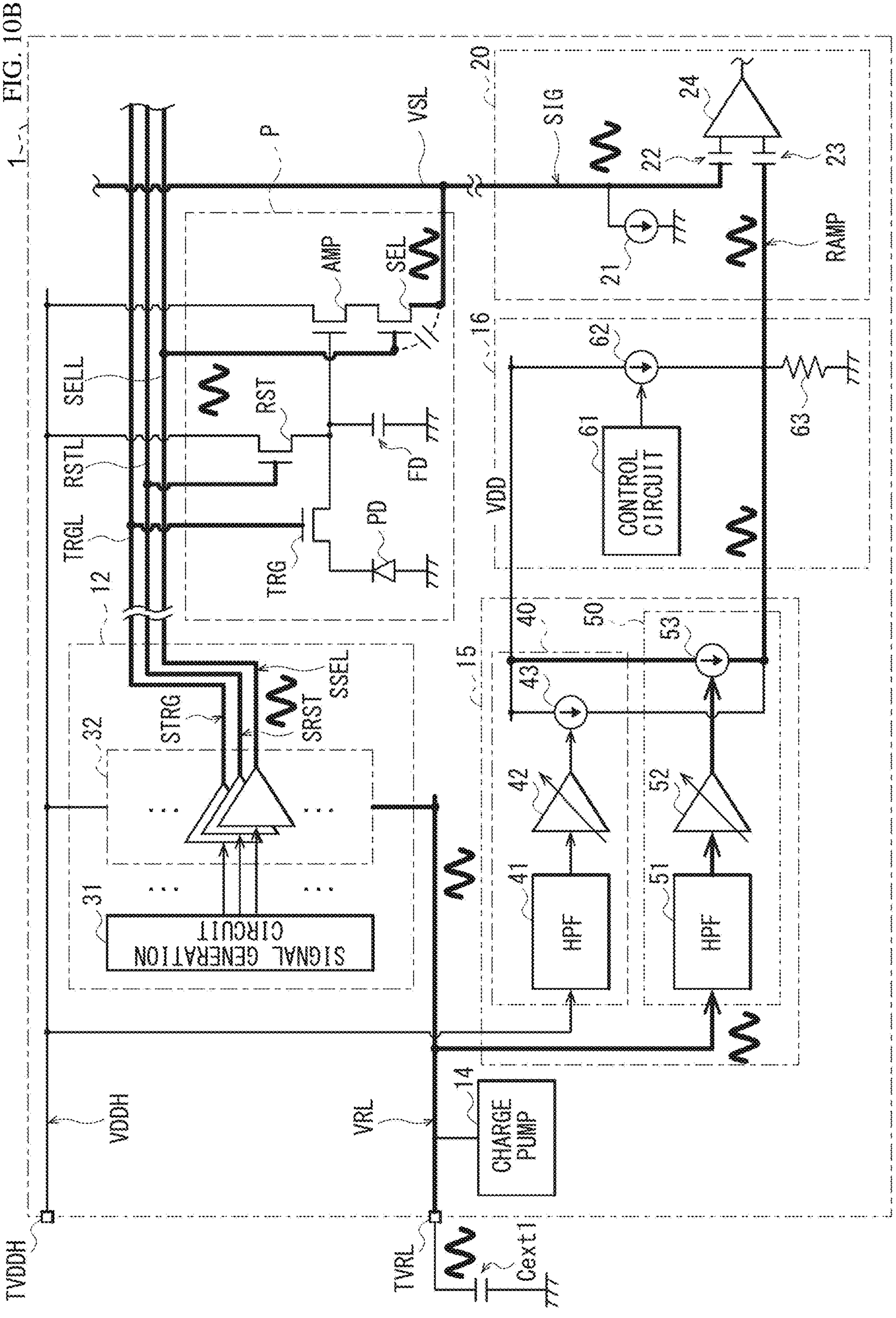
FIG. 10B is another explanatory diagram illustrating an example of noise correction according to the first embodiment.

FIGS. 10A and 10B each illustrate an operation example of the noise correction section 50. FIG. 10A illustrates an operation related to the light-receiving pixel P to be subjected to the readout driving D2. FIG. 10B illustrates an operation of the light-receiving pixel P not to be subjected to the readout driving D2. In FIGS. 10A and 10B, a wiring illustrated by a thick line represents a wiring related to the operation of the noise correction section 50.

The capacitor Cext1 is provided outside the imaging device 1, which easily causes noise to be superimposed on the voltage VRL. The driver section 32 of the driving section 12 uses this voltage VRL as a low-level voltage to thereby generate the control signals STRG, SRST, and SSEL. Accordingly, for example, in a case where the control signal STRG is at the low level, noise is superimposed on this control signal STRG. The same applies to the control signals SRST and SSEL.

As illustrated in FIG. 9, the driving section 12 supplies the control signal SSEL that is at the high level and the control signals STRG and SRST that are at the low level to the light-receiving pixel P to be subjected to the readout driving D2 in the P-phase period TP and the D-phase period TD. Accordingly, as illustrated in FIG. 10A, in this light-receiving pixel P, noise corresponding to the noise of the voltage VRL is superimposed on the gate voltages of the transistors TRG and RST. The control signal STRG is at the low level; therefore, the transistor TRG is off. However, noise at the gate of the transistor TRG is transmitted to the gate of the transistor AMP via a parasitic capacitance between the gate and drain of the transistor TRG. Likewise, the control signal SRST is at the low level; therefore, the transistor RST is off. However, noise at the gate of the transistor RST is transmitted to the gate of the transistor AMP via a parasitic capacitance between the gate and source of the transistor RST. The control signal SSEL is at the high level; therefore, the transistor SEL is on, and the transistor AMP and the constant current source 21 operate as a source follower. Accordingly, the noise at the gate of the transistor AMP is transmitted to the signal line VSL. In this way, this light-receiving pixel P outputs the pixel signal SIG with the superimposed noise.

Meanwhile, the driving section 12 supplies the control signals STRG, SRST, and SSEL that are at the low level to the light-receiving pixel P not to be subjected to the readout driving D2. Accordingly, as illustrated in FIG. 10B, in this light-receiving pixel P, the noise corresponding to the noise of the voltage VRL is superimposed on the gate voltages of the transistors TRG, RST, and SEL. For example, the control signal SSEL is at the low level; therefore, the transistor SEL is off. However, noise at the gate of the transistor SEL is transmitted to the source of the transistor SEL via a parasitic capacitance between the gate and source of the transistor SEL. Accordingly, this light-receiving pixel P causes the noise to be superimposed on the pixel signal SIG generated by the light-receiving pixel P to be subjected to the readout driving D2.

In this way, the pixel signal SIG with the superimposed noise is supplied to the comparison circuit 24 via the capacitor 22.

As illustrated in FIGS. 10A and 10B, the noise correction section 50 generates the noise correction signal corresponding to the noise superimposed on the voltage VRL, and superimposes the noise correction signal on the reference signal RAMP generated by the reference signal generator 16. The reference signal RAMP with the superimposed noise correction signal is supplied to the comparison circuit 24 via the capacitor 23. The amplitude and the phase of the noise correction signal are adjusted in advance so as to be substantially the same as an amplitude and a phase of the noise superimposed on the pixel signal SIG. This causes the noise and the noise correction signal that are in phase with each other to be respectively superimposed on the pixel signal SIG and the reference signal RAMP that are to be supplied to the comparison circuit 24. The comparison circuit 24 operates on the basis of a difference between the supplied two signals. This reduces an influence of the noise on the signal CP generated by the comparison circuit 24. As a result, in the imaging device 1, it is possible to reduce an influence of the noise of the voltage VRL on a captured image.

In other words, for example, in a case where the noise correction section 50 is not provided, the noise correction signal is not superimposed on the reference signal RAMP. Accordingly, the comparison circuit 24 performs a comparison operation on the basis of the pixel signal SIG with the superimposed noise, and the reference signal RAMP with no superimposed noise correction signal. As result, in the imaging device 1, the noise of the voltage VRL affects the captured image. For example, the same noise is superimposed on the pixel signals SIG outputted from a plurality of light-receiving pixels P belonging to the pixel line L; therefore, lateral streaks corresponding to the noise may appear on the captured image. Meanwhile, the imaging device 1 includes the noise correction section 50; therefore, the noise and the noise correction signal that are in phase with each other are respectively superimposed on the pixel signal SIG and the reference signal RAMP that are to be supplied to the comparison circuit 24. Thus, in the imaging device 1, it is possible to reduce the influence of the noise of the voltage VRL on the captured image.

FIG. 11 illustrates an example of a characteristic of a noise rejection ratio regarding the noise superimposed on the voltage VRL, where a horizontal axis represents a frequency, and a vertical axis represents the noise rejection ratio. The noise rejection ratio is a ratio between the voltage of the noise superimposed on the voltage VRL, and a value converted from a pixel value in the captured image to a voltage, and indicates that the smaller the value, the more noise is rejected. In FIG. 11, a solid line represents a characteristic of the imaging device 1 according to the present embodiment, and a broken line represents a characteristic of an imaging device not including the noise correction section 50. The imaging device 1 includes the noise correction section 50, which makes it possible to reduce the noise rejection ratio.

(About Operation of Noise Correction Section 40)

Figure 12:
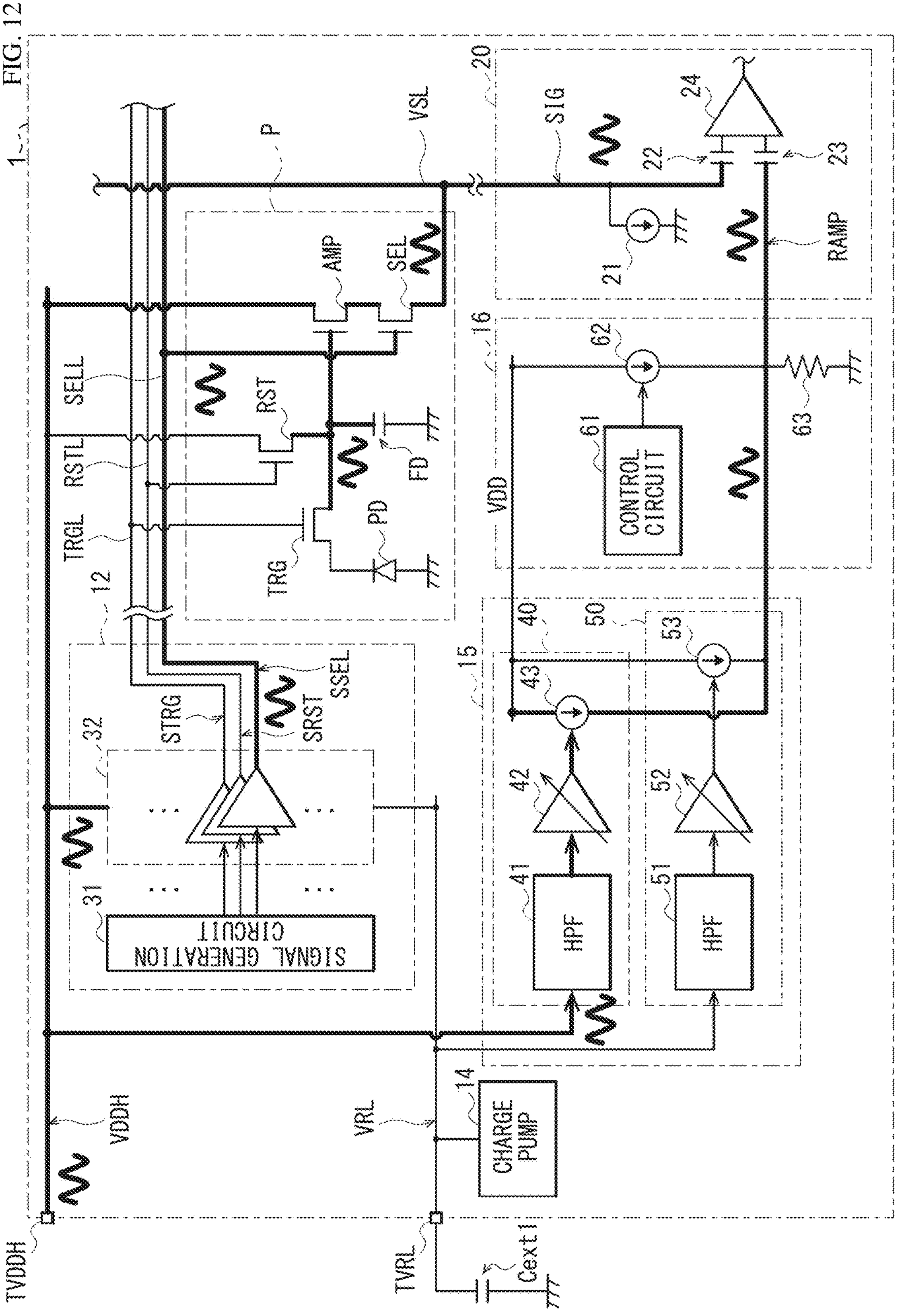
FIG. 12 is another explanatory diagram illustrating an example of noise correction according to the first embodiment.

FIG. 12 illustrates an operation example of the noise correction section 40. FIG. 12 illustrates an operation related to the light-receiving pixel P to be subjected to the readout driving D2. In FIG. 12, a wiring illustrated by a thick line represents a wiring related to the operation of the noise correction section 40.

The power supply voltage VDDH is supplied from outside the imaging device 1, which easily causes noise to be superimposed on the power supply voltage VDDH. The driver section 32 of the driving section 12 uses this power supply voltage VDDH as a high-level voltage to thereby generate the control signals STRG, SRST, and SSEL. Accordingly, for example, in a case where the control signal SSEL is at the high level, noise is superimposed on this control signal SSEL.

As illustrated in FIG. 9, the driving section 12 supplies the control signal SSEL that is at the high level and the control signals STRG and SRST that are at the low level to the light-receiving pixel P to be subjected to the readout driving D2 in the P-phase period TP and the D-phase period TD. Accordingly, as illustrated in FIG. 12, in this light-receiving pixel P, noise corresponding to the noise of the power supply voltage VDDH is superimposed on the gate voltage of the transistor SEL. In addition, in the light-receiving pixel P, the noise corresponding to the noise of the power supply voltage VDDH is superimposed on the gate voltage of the transistor AMP via a parasitic capacitance between a power supply wiring of the power supply voltage VDDH1 and the floating diffusion FD. The control signal SSEL is at the high level; therefore, the transistor SEL is on, and the transistor AMP and the constant current source 21 operate as a source follower. In addition, the power supply voltage VDDH with the superimposed noise is supplied to the drain of the transistor AMP. Accordingly, this light-receiving pixel P outputs the pixel signal SIG with the superimposed noise.

The noise correction section 40 generates the noise correction signal corresponding to the noise superimposed on the power supply voltage VDDH, and superimposes the noise correction signal on the reference signal RAMP generated by the reference signal generator 16. The reference signal RAMP with the superimposed noise correction signal is supplied to the comparison circuit 24 via the capacitor 23. The amplitude and the phase of the noise correction signal are adjusted in advance so as to be substantially the same as the amplitude and the phase of the noise superimposed on the pixel signal SIG. This causes the noise and the noise correction signal that are in phase with each other to be respectively superimposed on the pixel signal SIG and the reference signal RAMP that are to be supplied to the comparison circuit 24. As a result, in the imaging device 1, it is possible to reduce an influence of the noise of the power supply voltage VDDH on the captured image. The characteristic of the noise rejection ratio is similar to that in the case of the noise correction section 50 (FIG. 11).

In this way, the imaging device 1 includes the light-receiving pixels P, the terminal TVRL, the charge pump 14, the driving section 12, the reference signal generator 16, the noise correction section 50, the comparison circuit 24, and the signal processor 17. The light-receiving pixels P are each configured to generate the pixel signal SIG including the pixel voltage Vpix corresponding to the amount of received light. The terminal TVRL is coupled to the capacitor Cext1. The charge pump 14 is configured to generate a voltage at the terminal TVRL. The driving section 12 is configured to drive the light-receiving pixels P on the basis of the voltage at the terminal TVRL. The reference signal generator 16 is configured to generate the reference signal RAMP having a ramp waveform. The noise correction section 50 is configured to generate a noise correction signal corresponding to the voltage at the terminal TVRL, and is configured to superimpose the noise correction signal on the reference signal RAMP. The comparison circuit 24 is configured to perform comparison between the pixel signal SIG and the reference signal RAMP with the superimposed noise correction signal. The signal processor 17 is configured to calculate a pixel value on the basis of a result of the comparison by the comparison circuit 24. Accordingly, for example, the noise and the noise correction signal that are in phase with each other are respectively superimposed on the pixel signal SIG and the reference signal RAMP that are to be supplied to the comparison circuit 24. This makes it possible to reduce the influence of the noise of the voltage VRL on the captured image.

Effects

As described above, in the present embodiment, provided are light-receiving pixels, a terminal coupled to a capacitor, a charge pump, a driving section, a reference signal generator, a noise correction section, a comparison circuit, and a signal processor. The light-receiving pixels are each configured to generate a pixel signal including a pixel voltage corresponding to a light amount. The charge pump is configured to generate a voltage at the terminal. The driving section is configured to drive the light-receiving pixels on the basis of the voltage at the terminal. The reference signal generator is configured to generate a reference signal having a ramp waveform. The noise correction section is configured to generate a noise correction signal corresponding to the voltage at the terminal, and is configured to superimpose the noise correction signal on the reference signal. The comparison circuit is configured to perform comparison between the pixel signal and the reference signal with the superimposed noise correction signal. The signal processor is configured to calculate a pixel value on the basis of a result of the comparison by the comparison circuit. Accordingly, it is possible to reduce an influence of noise.

2. Second Embodiment

Next, description is given of an imaging device 2 according to a second embodiment. The present embodiment is an example in which the circuit configuration of the light-receiving pixel P is changed and two external capacitors are provided. It is to be noted that components substantially the same as those of the imaging device 1 according to the first embodiment described above are denoted by the same reference numerals, and description thereof is omitted as appropriate.

Figure 13:
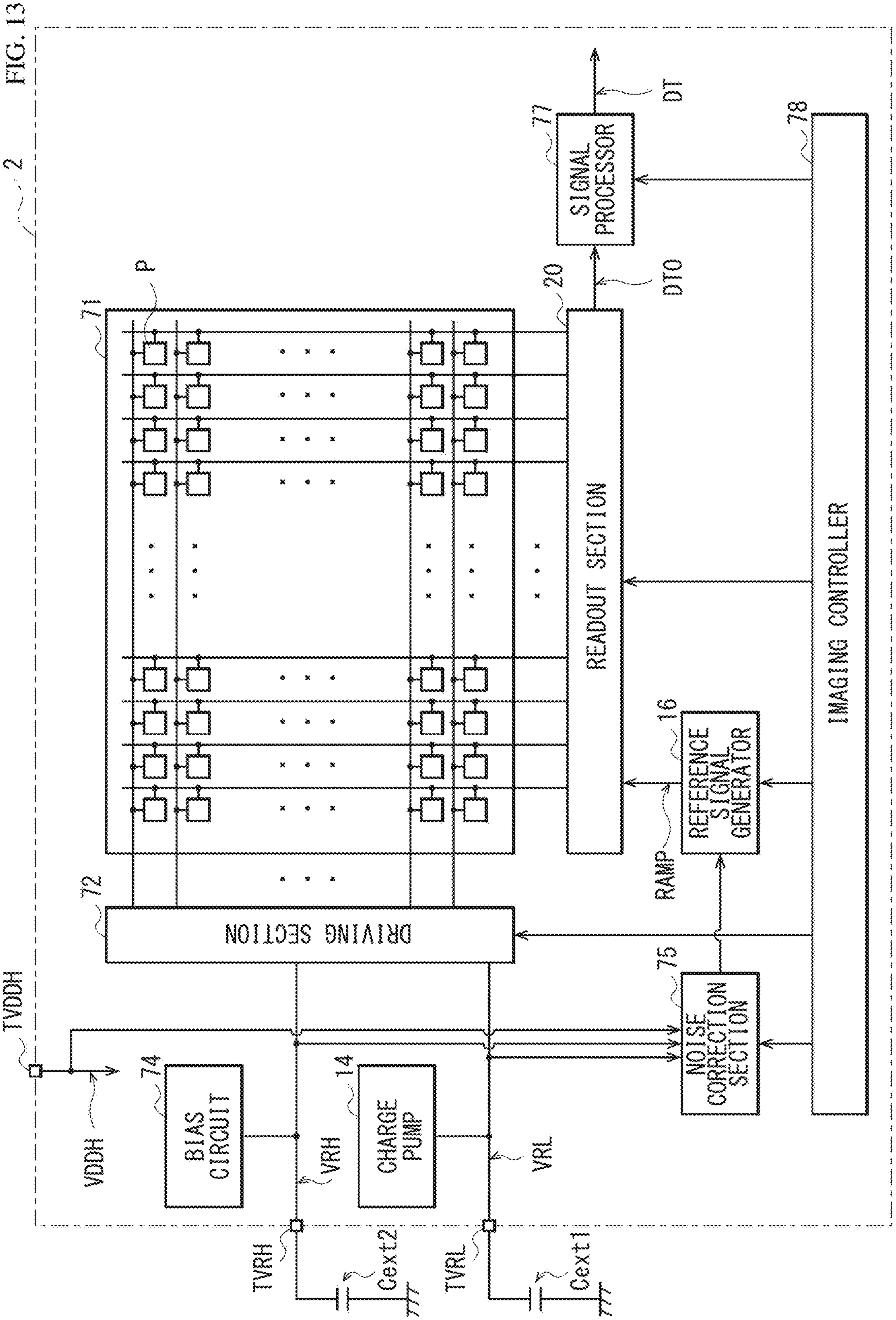
FIG. 13 is a block diagram illustrating a configuration example of an imaging device according to a second embodiment.

FIG. 13 illustrates a configuration example of the imaging device 2 according to the second embodiment. The imaging device 2 includes a pixel array 71, a driving section 72, a bias circuit 74, a noise correction section 75, a signal processor 77, and an imaging controller 78.

The pixel array 71 includes a plurality of light-receiving pixels P arranged in a matrix, as with the pixel array 11 according to the first embodiment described above.

Figure 14:
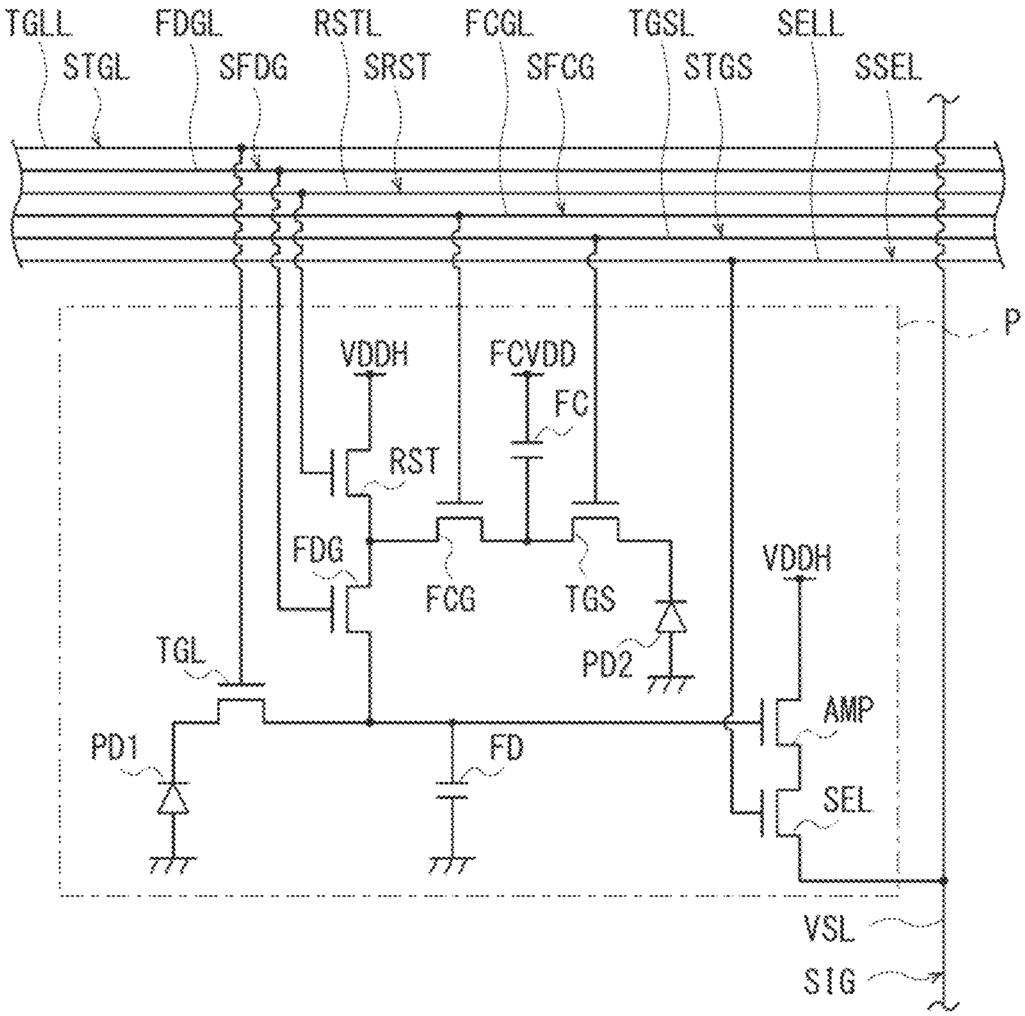
FIG. 14 is a circuit diagram illustrating a configuration example of a light-receiving pixel illustrated in FIG. 13.

FIG. 14 illustrates a configuration example of the light-receiving pixel P. The pixel array 71 includes a plurality of control lines TGLL, a plurality of control lines FDGL, the plurality of control lines RSTL, a plurality of control lines FCGL, a plurality of control lines TGSL, the plurality of control lines SELL, and the plurality of signal lines VSL. The control lines TGLL extend in the horizontal direction (in the lateral direction in FIG. 14), and each have one end coupled to the driving section 72. The driving section 72 supplies a control signal STGL to the control lines TGLL. The control lines FDGL extend in the horizontal direction, and each have one end coupled to the driving section 72. The driving section 72 supplies a control signal SFDG to the control lines FDGL. The control lines RSTL extend in the horizontal direction, and each have one end coupled to the driving section 72. The driving section 72 supplies the control signal SRST to the control lines RSTL. The control lines FCGL extend in the horizontal direction, and each have one end coupled to the driving section 72. The driving section 72 supplies a control signal SFCG to the control lines FCGL. The control lines TGSL extend in the horizontal direction, and each have one end coupled to the driving section 72. The driving section 72 supplies a control signal STGS to the control lines TGSL. The control lines SELL extend in the horizontal direction, and each have one end coupled to the driving section 72. The driving section 72 supplies the control signal SSEL to the control lines SELL. The light-receiving pixels P each include a photodiode PD1, a transistor TGL, a photodiode PD2, a transistor TGS, a capacitor FC, transistors FCG, RST, and FDG, the floating diffusion FD, and the transistors AMP and SEL. The transistors TGL, TGS, FCG, RST, FDG, AMP, and SEL are N-type MOS transistors in this example.

The photodiode PD1 is a photoelectric conversion element that generates electric charge in an amount corresponding to the amount of received light and accumulates the electric charge therein. A light reception region where the photodiode PD1 is able to receive light is wider than a light reception region where the photodiode PD2 is able to receive light. The photodiode PD1 has an anode grounded and a cathode coupled to a source of the transistor TGL.

The transistor TGL has a gate coupled to the control line TGLL, the source coupled to the cathode of the photodiode PD1, and a drain coupled to the floating diffusion FD.

The photodiode PD2 is a photoelectric conversion element that generates electric charge in an amount corresponding to the amount of received light and accumulates the electric charge therein. The light reception region where the photodiode PD2 is able to receive light is narrower than the light reception region where the photodiode PD1 is able to receive light. The photodiode PD2 has an anode grounded and a cathode coupled to a source of the transistor TGS.

The transistor TGS has a gate coupled to the control line TGSL, the source coupled to the cathode of the photodiode PD2, and a drain coupled to the capacitor FC and a source of the transistor FCG.

The capacitor FC has one end coupled to the drain of the transistor TGS and the source of the transistor FCG, and another end to be supplied with a control signal FCVDD. The transistor FCG has a gate coupled to the control line FCGL, a source coupled to the one end of the capacitor FC and the drain of the transistor TGS, and a drain coupled to the source of the transistor RST and a drain of the transistor FDG.

The transistor RST has a gate coupled to the control line RSTL, a drain to be supplied with the power supply voltage VDDH, and a source coupled to drains of the transistors FCG and FDG.

The transistor FDG has a gate coupled to the control line FDGL, the drain coupled to the source of the transistor RST and the drain of the transistor FCG, and a source coupled to the floating diffusion FD.

The floating diffusion FD is configured to accumulate the electric charge supplied from the photodiodes PD1 and PD2. The floating diffusion FD is configured using, for example, a diffusion layer formed on a surface of a semiconductor substrate. In FIG. 14, the floating diffusion FD is indicated by a capacitor symbol.

With this configuration, in the light-receiving pixel P, the transistor SEL is turned on, on the basis of the control signal SSEL to thereby electrically couple the light-receiving pixel P to the signal line VSL. As a result, the transistor AMP is coupled to the constant current source 21 of the readout section 20, and operates as what is called a source follower. Thereafter, the light-receiving pixel P outputs, as the pixel signal SIG, a pixel voltage VP corresponding to a voltage in the floating diffusion FD to the signal line VSL. Specifically, as described later, the light-receiving pixel P sequentially outputs eight pixel voltages VP (VP1 to VP8) in eight periods (conversion periods T1 to T8) within what is called a horizontal period H.

Figure 15:
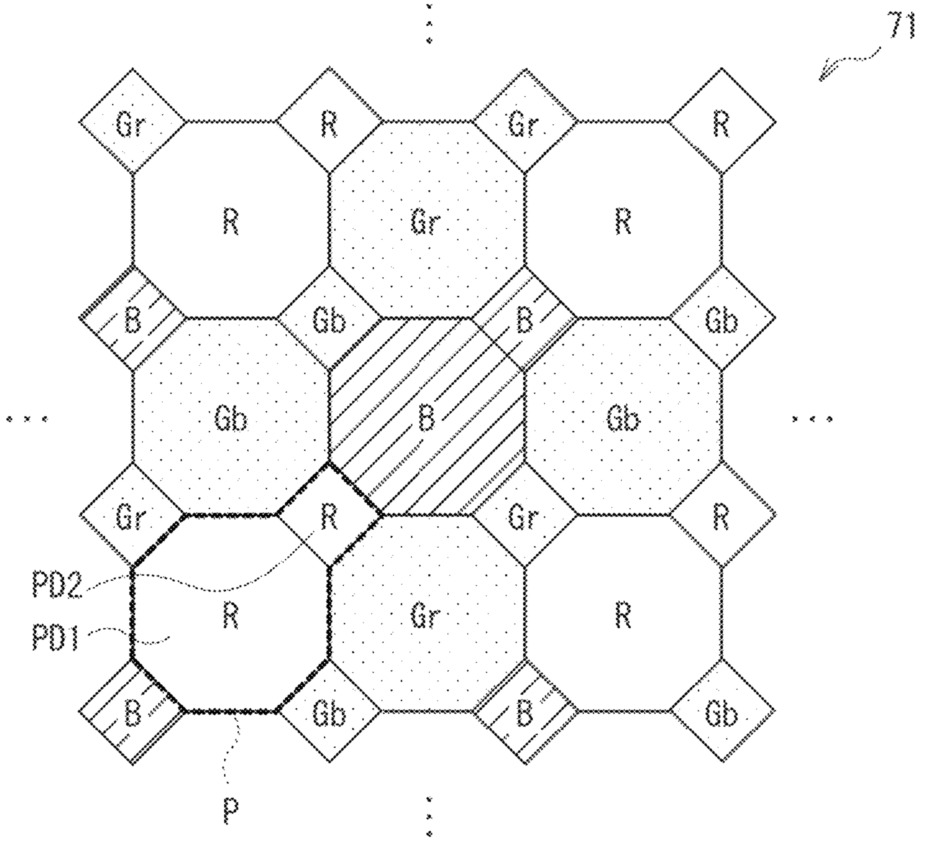
FIG. 15 is an explanatory diagram illustrating an example of arrangement of the light-receiving pixels in a pixel array illustrated in FIG. 13.

FIG. 15 illustrates an example of arrangement of photodiodes PD1 and PD2 in the pixel array 71. In FIG. 15, "R" represents a red color filter, Gr" and "Gb" each represent a green color filter, and "B" represents a blue color filter. In each light-receiving pixel P, the photodiode PD2 is formed at the upper right of the photodiode PD1. Color filters of the same color are formed on two photodiodes PD1 and PD2 in each light-receiving pixel P. In this example, the photodiode PD1 has an octagonal shape, and the photodiode PD2 has a tetragonal shape. As illustrated in this drawing, the light reception region where photodiode PD1 is able to receive light is wider than the light reception region where the photodiode PD2 is able to receive light.

The driving section 72 (FIG. 13) is configured to sequentially drive the plurality of light-receiving pixels P in the pixel array 71 in units of the pixel lines L on the basis of an instruction from the imaging controller 78. Specifically, the driving section 72 supplies each of a plurality of control signals STGL to a corresponding one of the plurality of control lines TGLL in the pixel array 71, supplies each of a plurality of control signals SFDG to a corresponding one of the plurality of control lines FDGL in the pixel array 71, supplies each of the plurality of control signals SRST to a corresponding one of the plurality of control lines RSTL in the pixel array 71, supplies each of a plurality of control signals SFCG to a corresponding one of the plurality of control lines FCGL in the pixel array 71, supplies each of a plurality of control signals STGS to a corresponding one of the plurality of control lines TGSL in the pixel array 71, and supplies each of the plurality of control signals SSEL to a corresponding one of the plurality of control lines SELL in the pixel array 71, thereby driving the plurality of light-receiving pixels P in the pixel array 71 in units of the pixel lines L. In addition, the driving section 72 supplies the control signal FCVDD to the plurality of light-receiving pixels P in the pixel array 71. The driving section 72 is supplied with the voltage VRL generated by the charge pump 14 and is supplied with a voltage VRH generated by the bias circuit 74.

The bias circuit 74 is configured to generate the voltage VRH. The bias circuit 74 is coupled to a capacitor Cext2 provided outside the imaging device 2 via a terminal TVRH. In this example, the voltage VRH is a voltage higher than the ground voltage and lower than the power supply voltage VDDH. It is to be noted that the bias circuit 74 is provided in this example, but this is not limitative. Instead of the bias circuit 74, for example, a charge pump may be provided. In this case, for example, it is possible to set the voltage VRH to a voltage higher than the power supply voltage VDDH.

The noise correction section 75 is configured to generate a noise correction signal corresponding to noise superimposed on the power supply voltage VDDH, a noise correction signal corresponding to noise superimposed on the voltage VRL, and a noise correction signal corresponding to noise superimposed on the voltage VRH on the basis of an instruction from the imaging controller 78 and superimpose these noise correction signals on the reference signal RAMP generated by the reference signal generator 16.

Figure 16:
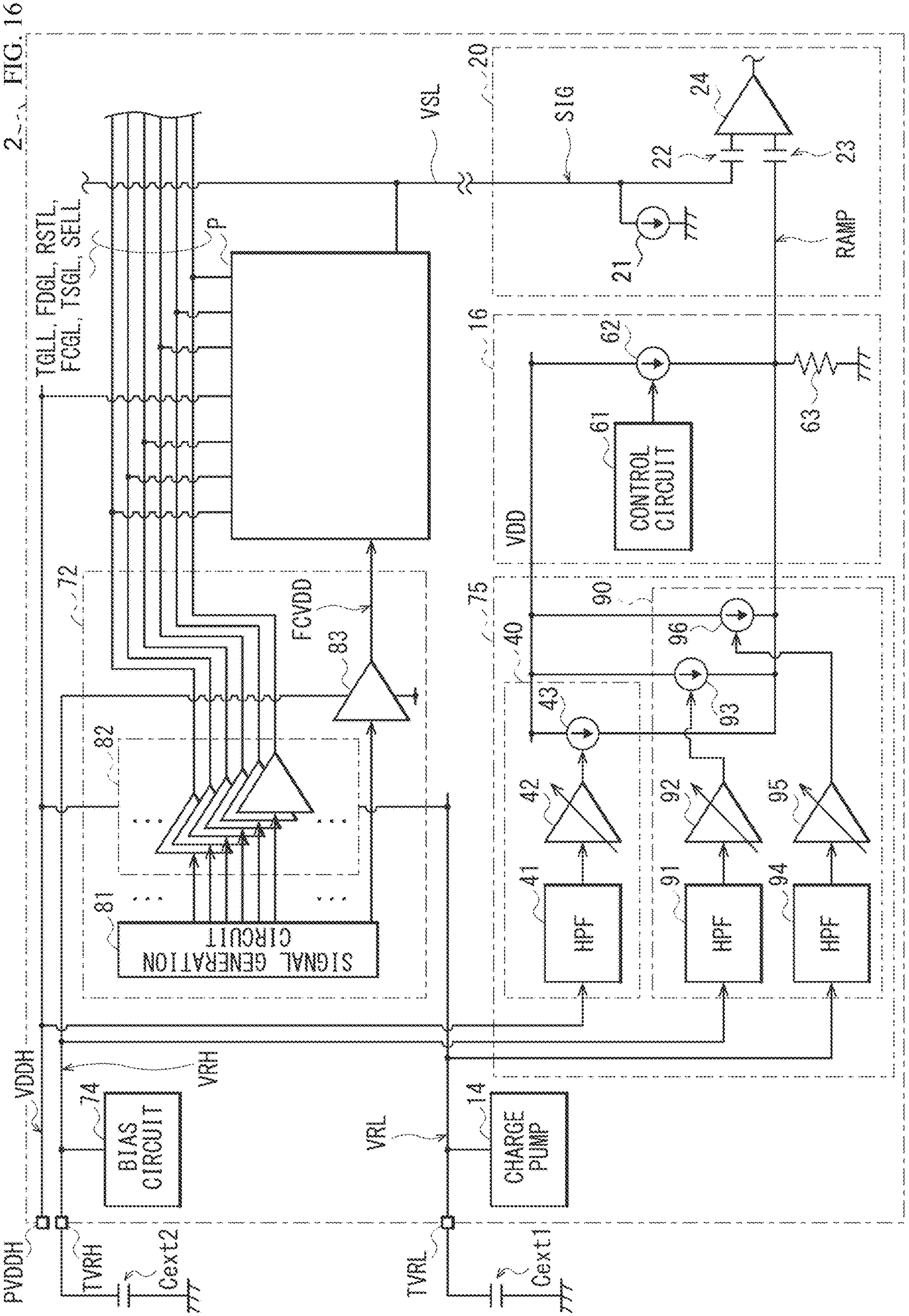
FIG. 16 is a block diagram illustrating a specific example of a noise correction section illustrated in FIG. 13.

FIG. 16 illustrates specific examples of the driving section 72 and the noise correction section 75. It is to be noted that FIG. 16 illustrates the light-receiving pixel P, the charge pump 14, the bias circuit 74, the reference signal generator 16, and the readout section 20, in addition to the driving section 72 and the noise correction section 75.

The driving section 72 includes a signal generation circuit 81, a driver section 82, and a driver 83. The signal generation circuit 81 configured using, for example, a shift register, and is configured to generate a plurality of control signals as sources of the plurality of control signals STGL, a plurality of control signals as sources of the plurality of control signals SFDG, a plurality of control signals as sources of the plurality of control signals SRST, a plurality of control signals as sources of the plurality of control signals SFCG, a plurality of control signals as sources of the plurality of control signals STSG, and a plurality of control signals as sources of the plurality of control signals SSEL. In addition, the signal generation circuit 81 also has a function of generating a control signal as a source of a control signal SFCVDD. The driver section 82 includes a plurality of drivers. The driver section 82 is configured to generate the plurality of control signals STGL, the plurality of control signals SFDG, the plurality of control signals SRST, the plurality of control signals SFCG, the plurality of control signals STSG, and the plurality of control signals SSEL on the basis of the plurality of control signals supplied from the signal generation circuit 81. The driver section 82 is supplied with the power supply voltage VDDH and the voltage VRL. The driver section 82 uses the power supply voltage VDDH as a high-level voltage and uses the voltage VRL as a low-level voltage to thereby generate the control signals STGL, SFDG, SRST, SFCG, STGS, and SSEL. The driver 83 is configured to generate the control signal SFCVDD on the basis of the control signal supplied from the signal generation circuit 81. The driver 83 is supplied with the voltage VRH. The driver 83 outputs this voltage VRH as the control signal SFCVDD.

The noise correction section 75 includes a noise correction section 90. The noise correction section 90 is configured to generate the noise correction signal corresponding to the noise superimposed on the voltage VRL, and the noise correction signal corresponding to the noise superimposed on the voltage VRH. The noise correction section 90 includes a high-pass filter (HPF) 91, an adjustment circuit 92, a current source 93, a high-pass filter (HPF) 94, an adjustment circuit 95, and a current source 96. The high-pass filter 91 is configured to supply, to the adjustment circuit 92, a noise signal superimposed on the voltage VRH. The noise signal is an alternating-current component. The adjustment circuit 92 is configured to adjust an amplitude and a phase of the noise signal supplied from the high-pass filter 91 on the basis of an instruction from the imaging controller 78.

The current source 93 is configured to convert the noise signal adjusted by the adjustment circuit 92 into a current signal. The high-pass filter 94 is configured to supply, to the adjustment circuit 95, a noise signal superimposed on the voltage VRL. The noise signal is an alternating-current component. The adjustment circuit 95 is configured to adjust au amplitude and a phase of the noise signal supplied from the high-pass filter 94 on the basis of an instruction from the imaging controller 78. The current source 96 is configured to convert the noise signal adjusted by the adjustment circuit 95 into a current signal. Each of the high-pass filters 91 and 94 has a circuit configuration similar to that of the high-pass filter 51 (FIG. 6) according to the first embodiment described above. Each of the adjustment circuits 92 and 95 has a circuit configuration similar to that of the adjustment circuit 52 (FIG. 6) according to the first embodiment described above. Each of the current sources 93 and 96 has a circuit configuration similar to that of the current source 53 (FIG. 6) according to the first embodiment described above.

The signal processor 77 (FIG. 13) is configured to generate the image data DT by performing predetermined image processing, on the basis of the image data DT0 and an instruction from the imaging controller 78.

The imaging controller 78 is configured to supply control signals to the driving section 72, the readout section 20, the noise correction section 75, the reference signal generator 16, and the signal processor 77 and control the operations of these circuits, thereby controlling an operation of the imaging device 2.

Here, the terminal TVRH corresponds to a specific example of a "second coupling terminal" in one embodiment of the present disclosure. The capacitor Cext2 corresponds to a specific example of a "second external capacitor" in one embodiment of the present disclosure. The bias circuit 74 corresponds to a specific example of a "second voltage generation circuit" in one embodiment of the present disclosure. The imaging controller 78 corresponds to a specific example of a "control circuit" in one embodiment of the present disclosure.

Next, the readout driving D2 is described in detail. The following focuses on a certain light-receiving pixel P and describes operations of this light-receiving pixel P and the AD converter ADC coupled to the light-receiving pixel P.

Figure 17:
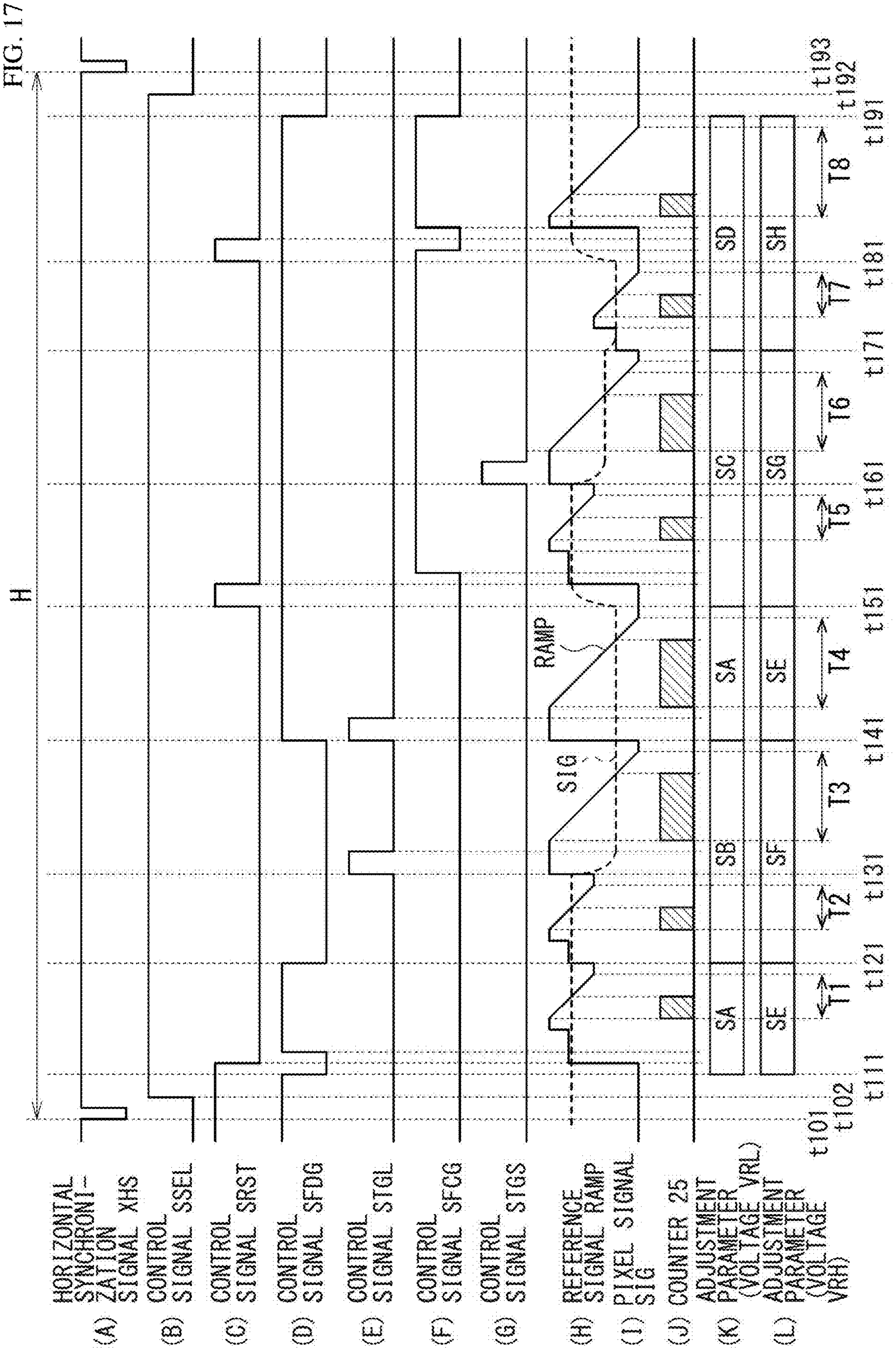
FIG. 17 is a timing waveform diagram illustrating an operation example of the imaging device illustrated in FIG. 13.
Figure 18A:
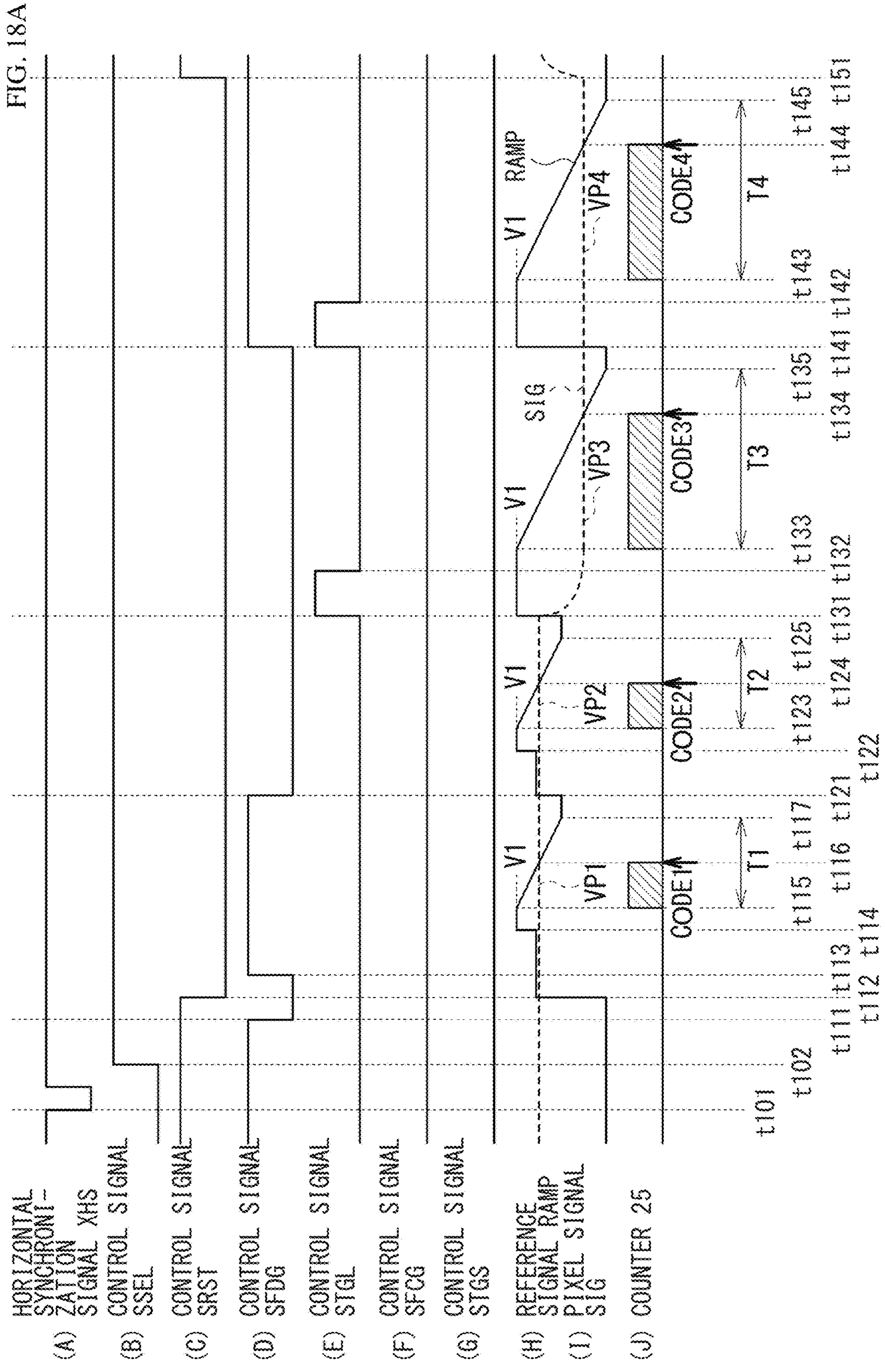
FIG. 18A is another timing waveform diagram illustrating an operation example of the imaging device illustrated in FIG. 13.
Figure 18B:
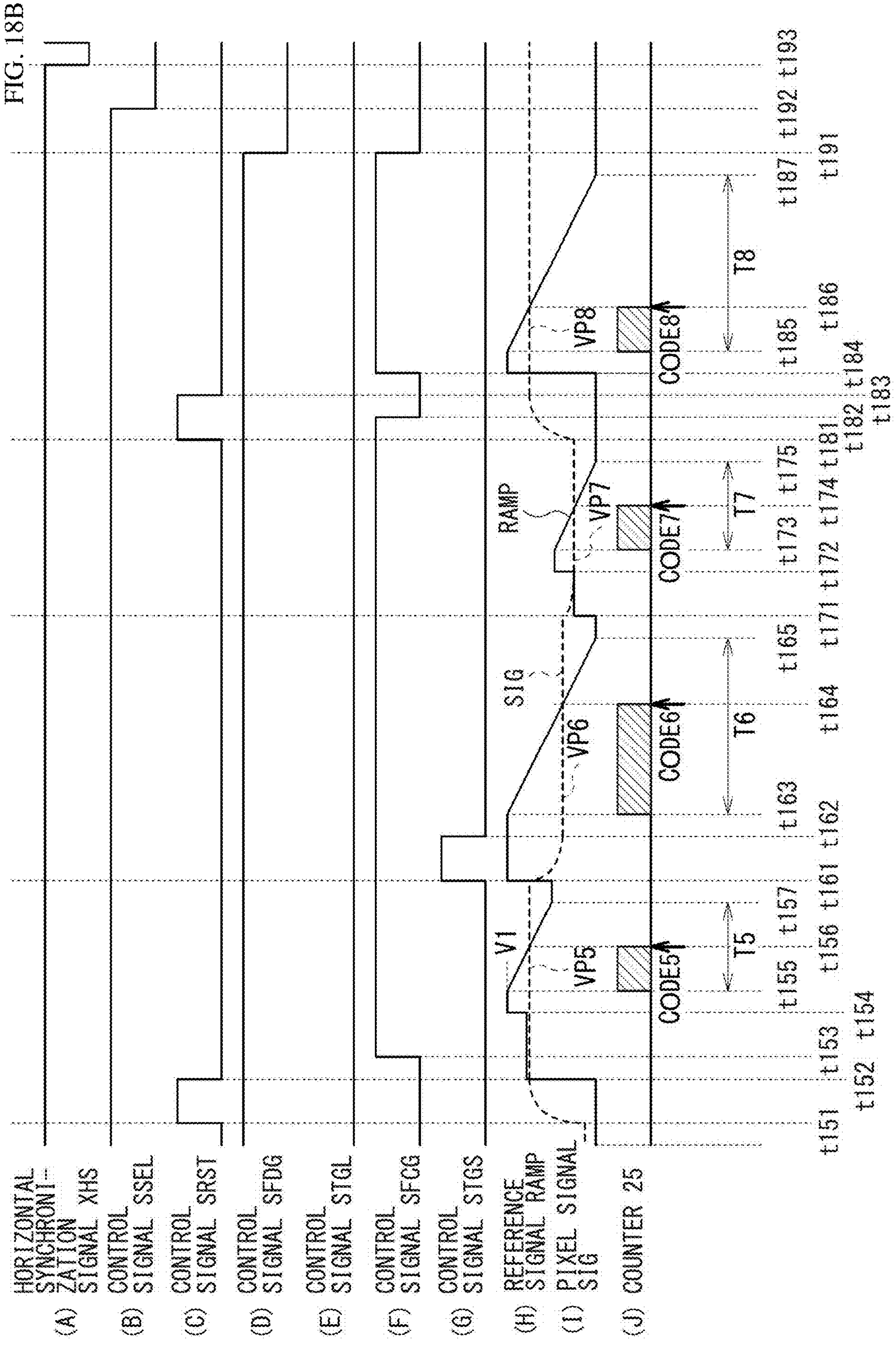
FIG. 18B is another timing waveform diagram illustrating an operation example of the imaging device illustrated in FIG. 13.

FIGS. 17, 18A, and 18B each illustrate an operation example of the imaging device 2. In FIGS. 17, 18A, and 18B, (A) illustrates a waveform of a horizontal synchronization signal XHS, (B) illustrates the waveform of the control signal SSEL, (C) illustrates the waveform of the control signal SRST, (D) illustrates a waveform of the control signal SFDG, (E) illustrates a waveform of the control signal STGL, (F) illustrates a waveform of the control signal SFCG, (G) illustrates a waveform of the control signal STGS, (H) illustrates the waveform of the reference signal RAMP, (I) illustrates the waveform of the pixel signal SIG, and (J) illustrates the operation of the counter 25. In FIG. 17, (K) illustrates an adjustment parameter related to the voltage VRL in the noise correction section 90, and (L) illustrates an adjustment parameter related to the voltage VRH in the noise correction section 90. FIG. 18A illustrates a first-half operation of the operation illustrated in FIG. 17, and FIG. 18B illustrates a second-half operation of the operation illustrated in FIG. 17. In (J) of FIG. 17, (J) of FIG. 18A, and (J) of FIG. 18B, a diagonally shaded part indicates that the counter 25 is performing the counting operation.

FIGS. 19A to 19C each illustrate a state of the light-receiving pixel P. In FIGS. 19A to 19C, each of the transistors TGL, RST, FDG, TGS, FCG, and SEL is illustrated using a switch corresponding to an operation state of the transistor.

First, at a timing t101, the horizontal period H starts. This causes the driving section 72 to change the voltage of the control signal SSEL from the low level to the high level at a timing t102 ((B) of FIG. 18A). This turns on the transistor SEL in the light-receiving pixel P, and the light-receiving pixel P is electrically coupled to the signal line VSL.

In a period up to a timing t111, the driving section 72 changes both the control signals SRST and SFDG to the high level ((C) and (D) of FIG. 18A). This turns on both the transistors RST and FDG in the light-receiving pixel P, and the voltage of the floating diffusion FD is set to the power supply voltage VDDH and the floating diffusion FD is reset.

(Operation from Timing t111 to Timing t121)

Next, at the timing t111, the driving section 72 changes a voltage of the control signal SFDG from the high level to the low level ((D) of FIG. 18A). This turns off the transistor FDG in the light-receiving pixel P. Next, at a timing t112, the driving section 72 changes the voltage of the control signal SRST from the high level to the low level ((C) of FIG. 18A). This turns off the transistor RST in the light-receiving pixel P. Next, at a timing t113, the driving section 72 changes the voltage of the control signal SFDG from the low level to the high level ((D) of FIG. 18A). This turns on the transistor FDG in the light-receiving pixel P. In addition, the comparison circuit 24 sets the operating point on the basis of the control signal AZSW in a period from the timing t113 to a timing t114.

Next, at the timing t114, the comparison circuit 24 finishes setting the operating point. Thereafter, at this timing t114, the reference signal generator 16 changes the voltage of the reference signal RAMP to the voltage V1 ((H) of FIG. 18A).

Thus, as illustrated in FIG. 19A, in the light-receiving pixel P, the transistors FDG and SEL are turned on, and all of other transistors are turned off. The transistor FDG is on, which causes the floating diffusion FD and the transistor FDG to constitute a combined capacitance. The combined capacitance functions as a conversion capacitance that converts electric charge into a voltage in the light-receiving pixel P. In the light-receiving pixel P, the transistor FDG is on in such a manner; therefore, the conversion capacitance in the light-receiving pixel P is large. Accordingly, conversion efficiency from the electric charge to the voltage is low. This conversion capacitance holds electric charge when the floating diffusion FD is reset in a period up to the timing t112. The light-receiving pixel P outputs the pixel voltage VP (the pixel voltage VP1) corresponding to the voltage in the floating diffusion FD at this time.

Next, in a period from a timing t115 to a timing t117 (a conversion period T1), the AD converter ADC performs AD conversion on the basis of the pixel voltage VP1. Specifically, at the timing t115, the imaging controller 78 starts to generate the clock signal CLK, and at the same time, the reference signal generator 16 starts to decrease the voltage of the reference signal RAMP from the voltage V1 at a predetermined change rate ((H) of FIG. 18A). Accordingly, the counter 25 of the AD converter ADC starts the counting operation ((J) of FIG. 18A). In this example, the counter 25 consistently performs the counting operation with up-counting to thereby count the pulses of this clock signal CLK.

Thereafter, at a timing t116, the volage of the reference signal RAMP falls below the voltage (the pixel voltage VP1) of the pixel signal SIG ((H) and (I) of FIG. 18A). Accordingly, the comparison circuit 24 of the AD converter ADC changes the voltage of the signal CP, and as a result, the counter 25 stops the counting operation ((J) of FIG. 18A). The count value CNT of the counter 25 when the counting operation stops corresponds to the pixel voltage VP1. The AD converter ADC performs AD conversion on the basis of the pixel voltage VP1 in such a manner, and the latch 26 of the AD converter ADC holds the count value CNT of the counter 25, and outputs the held count value CNT as a digital code CODE1 ((J) of FIG. 18A).

Thereafter, at the timing t117, the imaging controller 78 stops generating the clock signal CLK at the end of the conversion period T1, the reference signal generator 16 stops change of the voltage of the reference signal RAMP ((H) of FIG. 18A), and the counter 25 resets the count value CNT.

(Operation from Timing t121 to Timing t131)

Next, at a timing t121, the driving section 72 changes the voltage of the control signal SFDG from the high level to the low level ((D) of FIG. 18A). This turns off the transistor FDG in the light-receiving pixel P. In addition, the comparison circuit 24 sets the operating point on the basis of the control signal AZSW in a period from the timing t121 to a timing t122.

Next, at the timing t122, the comparison circuit 24 finishes setting the operating point. At this timing t122, the reference signal generator 16 then changes the voltage of the reference signal RAMP to the voltage V1 ((H) of FIG. 18A).

Thus, as illustrated in FIG. 19B, in the light-receiving pixel P, the transistor SEL is turned on, and all of other transistors are turned off. In the light-receiving pixel P, the transistor FDG is off in such a manner; therefore, the conversion capacitance in the light-receiving pixel P is small. Accordingly, the conversion efficiency from the electric charge to the voltage is high. This conversion capacitance holds electric charge when the floating diffusion FD is reset in the period up to the timing t112. The light-receiving pixel P outputs the pixel voltage VP (the pixel voltage VP2) corresponding to the voltage in the floating diffusion FD at this time.

Next, in a period from a timing t123 to a timing t125 (a conversion period T2), the AD converter ADC performs AD conversion on the basis of the pixel voltage VP2. This operation is similar to the operation in the conversion period T1. The AD converter ADC performs AD conversion on the basis of the pixel voltage VP2, and the latch 26 of the AD converter ADC holds the count value CNT of the counter 25, and outputs the held count value CNT as a digital code CODE2 ((J) of FIG. 18A).

(Operation from Timing t131 to Timing t141)

Next, at a timing t131, the driving section 72 changes a voltage of the control signal STGL from the low level to the high level ((E) of FIG. 18A). This turns on the transistor TGL in the light-receiving pixel P, and the electric charge generated by the photodiode PD1 is transferred to the floating diffusion FD. In addition, at this timing 1131, the reference signal generator 16 changes the voltage of the reference signal RAMP to the voltage V1 ((H) of FIG. 18A).

Next, at a timing t132, the driving section 72 changes the voltage of the control signal STGL from the high level to the low level ((E) of FIG. 18A). This turns off the transistor TGL in the light-receiving pixel P.

Thus, as illustrated in FIG. 19B, in the light-receiving pixel P, the transistor FDG is off; therefore, the conversion capacitance in the light-receiving pixel P is small. Accordingly, conversion efficiency from the electric charge to the voltage is high. This conversion capacitance holds the electric charge transferred from the photodiode PD1 from the timing t131 to the timing t132. The light-receiving pixel P outputs the pixel voltage VP (the pixel voltage VP3) corresponding to the voltage in the floating diffusion FD at this time.

Next, in a period from a timing t133 to a timing t135 (a conversion period T3), AD converter ADC performs AD conversion on the basis of the pixel voltage VP3. This operation is similar to the operation in the conversion period T1. The AD converter ADC performs AD conversion on the basis of the pixel voltage VP3, and the latch 26 of the AD converter ADC holds the count value CNT of the counter 25, and outputs the held count value CNT as a digital code CODE3 ((J) of FIG. 18A). The digital code CODE3 corresponds to the digital code CODE2 obtained when the conversion efficiency is equally high (the conversion period T2).

(Operation from Timing t141 to Timing t151)

Next, at a timing t141, the driving section 72 changes the voltage of the control signal SFDG from the low level to the high level, and changes the voltage of the control signal STGL from the low level to the high level ((D) and (E) of FIG. 18A). This turns on both the transistors FDG and TGL in the light-receiving pixel P. In addition, at this timing t141, the reference signal generator 16 changes the voltage of the reference signal RAMP to the voltage V1 ((H) of FIG. 18A). Next, the driving section 72 changes the voltage of the control signal STGL from the high level to the low level at a timing t142 ((E) of FIG. 18A). This turns off the transistor TGL in the light-receiving pixel P.

Thus, as illustrated in FIG. 19A, in the light-receiving pixel P, the transistor FDG is on, which causes the floating diffusion FD and the transistor FDG to constitute a combined capacitance (a conversion capacitance). Accordingly, the conversion capacitance in the light-receiving pixel P is large; therefore, the conversion efficiency from the electric charge to the voltage is low. This conversion capacitance holds the electric charge transferred from the photodiode PD1 from the timing t131 to the timing t132 and from the timing t141 to the timing t142. The light-receiving pixel P outputs the pixel voltage VP (the pixel voltage VP4) corresponding to the voltage in the floating diffusion FD at this time.

Next, in a period from a timing t143 to a timing t145 (a conversion period T4), the AD converter ADC performs AD conversion on the basis of the pixel voltage VP4. This operation is similar to the operation in the conversion period T1. The AD converter ADC performs AD conversion on the basis of the pixel voltage VP4, and the latch 26 of the AD converter ADC holds the count value CNT of the counter 25, and outputs the held count value CNT as a digital code CODE4 ((J) of FIG. 18A). The digital code CODE4 corresponds to the digital code CODE1 obtained when the conversion efficiency is equally low (the conversion period T1).

(Operation from Timing t151 to Timing t161)

Next, at a timing t151, the driving section 72 changes the voltage of the control signal SRST from the low level to the high level ((C) of FIG. 18B). This turns on the transistor RST A in the light-receiving pixel P. The transistor FDG is on, which causes the volage of the floating diffusion FD to be set to the power supply voltage VDDH, and causes the floating diffusion FD to be reset. Next, at a timing t152, the driving section 72 changes the voltage of the control signal SRST from the high level to the low level ((C) of FIG. 18B). This turns off the transistor RST in the light-receiving pixel P. In addition, at this timing t152, the reference signal generator 16 changes the voltage of the reference signal RAMP to the voltage V1 ((H) of FIG. 18B).

Next, at a timing t153, the driving section 72 changes the voltage of the control signal SFCG from the low level to the high level ((F) of FIG. 18B). This turns on the transistor FCG in the light-receiving pixel P. In addition, the comparison circuit 24 sets the operating point on the basis of the control signal AZSW in a period from the timing (153 to a timing t154.

Next, at the timing t154, the comparison circuit 24 finishes setting the operating point. In addition, at this timing t154, the reference signal generator 16 changes the voltage of the reference signal RAMP to the voltage V1 ((H) of FIG. 18A).

Thus, as illustrated in FIG. 19C, in the light-receiving pixel P, the transistors FDG, FCG, and SEL are turned on, and all of other transistors are turned off. The transistors FDG and FCG are both on, which causes the floating diffusion FD, the transistors FDG and FCG, and the capacitor FC to constitute a combined capacitance (a conversion capacitance). The conversion capacitance holds electric charge generated by the photodiode PD2 before the timing t153 and supplied to and accumulated in the capacitor FC via the transistor TGS. The light-receiving pixel P outputs the pixel voltage VP (the pixel voltage VP5) corresponding to the voltage in the floating diffusion FD at this time.

Next, in a period from a timing t155 to a timing t157 (a conversion period T5), the AD converter ADC performs AD conversion on the basis of the pixel voltage VP5. This operation is similar to the operation in the conversion period T1. The AD converter ADC performs AD conversion on the basis of the pixel voltage VP5, and the latch 26 of the AD converter ADC holds the count value CNT of the counter 25, and outputs the held count value CNT as a digital code CODE5 ((J) of FIG. 18B).

(Operation from Timing t161 to Timing t171)

Thereafter, at a timing t161, the driving section 72 changes the voltage of the control signal STGS from the low level to the high level ((G) of FIG. 18B). This turns on the transistor TGS in the light-receiving pixel P. Accordingly, the electric charge generated by the photodiode PD2 is transferred to the floating diffusion FD and the capacitor FC. In addition, at this timing t161, the reference signal generator 16 changes the voltage of the reference signal RAMP to the voltage V1 ((H) of FIG. 18B).

Next, at a timing t162, the driving section 72 changes the voltage of the control signal STGS from the high level to the low level ((G) of FIG. 18B). This turns off the transistor TGS in the light-receiving pixel P.

Thus, as illustrated in FIG. 19C, in the light-receiving pixel P, the transistors FDG and FCG are both on, which causes the floating diffusion FD, the transistors FDG and FCG, and the capacitor FC to constitute a combined capacitance (a conversion capacitance). This conversion capacitance holds the electric charge transferred from the photodiode PD2 from the timing t161 to the timing t162, in addition to the electric charge generated by the photodiode PD2 before the timing t53 and supplied to and accumulated in the capacitor FC via the transistor TGS. The light-receiving pixel P outputs the pixel voltage VP (the pixel voltage VP6) corresponding to the voltage in the floating diffusion FD at this time.

Next, in a period from a timing t163 to a timing t165 (a conversion period T6), the AD converter ADC performs AD conversion on the basis of the pixel voltage VP6. This operation is similar to the operation in the conversion period T1. The AD converter ADC performs AD conversion on the basis of the pixel voltage VP6, and the latch 26 of the AD converter ADC holds the count value CNT of the counter 25, and outputs the held count value CNT as a digital code CODE6 ((J) of FIG. 18B). This digital code CODE6 corresponds to the digital code CODE5 obtained when the floating diffusion FD, the transistors FDG and FCG, and the capacitor FC constitute the combined capacitance.

(Operation from Timing t171 to Timing t181)

Thereafter, the comparison circuit 24 sets the operating point on the basis of the control signal AZSW in a period from a timing t171 to a timing t172.

Next, at the timing t172, the comparison circuit 24 finishes setting the operating point, and electrically decouples a positive input terminal and a negative input terminal from each other. In addition, at the timing t72, the reference signal generator 16 changes the voltage of the reference signal RAMP to the voltage V1 ((H) of FIG. 18B).

Thus, as illustrated in FIG. 19C, in the light-receiving pixel P, the transistors FDG and FCG are both on, which causes the floating diffusion FD, the transistors FDG and FCG, and the capacitor FC to constitute a combined capacitance (a conversion capacitance). The conversion capacitance holds the electric charge transferred from the photodiode PD2 from the timing t161 to the timing t162, in addition to the electric charge generated by the photodiode PD2 before the timing t153 and supplied to and accumulated in the capacitor FC via the transistor TGS. The light-receiving pixel P outputs the pixel voltage VP (the pixel voltage VP7) corresponding to the voltage in the floating diffusion FD at this time.

Next, in a period from a timing t173 to a timing t175 (a conversion period T7), the AD converter ADC performs AD conversion on the basis of the pixel voltage VP7. This operation is similar to the operation in the conversion period T1. The AD converter ADC performs AD conversion on the basis of the pixel voltage VP7, and the latch 26 of the AD converter ADC holds the count value CNT of the counter 25, and outputs the held count value CNT as a digital code CODE7 ((J) of FIG. 18B).

(Operation from Timing t181 to Timing t191)

Next, at a timing t181, the driving section 72 changes the voltage of the control signal SRST from the low level to the high level ((C) of FIG. 18B). This turns on the transistor RST in the light-receiving pixel P. The transistors FDG and FCG are on, which causes the voltage of the floating diffusion FD and the voltage of the capacitor FC to be set to the power supply voltage VDDH, and causes the floating diffusion FD and the capacitor FC to be reset.

Next, at a timing t182, the driving section 72 changes the voltage of the control signal SFCG from the high level to the low level ((F) of FIG. 18B). This turns off the transistor FCG in the light-receiving pixel P.

Next, at a timing t183, the driving section 72 changes the voltage of the control signal SRST from the high level to the low level ((C) of FIG. 18B). This turns off the transistor RST in the light-receiving pixel P.

Next, at a timing t184, the driving section 72 changes the voltage of the control signal SFCG from the low level to the high level ((F) of FIG. 18B). This turns on the transistor FCG in the light-receiving pixel P. In addition, at this timing t184, the reference signal generator 16 changes the voltage of the reference signal RAMP to the voltage V1 ((H) of FIG. 18B).

Thus, as illustrated in FIG. 19C, in the light-receiving pixel P, the transistors FDG and FCG are both on, which causes the floating diffusion FD, the transistors FDG and FCG, and the capacitor FC to constitute a combined capacitance (a conversion capacitance). This conversion capacitance holds electric charge when the floating diffusion FD and the capacitor FC are reset from the timing t181 to the timing t182. The light-receiving pixel P outputs the pixel voltage VP (the pixel voltage VP8) corresponding to the voltage in the floating diffusion FD at this time.

Next, in a period from a timing t185 to a timing t187 (a conversion period T8), the AD converter ADC performs AD conversion on the basis of the pixel voltage VP8. This operation is similar to the operation in the conversion period T1. The AD converter ADC performs AD conversion on the basis of the pixel voltage VP8, and the latch 26 of the AD converter ADC holds the count value CNT of the counter 25, and outputs the held count value CNT as a digital code CODE8 ((I) of FIG. 18B). This digital code CODE8 corresponds to the digital code CODE7 obtained when the floating diffusion FD, the transistors FDG and FCG, and the capacitor FC constitute the combined capacitance.

Next, at a timing t191, the driving section 72 changes the voltage of the control signal SFDG from the high level to the low level, and changes the voltage of the control signal SFCG from the high level to the low level ((D) and (F) of FIG. 18B). This turns off the transistors FDG and FCG in the light-receiving pixel P.

Thereafter, at a timing t192, the driving section 72 changes the voltage of the control signal SSEL from the high level to the low level ((B) of FIG. 18B). This turns off the transistor SEL in the light-receiving pixel P, and the light-receiving pixel P is electrically decoupled from the signal line VSL.

Next, description is given of image synthesis processing in the signal processor 77. The signal processor 77 generates four images PIC (images PIC1 to PIC4) on the basis of the digital codes CODE supplied from the readout section 20. Thereafter, the signal processor 77 synthesizes the four images PIC to generate one captured image PICA.

Figure 20:
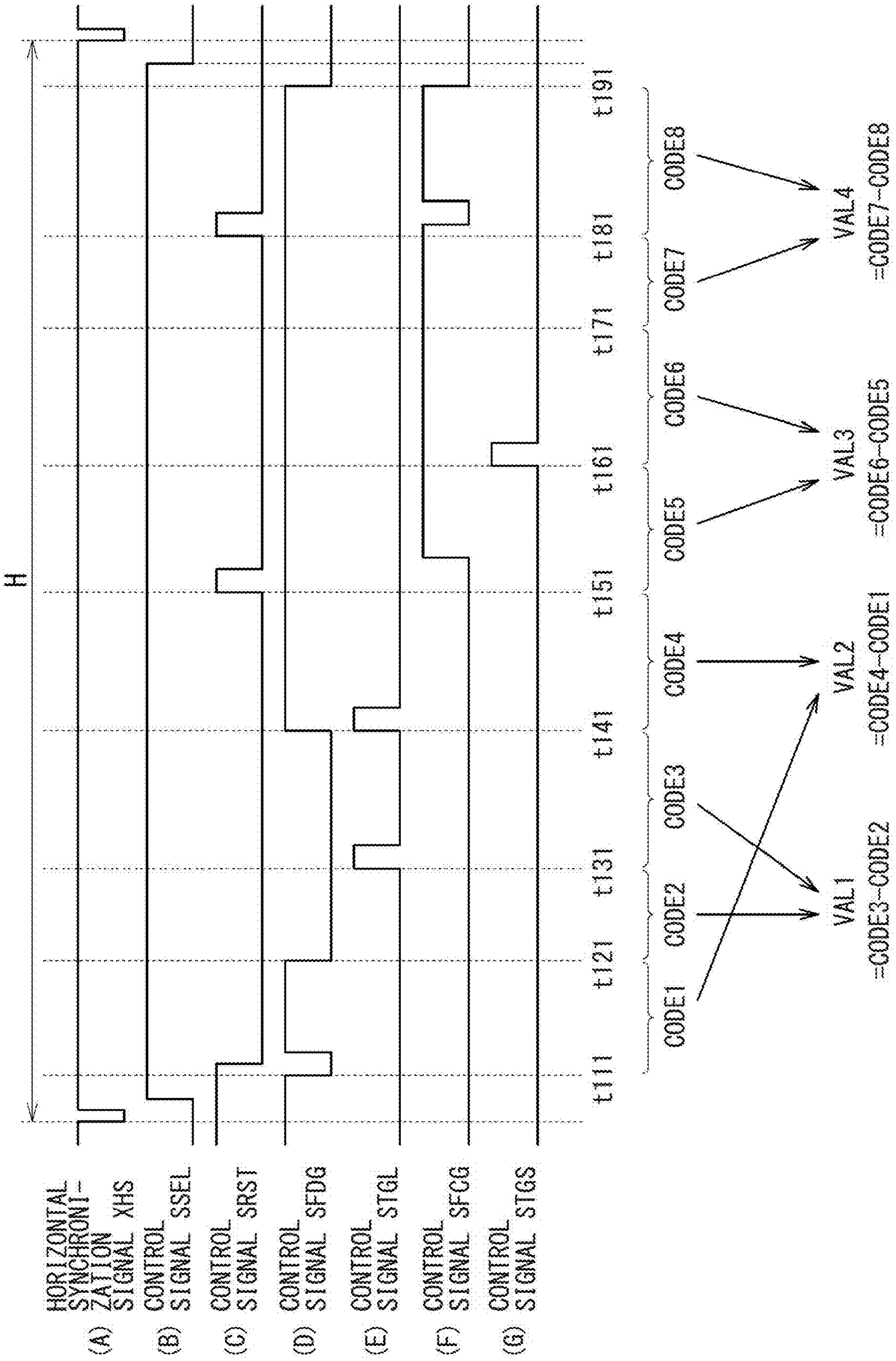
FIG. 20 is an explanatory diagram illustrating an operation example of a signal processor illustrated in FIG. 13.

FIG. 20 schematically illustrates the image synthesis processing. Waveforms illustrated in (A) to (G) of FIG. 20 are similar to the waveforms illustrated in (A) to (G) of FIG. 17. As described with reference to FIGS. 17, 18A, and 18B, the readout section 20 generates the digital code CODE1 on the basis of the operation in a period from the timing t111 to the timing t121, generates the digital code CODE2 on the basis of the operation in a period from the timing t121 to the timing t131, generates the digital code CODE3 on the basis of the operation in a period from the timing t131 to the timing t141, generates the digital code CODE4 on the basis of the operation in a period from the timing t141 to the timing t151, generates the digital code CODE5 on the basis of the operation in a period from the timing t151 to the timing t161, generates the digital code CODE6 on the basis of the operation in a period from the timing t16*l* to the timing t171, generates the digital code CODE7 on the basis of the operation in a period from the timing t171 to the timing t181, and generates the digital code CODE8 on the basis of the operation in a period from the timing t181 to the timing t191.

The signal processor 77 generates a pixel value VAL1 on the basis of the digital code CODE2 and the digital code CODE3. Specifically, the signal processor 77 calculates the pixel value VAL1 by subtracting the digital code CODE2 from the digital code CODE3 (CODE3−CODE2). That is, the imaging device 2 calculates the pixel value VAL1 using the digital code CODE2 corresponding to P-phase (Pre-Charge phase) data and the digital code CODE3 corresponding to D-phase (Data phase) data with use of the principle of correlated double sampling.

Likewise, the signal processor 77 generates a pixel value VAL2 on the basis of the digital code CODE1 and the digital code CODE4. Specifically, the signal processor 77 calculates the pixel value VAL2 by subtracting the digital code CODE1 from the digital code CODE4 (CODE4−CODE1). That is, the imaging device 2 calculates the pixel value VAL2 using the digital code CODE1 corresponding to the P-phase data and the digital code CODE4 corresponding to the D-phase data with use of the principle of correlated double sampling.

Likewise, the signal processor 77 generates a pixel value VAL3 on the basis of the digital code CODE5 and the digital code CODE6. Specifically, the signal processor 77 calculates the pixel value VAL3 by subtracting the digital code CODE5 from the digital code CODE6 (CODE6−CODE5). That is, the imaging device 2 calculates the pixel value VAL3 using the digital code CODE5 corresponding to the P-phase data and the digital code CODE6 corresponding to the D-phase data with use of the principle of correlated double sampling.

Thereafter, the signal processor 77 generates a pixel value VAL4 on the basis of the digital code CODE7 and the digital code CODE8. Specifically, the signal processor 77 calculates the pixel value VAL4 by subtracting the digital code CODE8 from the digital code CODE7 (CODE7−CODE8). That is, the imaging device 2 calculates the pixel value VAL4 using the digital code CODE7 before resetting the floating diffusion FD and the capacitor FC and the digital code CODE8 after resetting the floating diffusion FD and the capacitor FC with use of the principle of what is called double data sampling (DDS; Double Data Sampling).

Thereafter, the signal processor 77 generates the image PIC1 on the basis of the pixel values VAL1 of all the light-receiving pixels P in the pixel array 71, generates the image PIC2 on the basis of the pixel values VAL2 of all the light-receiving pixels P in the pixel array 71, generates the image PIC3 on the basis of the pixel values VAL3 of all the light-receiving pixels P in the pixel array 71, and generates the image PIC4 on the basis of the pixel values VAL4 of all the light-receiving pixels P in the pixel array 71. Thereafter, the signal processor 77 synthesizes these images PIC1 to PIC4 to thereby generate the captured image PICA.

In the imaging device 2, as illustrated in FIG. 20, the readout section 20 outputs the digital codes CODE2 and CODE3, and the signal processor 77 calculates the pixel value VAL1 by subtracting the digital code CODE2 from the digital code CODE3 (CODE3−CODE2), but this is not limitative. Instead of this, as with the imaging device 1 according to the first embodiment described above (FIG. 9), the readout section 20 may output the digital code CODE corresponding to a difference between the digital codes CODE2 and CODE3 by inverting the polarity of the count value after the conversion period T2. The same applies to the digital codes CODE5 and CODE6, and the same applies to the digital codes CODE7 and CODE8.

In addition, for example, in the imaging device 2, as illustrated in FIG. 20, the readout section 20 outputs the digital codes CODE1 and CODE4, and the signal processor 77 calculates the pixel value VAL2 by subtracting the digital code CODE1 from the digital code CODE4 (CODE4−CODE1), but this is not limitative. Instead of this, the AD converter ADC of the readout section 20 may temporarily store the count value at that time therein after the conversion period T1, and may set the stored count value on the counter 25 and invert the polarity of the count value. In this case also, it is possible for the signal processor 77 to obtain the digital code CODE corresponding to a difference between the digital codes CODE1 and CODE4.

(About Operation of Noise Correction Section 90)

The capacitor Cext1 is provided outside the imaging device 2, which easily causes noise to be superimposed on the voltage VRL. The driver section 82 of the driving section 72 uses this voltage VRL as a low-level voltage to thereby generate the control signals STGL, SFDG, SRST, SFCG, STSG, and SSEL. Accordingly, for example, in a case where the control signal STGL is at the low level, noise is superimposed on this control signal STGL. The same applies to the control signals SFDG, SRST, SFCG, STSG, and SSEL.

Accordingly, as with the first embodiment described above, the noise corresponding to the noise of the voltage VRL is superimposed on the pixel signal SIG, for example. Specifically, for example, in the light-receiving pixel P to be subjected to the readout driving D2, the noise of the voltage VRL is transmitted to the gate of the transistor AMP via the transistors TGL and FDG. Accordingly, this light-receiving pixel P outputs the pixel signal SIG with the superimposed noise. In addition, in the light-receiving pixel P not to be subjected to the readout driving D2, the noise of the voltage VRL is transmitted to the source of the transistor SEL via the transistor SEL that is off. Accordingly, this light-receiving pixel P causes the noise to be superimposed on the pixel signal SIG generated by the light-receiving pixel P to be subjected to the readout driving D2.

The high-pass filter 94, the adjustment circuit 95, and the current source 96 of the noise correction section 90 generate the noise correction signal corresponding to the noise superimposed on the voltage VRL, and superimpose the noise correction signal on the reference signal RAMP generated by the reference signal generator 16.

The amplitude and the phase of the noise correction signal are adjusted in advance to be substantially the same as the amplitude and the phase of the noise related to the voltage VRL superimposed on the pixel signal SIG. In this example, as illustrated in (K) of FIG. 17, the amplitude and the phase of the noise correction signal are adjusted by an adjustment parameter SA in the period from the timing t111 to the timing t121, adjusted by an adjustment parameter SB in the period from the timing t121 to the timing t141, adjusted by the adjustment parameter SA in the period from the timing t141 to the timing t151, adjusted by an adjustment parameter SC in a period from the timing t151 to the timing t171, and adjusted by then adjustment parameter SD in a period from the timing t171 to the timing t191. In other words, a transfer function from the terminal TVRL to the signal line VSL differs among the periods from timing t111 to the timing t121 and from the timing t141 to the timing t151, the period from the timing t121 to the timing t141, the period from the timing t151 to the timing t171, and the period from the timing t171 to the timing t191. Accordingly, the adjustment parameter SA is used in the periods from the timing t111 to the timing t121 and from the timing t141 to the timing t151, the adjustment parameter SB is used in the period from the timing t121 to the timing t141, the adjustment parameter SC is used in the period from the timing t151 to the timing t171, and the adjustment parameter SD is used in the period from the timing t171 to the timing t191. The adjustment parameters SA to SD are supplied from the imaging controller 78.

In addition, the capacitor Cext2 is provided outside the imaging device 2, which easily causes noise to be superimposed on the voltage VRH. The driver 83 outputs the voltage VRH as the control signal SFCVDD. Accordingly, the noise is superimposed on the control signal SFCVDD.

Accordingly, for example, noise corresponding to the noise of the voltage VRH is superimposed on the pixel signal SIG. Specifically, in the light-receiving pixel P to be subjected to the readout driving D2, the noise of the voltage VRH is transmitted to the gate of the transistor AMP via the capacitor FC, the transistor FCG that is on, and the transistor FDG that is on. Accordingly, this light-receiving pixel P outputs the pixel signal SIG with the superimposed noise.

The high-pass filter 91, the adjustment circuit 92, and the current source 93 of the noise correction section 90 generate the noise correction signal corresponding to the noise superimposed on the voltage VRH, and superimpose this noise correction signal on the reference signal RAMP generated by the reference signal generator 16.

The amplitude and the phase of this noise correction signal are adjusted in advance to be substantially the same as the amplitude and the phase of noise related to the voltage VRH superimposed on the pixel signal SIG. In this example, as illustrated in (L) of FIG. 17, the amplitude and the phase of the noise correction signal are adjusted by an adjustment parameter SE in the period from the timing t111 to the timing t121, adjusted by an adjustment parameter SF in the period from the timing t121 to the timing t141, adjusted by the adjustment parameter SE in the period from the timing t141 to the timing t151, adjusted by an adjustment parameter SG in the period from the timing t151 to the timing t171, and adjusted by an adjustment parameter SH in the period from the timing t171 to the timing t191. In other words, a transfer function from the terminal TVRH to the signal line VSL differs among the periods from timing t111 to the timing t121 and from the timing t141 to the timing t151, the period from the timing t121 to the timing t141, the period from the timing t151 to the timing t171, and the period from the timing t171 to the timing t191. Accordingly, the adjustment parameter SE is used in the periods from the timing t111 to the timing t121 and from the timing t141 to the timing t151, the adjustment parameter SF is used in the period from the timing t121 to the timing t141, the adjustment parameter SG is used in the period from the timing t151 to the timing t171, and the adjustment parameter SH is used in the period from the timing t171 to the timing 1191. The adjustment parameters SE to SH are supplied from the imaging controller 78.

The image signal SIG on which the noise related to the voltage VRL and the noise related to the voltage VRH are superimposed is supplied to the comparison circuit 24 via the capacitor 22. Likewise, the reference signal RAMP on which these noise correction signals are superimposed by the noise correction section 90 is supplied to the comparison circuit 24 via the capacitor 23. The comparison circuit 24 operates on the basis of a difference between the supplied two signals, which reduces the influence of the noise on the signal CP generated by the comparison circuit 24. As a result, in the imaging device 2, it is possible to reduce the influence of the noise of the voltage VRL and the noise of the voltage VRH on the captured image.

Thus, the imaging device 2 includes the terminal TVRH coupled to the capacitor Cext2, and the bias circuit 74 that is configured to generate the voltage at the terminal TVRH. The driving section 72 drives the light-receiving pixels P on the basis of the voltage at the terminal TVRL and the voltage at the terminal TVRH. The noise correction section 90 generates the noise correction signals on the basis of the voltage at the terminal TVRL and the voltage at the terminal TVRH. Thus, for example, noise and the noise correction signal that are in phase with each other are respectively superimposed on the pixel signal SIG and the reference signal RAMP, which makes it possible to reduce the influence of the noise of the voltage VRL and the noise of the voltage VRH on the captured image.

Modification Example 2

In the embodiment described above, as illustrated in FIG. 16, the noise correction section 90 includes two high-pass filters 91 and 94, two adjustment circuits 92 and 95, and two current sources 93 and 96, but this is not limitative. The following describes some examples in detail.

Figure 21:
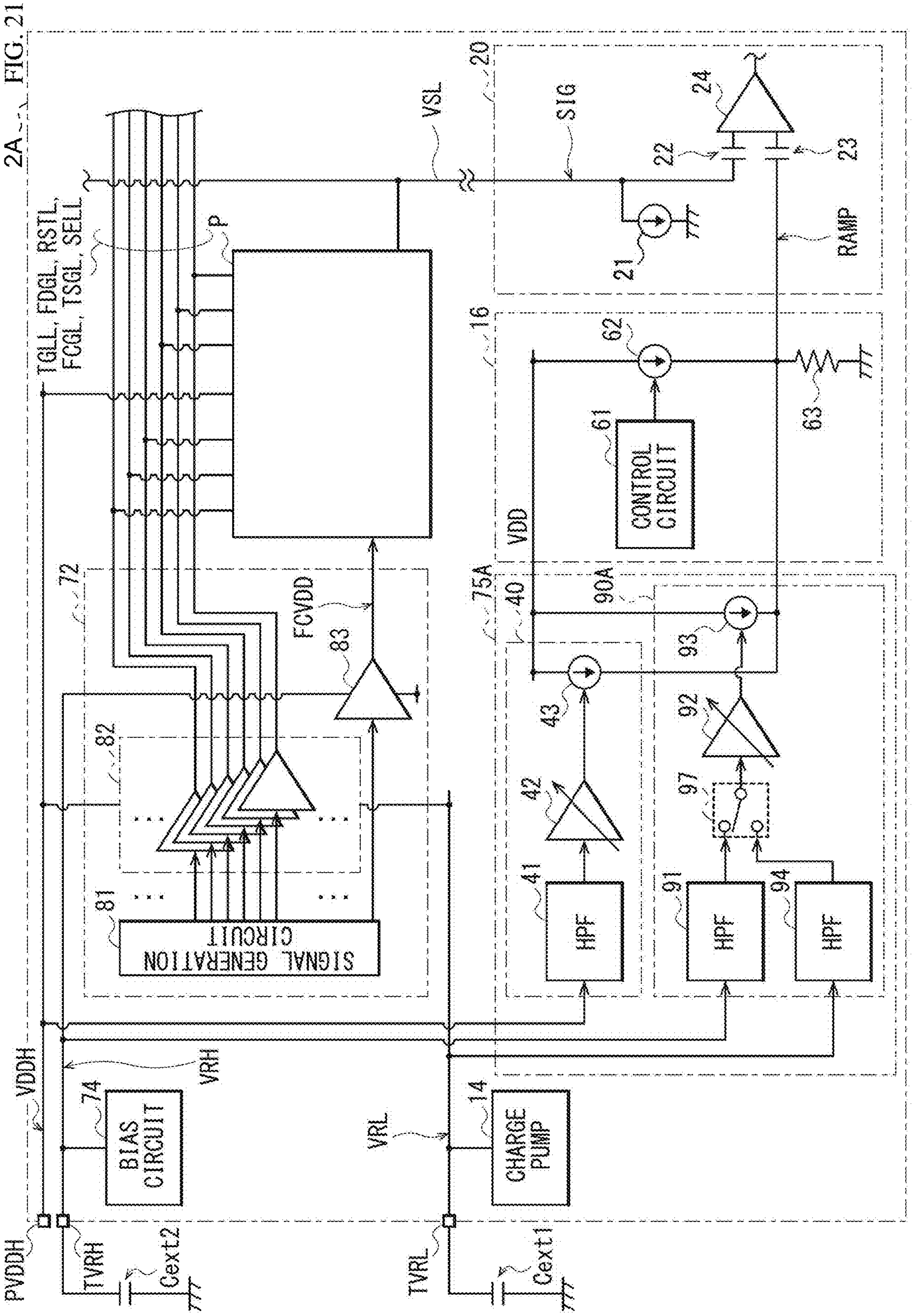
FIG. 21 is a block diagram illustrating a specific example of a noise correction section according to a modification example of the second embodiment.

FIG. 21 illustrates a configuration example of an imaging device 2A according to the present modification example. The imaging device 2A includes a noise correction section 75A. The noise correction section 75A includes a noise correction section 90A. The noise correction section 90A includes the high-pass filters 91 and 94, a switch 97, the adjustment circuit 92, and the current source 93. The high-pass filter 91 is configured to supply, to the switch 97, the noise signal superimposed on the voltage VRH. The noise signal is an alternating-current component. The high-pass filter 94 is configured to supply, to the switch 97, the noise signal superimposed on the voltage VRL. The noise signal is an alternating-current component. The switch 97 is configured to supply, to the adjustment circuit 92, one of the noise signal supplied from the high-pass filter 91 and the noise signal supplied from the high-pass filter 94, on the basis of an instruction from the imaging controller 78A (to be described later). The adjustment circuit 92 is configured to adjust the amplitude and the phase of the noise signal supplied from the switch 97 on the basis of an instruction from the imaging controller 78A. The current source 93 is configured to convert the noise signal adjusted by the adjustment circuit 92 into a current signal.

Figure 22:
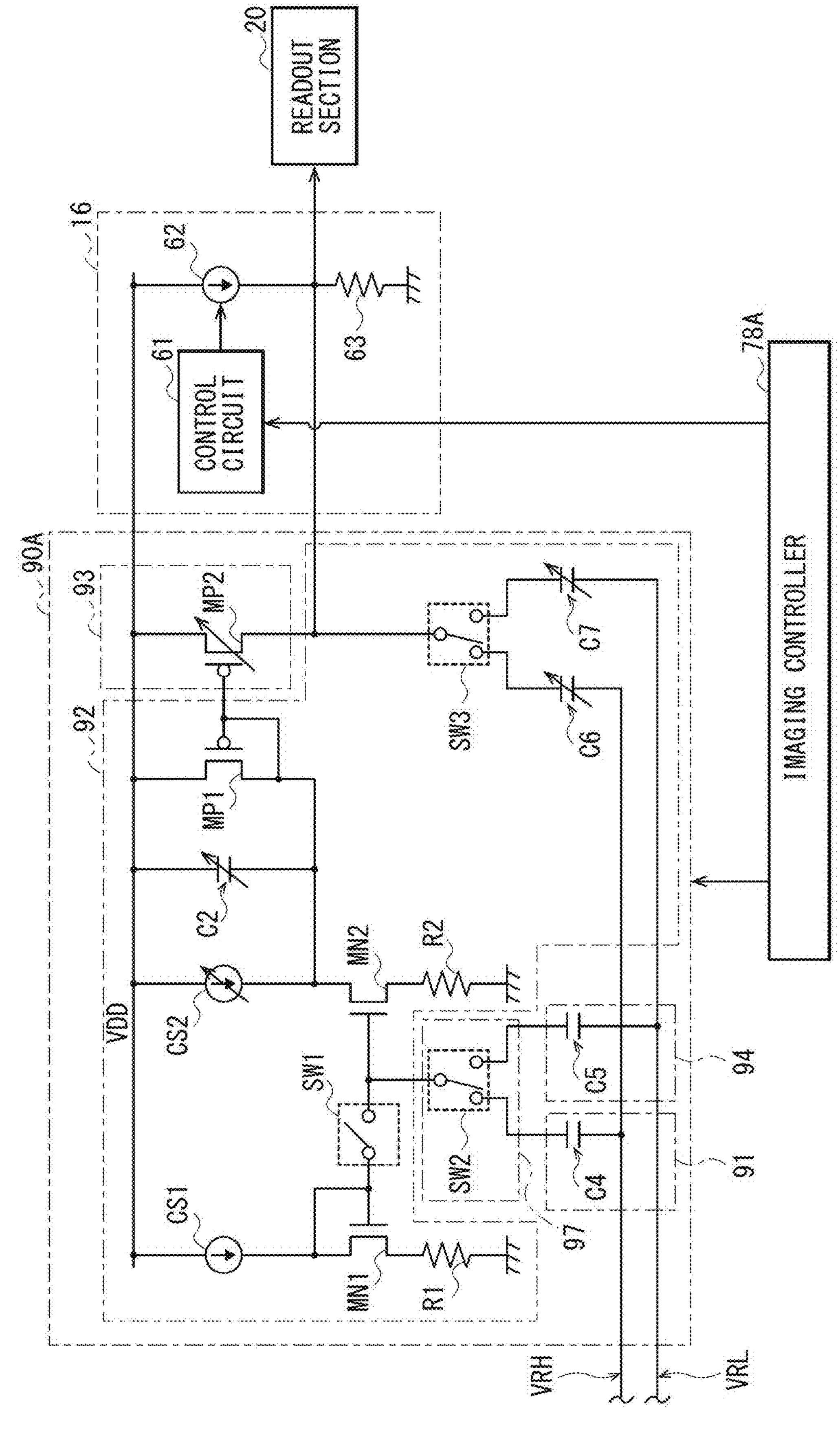
FIG. 22 is a circuit diagram illustrating a specific example of the noise correction section illustrated in FIG. 21.

FIG. 22 illustrates a configuration example of the noise correction section 90A. FIG. 22 illustrates the reference signal generator 16, the readout section 20, and the imaging controller 78A, in addition to the noise correction section 90A. The noise correction section 90A includes capacitors C4 and C5, a switch SW2, capacitors C6 and C7, and a switch SW3. The capacitor C4 corresponds to the high-pass filter 91 illustrated in FIG. 21. The capacitor C5 corresponds to the high-pass filter 94 illustrated in FIG. 21. The switch SW2 corresponds to the switch 97. The resistor element R1, the transistor MN1, the current source CS1, the switch SW1, the resistor element R2, the transistor MN2, the current source CS2, the capacitor C2, the transistor MP1, the capacitors C6 and C7, and the switch SW3 correspond to the adjustment circuit 92 illustrated in FIG. 21. The transistor MP2 corresponds to the current source 93 illustrated in FIG. 21.

The capacitor C4 has one end to be supplied with the voltage VRH, and another end coupled to the switch SW2. The capacitor C5 has one end to be supplied with the voltage VRL, and another end coupled to the switch SW2. The switch SW2 is configured to couple one of the other end of the capacitor C4 and the other end of the capacitor C5 to the gate of the transistor MN2 and the switch SW1 on the basis of an instruction from the imaging controller 78A. The capacitor C6 has one end to be supplied with the voltage VRH, and another end coupled to the switch SW3. The capacitor C7 has one end to be supplied with the voltage VRL, and another end coupled to the switch SW3. The capacitors C6 and C7 are configured to change a capacitance value on the basis of an instruction from the imaging controller 78A. The switch SW3 is configured to couple one of the other end of the capacitor C6 and the other end of the capacitor C7 to the drain of the transistor MP2 on the basis of an instruction from the imaging controller 78A.

Here, the high-pass filter 94 corresponds to a specific example of a "first high-pass filter" in one embodiment of the present disclosure. The high-pass filter 91 corresponds to a specific example of a "second high-pass filter" in one embodiment of the present disclosure. The switch 97 corresponds to a specific example of a "switch" in one embodiment of the present disclosure. The adjustment circuit 92, the current source 93, and the resistor element 63 correspond to a specific example of a "generation circuit" in one embodiment of the present disclosure.

FIG. 23 illustrates an operation example of the imaging device 2A, where (A) illustrates the waveform of the horizontal synchronization signal XHS, (B) illustrates the waveform of the control signal SSEL, (C) illustrates the waveform of the control signal SRST, (D) illustrates the waveform of the control signal SEDG, (E) illustrates the waveform of the control signal STGL, (F) illustrates the waveform of the control signal SFCG, (G) illustrates the waveform of the control signal STGS, (H) illustrates the waveform of the reference signal RAMP, (I) illustrates the waveform of the pixel signal SIG, (J) illustrates the operation of the counter 25, (K) illustrates an adjustment parameter in the noise correction section 90A, and (L) illustrates a voltage to be corrected by the noise correction section 90A. (A) to (J) of FIG. 23 are similar to those in the embodiment described above (FIGS. 17, 18A, and 18B).

For example, in a period from the timing t111 to the timing t151 (FIG. 23), as with the first embodiment described above, the noise corresponding to the noise of the voltage VRL is superimposed on the pixel signal SIG. Specifically, for example, in the light-receiving pixel P to be subjected to the readout driving D2, the noise of the voltage VRL is transmitted to the gate of the transistor AMP via the transistors TGL and FDG. Accordingly, this light-receiving pixel P outputs the pixel signal SIG with the superimposed noise. In addition, in the light-receiving pixel P not to be subjected to the readout driving D2, the noise of the voltage VRL is transmitted to the source of the transistor SEL via the transistor SEL that is off. Accordingly, this light-receiving pixel P causes the noise to be superimposed on the pixel signal SIG generated by the light-receiving pixel P to be subjected to the readout driving D2.

As illustrated in (L) of FIG. 23, in the period from the timing t111 to the timing 1151, the noise correction section 90A regards the voltage VRL as a correction target voltage. Specifically, in this period, the switch SW2 couples the other end of the capacitor C5 to the gate of the transistor MN2 and the switch SW1, and the switch SW3 couples the other end of the capacitor C7 to the drain of the transistor MP2. In this period, the noise correction section 90A generates the noise correction signal corresponding to the noise superimposed on the voltage VRL, and superimposes this noise correction signal on the reference signal RAMP generated by the reference signal generator 16. In this period, the noise correction section 90A does not generate the noise correction signal corresponding to the noise superimposed on the voltage VRH.

The amplitude and the phase of this noise correction signal are adjusted in advance to be substantially the same as the amplitude and the phase of the noise related to the voltage VRL superimposed on the pixel signal SIG. In this example, as illustrated in (K) of FIG. 23, the amplitude and the phase of the noise correction signal are adjusted by an adjustment parameter SI in the period from the timing t111 to the timing t121, adjusted by an adjustment parameter SI in the period from the timing t121 to the timing t141, and adjusted by an adjustment parameter SI in the period from the timing t141 to the timing t151. In other words, the transfer function from the terminal TVRL to the signal line VSL differs between the periods from the timing t111 to the timing t121 and from the timing t141 to the timing t151, and the period from the timing t121 to the timing t141. Accordingly, the adjustment parameter SI is used in the periods from the timing t111 to the timing t121 and from the timing t141 to the timing t151, and the adjustment parameter SJ is used in the period from the timing t121 to the timing t141. The adjustment parameters SI and SJ are supplied from the imaging controller 78A.

Thus, the noise and the noise correction signal that are in phase with each other are respectively superimposed on the pixel signal SIG and the reference signal RAMP that are to be supplied to the comparison circuit 24 in the period from the timing t111 to the timing t151. The comparison circuit 24 operates on the basis of a difference between the supplied two signals, which reduces the influence of the noise on the signal CP generated by the comparison circuit 24. As a result, in the imaging device 2A, it is possible to reduce the influence of the noise of the voltage VRL on the captured image. In addition, for example, in a period from the timing t151 to the timing t191 (FIG. 23), the noise corresponding to the noise of the voltage VRH is superimposed on the pixel signal SIG. Specifically, for example, in the light-receiving pixel P to be subjected to the readout driving D2, the noise of the voltage VRH is transmitted to the gate of the transistor AMP via the capacitor FC, the transistor FCG that is on, and the transistor FDG that is on. Accordingly, this light-receiving pixel P outputs the pixel signal SIG with the superimposed noise.

As illustrated in (L) of FIG. 23, in the period from the timing t151 to the timing (191, the noise correction section 90A regards the voltage VRH as a correction target voltage. Specifically, in this period, the switch SW2 couples the other end of the capacitor C4 to the gate of the transistor MN2 and the switch SW1, and the switch SW3 couples the other end of the capacitor C6 to the drain of the transistor MP2. In this period, the noise correction section 90A generates the noise correction signal corresponding to the noise superimposed on the voltage VRH, and superimposes the noise correction signal on the reference signal RAMP generated by the reference signal generator 16. In this period, the noise correction section 90A does not generate the noise correction signal corresponding to the noise superimposed on the voltage VRL.

The amplitude and the phase of this noise correction signal are adjusted in advance to be substantially the same as the amplitude and the phase of the noise related to the voltage VRH superimposed on the pixel signal SIG. In this example, as illustrated in (K) of FIG. 23, the amplitude and the phase of the noise correction signal are adjusted by an adjustment parameter SK in the period from the timing t151 to the timing t171, and adjusted by an adjustment parameter SL in the period from the timing t171 to the timing t191. In other words, the transfer function from the terminal TVRH to the signal line VSL differs between the period from the timing t151 to the timing t171 and the period from the timing t171 to the timing t191. Accordingly, the adjustment parameter SK is used in the period from the timing t151 to the timing t171, and the adjustment parameter SL is used in the period from the timing t171 to the timing t191. The adjustment parameters SK and SL are supplied from the imaging controller 78A.

Thus, the noise and the noise correction signal that are in phase with each other are respectively superimposed on the pixel signal SIG and the reference signal RAMP that are to be supplied to the comparison circuit 24 in the period from the timing t151 to the timing t191. The comparison circuit 24 operates on the basis of a difference between the supplied two signals, which reduces the influence of the noise on the signal CP generated by the comparison circuit 24. As a result, in the imaging device 2A, it is possible to reduce the influence of the noise of the voltage VRH on the captured image.

Figure 24:
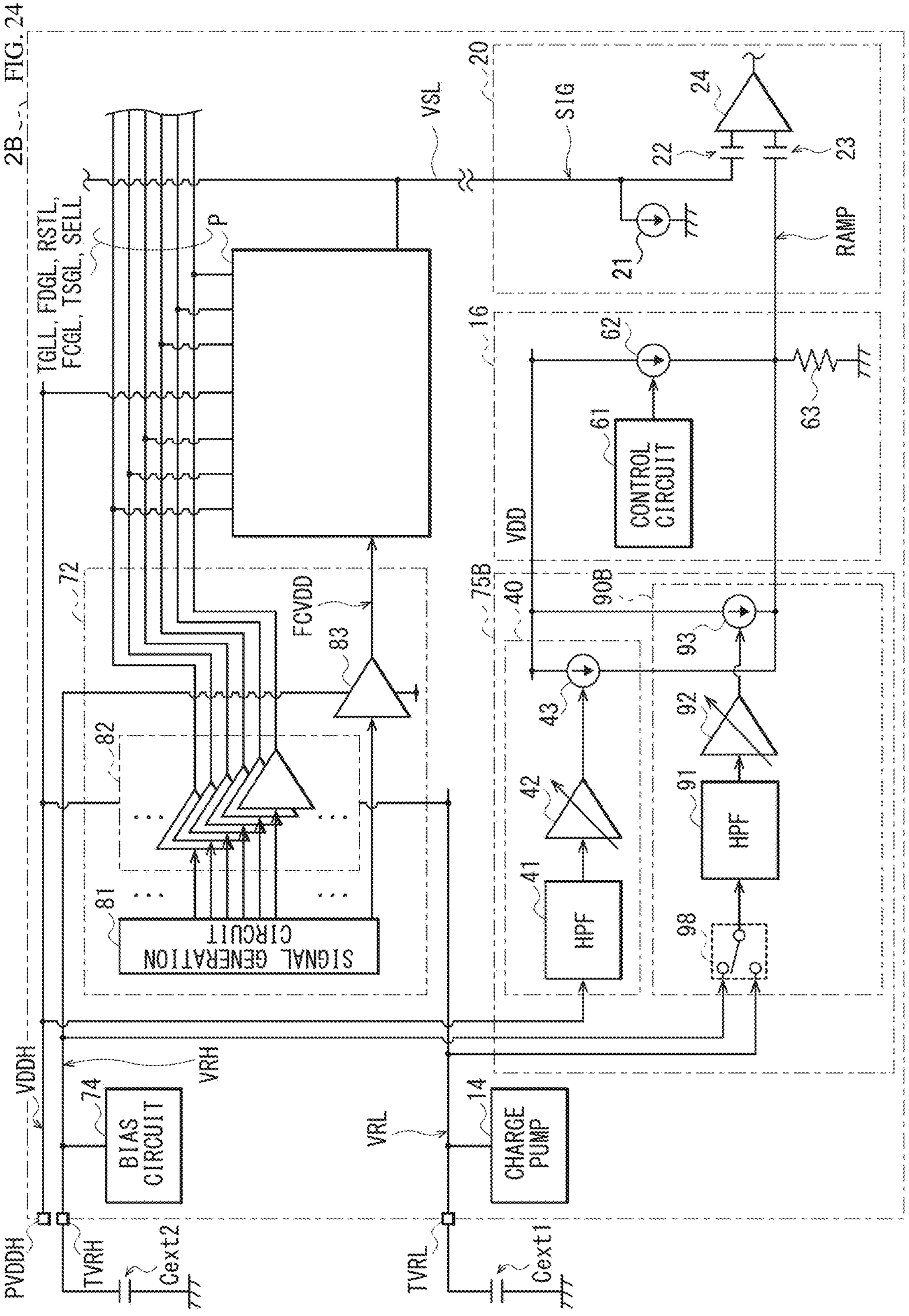
FIG. 24 is a block diagram illustrating a specific example of a noise correction section according to another modification example of the second embodiment.

FIG. 24 illustrates a configuration example of another imaging device 2B according to the present modification example. The imaging device 2B includes a noise correction section 75B. The noise correction section 75B includes a noise correction section 90B. The noise correction section 90B includes a switch 98, the high-pass filter 91, the adjustment circuit 92, and the current source 93. The switch 98 is configured to supply one of the voltage VRH and the voltage VRL to the high-pass filter 91 on the basis of an instruction from the imaging controller 78B. The high-pass filter 91 is configured to supply, to the adjustment circuit 92, a noise signal superimposed on one of the voltages VRH and VRL supplied from the switch 98. The noise signal is an alternating-current component. The adjustment circuit 92 is configured to adjust an amplitude and a phase of the noise signal supplied from the switch 97 on the basis of an instruction from the imaging controller 78B. The current source 93 is configured to convert the noise signal adjusted by the adjustment circuit 92 into a current signal.

Figure 25:
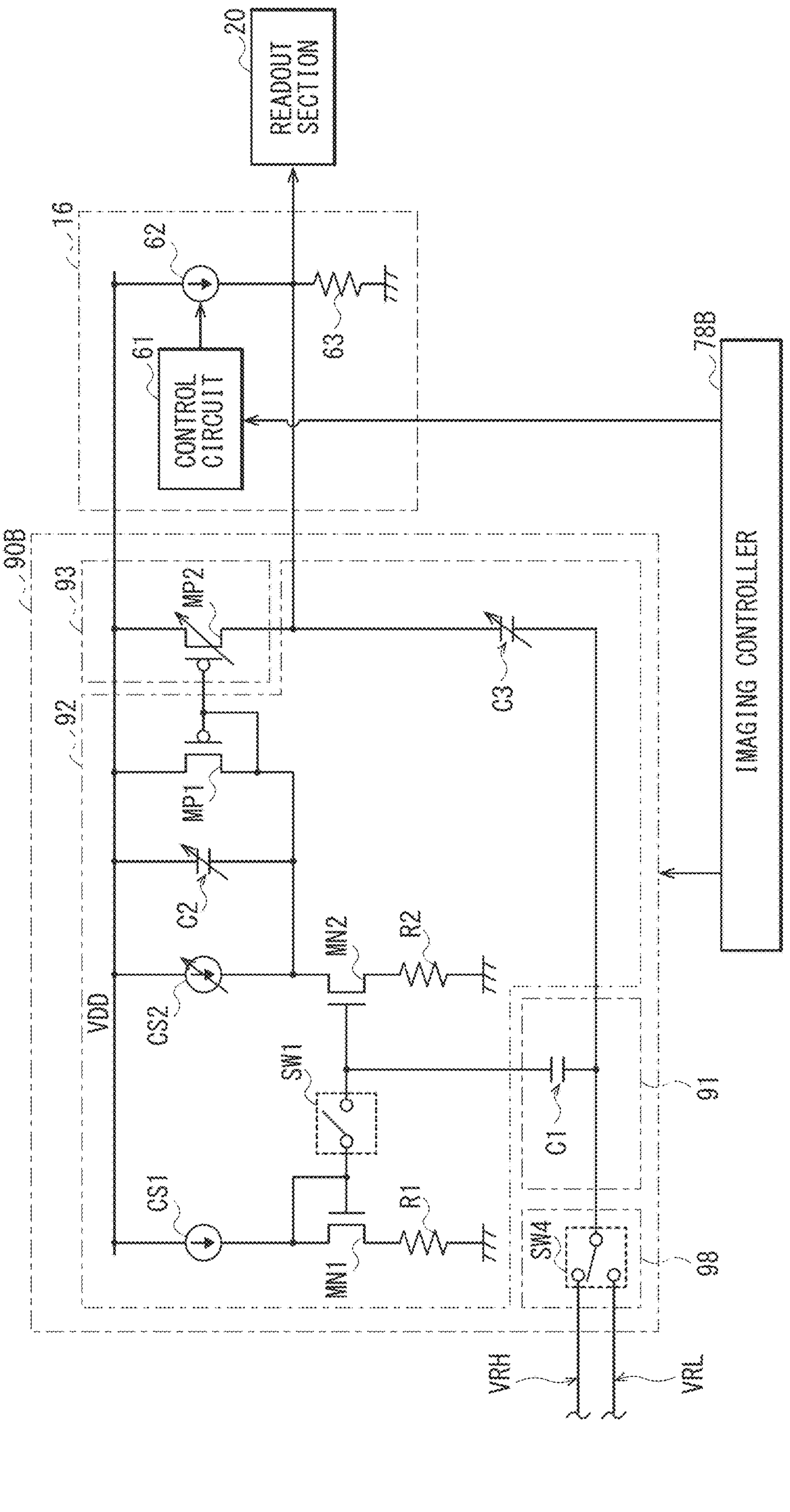
FIG. 25 is a circuit diagram illustrating a specific example of the noise correction section illustrated in FIG. 24.

FIG. 25 illustrates a configuration example of the noise correction section 90B. FIG. 25 illustrates the reference signal generator 16, the readout section 20, and the imaging controller 78B, in addition to the noise correction section 90B. The noise correction section 90B includes a switch SW4. The switch SW4 corresponds to the switch 98 illustrated in FIG. 24. The switch SW4 is configured to supply one of the voltage VRH and the voltage VRL to the capacitors C1 and C2 on the basis of an instruction from the imaging controller 78B.

Here, the switch 98 corresponds to a specific example of a "switch" in one embodiment of the present disclosure. The high-pass filter 91 corresponds to a specific example of a "high-pass filter" in one embodiment of the present disclosure. The adjustment circuit 92, the current source 93, and the resistor element 63 correspond to a specific example of a "generation circuit" in one embodiment of the present disclosure.

The operation of the imaging device 2B is similar to that of the imaging device 2A (FIG. 23).

As illustrated in (L) of FIG. 23, in the period from the timing t111 to the timing 1151, the noise correction section 90B regards the voltage VRL as a correction target voltage. Specifically, in this period, the switch SW4 supplies the voltage VRL to the capacitors C1 and C3. As illustrated in (K) of FIG. 23, the amplitude and the phase of the noise correction signal are adjusted by the adjustment parameter SI in the period from the timing t111 to the timing t121, adjusted by the adjustment parameter SJ in the period from the timing t121 to the timing t141, and adjusted by the adjustment parameter SI in the period from the timing t141 to the timing t151.

In addition, in the period from the timing t151 to the timing t191, the noise correction section 90B regards the voltage VRH as a correction target voltage. Specifically, in this period, the switch SW4 supplies the voltage VRH to the capacitors C1 and C3. The amplitude and the phase of the noise correction signal are adjusted by the adjustment parameter SK in the period from the timing t151 to the timing t171, and adjusted by the adjustment parameter SL in the period from the timing t171 to the timing t191.

3. Application Example to Mobile Body

The technology (present technology) according to the present disclosure is applicable to various products. For example, the technology according to the present disclosure may be achieved in the form of an apparatus to be mounted to a mobile body of any kind such as an automobile, an electric vehicle, a hybrid electric vehicle, a motorcycle, a bicycle, a personal mobility, an airplane, a drone, a vessel, and a robot.

Figure 26:
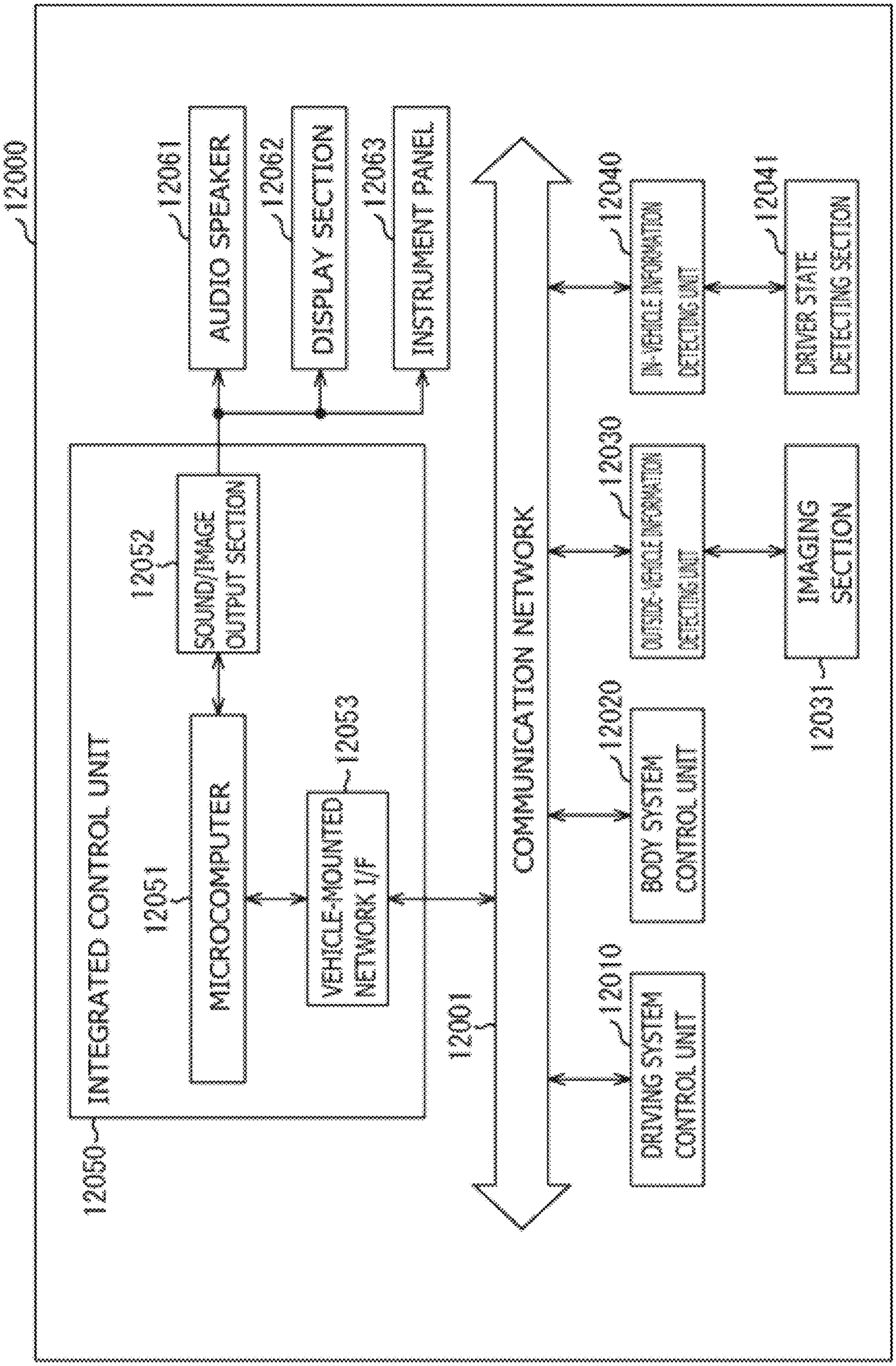
FIG. 26 is a block diagram depicting an example of schematic configuration of a vehicle control system.

FIG. 26 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 26, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 26, an audio speaker 12061, a display section 12062, and an instrument panel 12063 are illustrated as the output device. The display section 12062 may, for example, include at least one of an on-board display and a head-up display.

FIG. 27 is a diagram depicting an example of the installation position of the imaging section 12031.

In FIG. 27, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 27 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

One example of the vehicle control system to which the technology according to the present disclosure may be applied has been described above. The technology according to the present disclosure may be applied to the imaging section 12031 among the components described above. In the imaging device mounted on a vehicle, it is possible to reduce an influence of noise, thereby making it possible to enhance image quality of a captured image. As a result, this allows the vehicle control system 12000 to implement, with high accuracy, collision avoidance or shock mitigation for vehicles, a following driving function based on vehicle-to-vehicle distance, a vehicle speed maintaining driving function, a warning function of collision of the vehicle, a warning function of deviation of the vehicle from a lane, and the like.

Although the present technology has been described above with reference to some embodiments, the modification examples, and specific application examples thereof, the present technology is not limited to these embodiments and the like, and may be modified in a variety of ways.

For example, in the embodiments described above, the present technology is applied to an imaging device, but this is not limitative, and the present technology is applicable to various devices that detect light. FIG. 28 illustrates a configuration example of a distance measurement device 3 to which the present technology is applied. The distance measurement device 3 is an indirect ToF (Time-of-Flight) sensor, and is configured to measure a distance to a measurement object OBJ. The distance measurement device 3 includes a light-emitting section 101, an optical system 102, a photodetector 103, and a controller 104.

The light-emitting section 101 is configured to emit a light pulse L0 toward the measurement object OBJ on the basis of an instruction from the controller 104. The light-emitting section 101 emits the light pulse L0 on the basis of an instruction from the controller 104 by performing a light emission operation of alternately repeating emission and non-emission of light. The light-emitting section 101 includes, for example, a light source that emits infrared light. This light source is configured using, for example, a laser light source, an LED (Light Emitting Diode), or the like.

The optical system 102 includes a lens that forms an image on a light-receiving surface S of the photodetector 103. A light pulse (a reflected light pulse L1) emitted from the light-emitting section 101 and reflected by the measurement object OBJ enters this optical system 102.

The photodetector 103 is configured to generate a distance image on the basis of an instruction from the controller 104 by detecting light. Each of a plurality of pixel values included in the distance image indicates a value related to a distance to the measurement object OBJ. Thereafter, the photodetector 103 outputs the generated distance image as image data DT2.

The controller 104 is configured to supply control signals to the light-emitting section 101 and the photodetector 103 and control operations thereof, thereby controlling an operation of the distance measurement device 3.

The present technology is also applicable to such a distance measurement device 3. Applying the present technology to the distance measurement device 3 makes it possible to enhance distance measurement accuracy.

It is to be noted that the effects described herein are merely illustrative and non-limiting, and may further include other effects.

It is to be noted that the present technology may have the following configurations. According to the present technology having the following configurations, it is possible to reduce an influence of noise.

(1)

An imaging device including:

a light-receiving pixel that is configured to generate a pixel signal including a pixel voltage corresponding to an amount of received light;

a first coupling terminal coupled to a first external capacitor;

a first voltage generation circuit that is configured to generate a voltage at the first coupling terminal;

a drive circuit that is configured to drive the light-receiving pixel on the basis of the voltage at the first coupling terminal;

a reference signal generation circuit that is configured to generate a reference signal having a ramp waveform;

a noise correction circuit that is configured to generate a noise correction signal corresponding to the voltage at the first coupling terminal, and is configured to superimpose the noise correction signal on the reference signal;

a comparison circuit that is configured to perform comparison between the pixel signal and the reference signal with the superimposed noise correction signal; and a processing circuit that is configured to calculate a pixel value on the basis of a result of the comparison by the comparison circuit.

(2)

The imaging device according to (1), further including:

a second coupling terminal coupled to a second external capacitor; and a second voltage generation circuit that is configured to generate a voltage at the second coupling terminal, in which the drive circuit is configured to drive the light-receiving pixel on the basis of the voltage at the first coupling terminal and the voltage at the second coupling terminal, and the noise correction circuit is configured to generate the noise correction signal on the basis of the voltage at the first coupling terminal and the voltage at the second coupling terminal.

(3)

The imaging device according to (2), in which the noise correction circuit is configured to generate the noise correction signal corresponding to the voltage at the first coupling terminal, the voltage at the second coupling terminal, or both.

(4)

The imaging device according to any one of (1) to (3), further including a control circuit that is configured to control an operation of the noise correction circuit, in which the noise correction circuit is configured to adjust the noise correction signal on the basis of an adjustment parameter supplied from the control circuit.

(5)

The imaging device according to (4), in which the adjustment parameter is configured to adjust an amplitude of the noise correction signal, a phase of the noise correction signal, or both.

(6)

The imaging device according to (3), in which the light-receiving pixel is configured to output the pixel signal in a predetermined period, the noise correction circuit is configured to generate the noise correction signal corresponding to the voltage at the first coupling terminal in a first period within the predetermined period, and the noise correction circuit is configured to generate the noise correction signal corresponding to the voltage at the second coupling terminal in a second period within the predetermined period.

(7)

The imaging device according to (6), further including a control circuit that is configured to control an operation of the noise correction circuit, in which the noise correction circuit is configured to adjust the noise correction signal on the basis of an adjustment parameter supplied from the control circuit, the control circuit is configured to set the adjustment parameter to a first adjustment parameter in the first period, and the control circuit is configured to set the adjustment parameter to a second adjustment parameter in the second period.

(8)

The imaging device according to (7), in which the first period includes a first subperiod and a second subperiod, the first adjustment parameter includes a first parameter and a second parameter, the control circuit is configured to set the adjustment parameter to the first parameter in the first subperiod, and the control circuit is configured to set the adjustment parameter to the second parameter in the second subperiod.

(9)

The imaging device according to (3), in which the noise correction circuit includes a first high-pass filter that extracts a first noise signal superimposed on the voltage at the first coupling terminal, a second high-pass filter that extracts a second noise signal superimposed on the voltage at the second coupling terminal, a switch that selects one of the first noise signal and the second noise signal, and a generation circuit that generates the noise correction signal on the basis of a noise signal selected by the switch.

(10)

The imaging device according to (3), in which the noise correction circuit includes a switch that selects one of the voltage at the first coupling terminal and the voltage at the second coupling terminal, a high-pass filter that extracts a noise signal superimposed on the voltage selected by the switch, and a generation circuit that generates the noise correction signal on the basis of the noise signal.

(11)

The imaging device according to any one of (1) to (11), in which the first voltage generation circuit includes a charge pump that is configured to generate a voltage outside a voltage range between a power supply voltage and a ground voltage.

(12)

The imaging device according to any one of (1) to (11), in which the first voltage generation circuit includes a bias circuit that is configured to generate a voltage inside a voltage range between a power supply voltage and a ground voltage.

(13)

A photodetection device including:

a light reception circuit that is configured to generate a detection signal including a voltage corresponding to an amount of received light;

a first coupling terminal coupled to a first external capacitor;

a first voltage generation circuit that is configured to generate a voltage at the first coupling terminal;

a drive circuit that is configured to drive the light reception circuit on the basis of the voltage at the first coupling terminal;

a reference signal generation circuit that is configured to generate a reference signal having a ramp waveform;

a noise correction circuit that is configured to generate a noise correction signal corresponding to the voltage at the first coupling terminal, and is configured to superimpose the noise correction signal on the reference signal;

a comparison circuit that is configured to perform comparison between the detection signal and the reference signal with the superimposed noise correction signal; and a processing circuit that is configured to calculate a detection value on the basis of a result of the comparison by the comparison circuit.

The present application claims the benefit of Japanese Priority Patent Application JP2022-111406 filed with the Japan Patent Office on Jul. 11, 2022, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging device comprising:

a light-receiving pixel that is configured to generate a pixel signal including a pixel voltage corresponding to an amount of received light;

a first coupling terminal coupled to a first external capacitor;

a first voltage generation circuit that is configured to generate a voltage at the first coupling terminal;

a drive circuit that is configured to drive the light-receiving pixel on a basis of the voltage at the first coupling terminal;

a reference signal generation circuit that is configured to generate a reference signal having a ramp waveform;

a noise correction circuit that is configured to generate a noise correction signal corresponding to the voltage at the first coupling terminal, and is configured to superimpose the noise correction signal on the reference signal;

a comparison circuit that is configured to perform comparison between the pixel signal and the reference signal with the superimposed noise correction signal;

a processing circuit that is configured to calculate a pixel value on a basis of a result of the comparison by the comparison circuit;

a second coupling terminal coupled to a second external capacitor; and a second voltage generation circuit that is configured to generate a voltage at the second coupling terminal, wherein the drive circuit is configured to drive the light-receiving pixel on a basis of the voltage at the first coupling terminal and the voltage at the second coupling terminal, the noise correction circuit is configured to generate the noise correction signal on a basis of the voltage at the first coupling terminal and the voltage at the second coupling terminal, the noise correction circuit is configured to generate the noise correction signal corresponding to at least one of the voltage at the first coupling terminal or the voltage at the second coupling terminal, the light-receiving pixel is configured to output the pixel signal in a predetermined period, the noise correction circuit is configured to generate the noise correction signal corresponding to the voltage at the first coupling terminal in a first period within the predetermined period, and the noise correction circuit is configured to generate the noise correction signal corresponding to the voltage at the second coupling terminal in a second period within the predetermined period.

2. The imaging device according to claim 1, further comprising a control circuit that is configured to control an operation of the noise correction circuit, wherein the noise correction circuit is configured to adjust the noise correction signal on a basis of an adjustment parameter supplied from the control circuit.

3. The imaging device according to claim 2, wherein the adjustment parameter is configured to adjust an amplitude of the noise correction signal, a phase of the noise correction signal, or both.

4. The imaging device according to claim 1, further comprising a control circuit that is configured to control an operation of the noise correction circuit, wherein the noise correction circuit is configured to adjust the noise correction signal on a basis of an adjustment parameter supplied from the control circuit, the control circuit is configured to set the adjustment parameter to a first adjustment parameter in the first period, and the control circuit is configured to set the adjustment parameter to a second adjustment parameter in the second period.

5. The imaging device according to claim 4, wherein the first period includes a first subperiod and a second subperiod, the first adjustment parameter includes a first parameter and a second parameter, the control circuit is configured to set the adjustment parameter to the first parameter in the first subperiod, and the control circuit is configured to set the adjustment parameter to the second parameter in the second subperiod.

6. The imaging device according to claim 1, wherein the first voltage generation circuit includes a charge pump that is configured to generate a voltage outside a voltage range between a power supply voltage and a ground voltage.

7. The imaging device according to claim 1, wherein the first voltage generation circuit includes a bias circuit that is configured to generate a voltage inside a voltage range between a power supply voltage and a ground voltage.

8. A photodetection device comprising the imaging device according to claim 1.

9. The photodetection device according to claim 8, further comprising a control circuit that is configured to control an operation of the noise correction circuit, wherein the noise correction circuit is configured to adjust the noise correction signal on a basis of an adjustment parameter supplied from the control circuit.

10. The photodetection device according to claim 9, wherein the adjustment parameter is configured to adjust an amplitude of the noise correction signal, a phase of the noise correction signal, or both.

11. The photodetection device according to claim 8, further comprising a control circuit that is configured to control an operation of the noise correction circuit, wherein the noise correction circuit is configured to adjust the noise correction signal on a basis of an adjustment parameter supplied from the control circuit, the control circuit is configured to set the adjustment parameter to a first adjustment parameter in the first period, and the control circuit is configured to set the adjustment parameter to a second adjustment parameter in the second period.

12. The photodetection device according to claim 11, wherein the first period includes a first subperiod and a second subperiod, the first adjustment parameter includes a first parameter and a second parameter, the control circuit is configured to set the adjustment parameter to the first parameter in the first subperiod, and the control circuit is configured to set the adjustment parameter to the second parameter in the second subperiod.

13. The photodetection device according to claim 8, wherein the first voltage generation circuit includes a charge pump that is configured to generate a voltage outside a voltage range between a power supply voltage and a ground voltage.

14. The photodetection device according to claim 8, wherein the first voltage generation circuit includes a bias circuit that is configured to generate a voltage inside a voltage range between a power supply voltage and a ground voltage.

15. An imaging device comprising:

a light-receiving pixel that is configured to generate a pixel signal including a pixel voltage corresponding to an amount of received light;

a first coupling terminal coupled to a first external capacitor;

a first voltage generation circuit that is configured to generate a voltage at the first coupling terminal;

a drive circuit that is configured to drive the light-receiving pixel on a basis of the voltage at the first coupling terminal;

a reference signal generation circuit that is configured to generate a reference signal having a ramp waveform;

a noise correction circuit that is configured to generate a noise correction signal corresponding to the voltage at the first coupling terminal, and is configured to superimpose the noise correction signal on the reference signal;

a comparison circuit that is configured to perform comparison between the pixel signal and the reference signal with the superimposed noise correction signal;

a processing circuit that is configured to calculate a pixel value on a basis of a result of the comparison by the comparison circuit;

a second coupling terminal coupled to a second external capacitor; and a second voltage generation circuit that is configured to generate a voltage at the second coupling terminal, wherein the drive circuit is configured to drive the light-receiving pixel on a basis of the voltage at the first coupling terminal and the voltage at the second coupling terminal, the noise correction circuit is configured to generate the noise correction signal on a basis of the voltage at the first coupling terminal and the voltage at the second coupling terminal, the noise correction circuit is configured to generate the noise correction signal corresponding to at least one of the voltage at the first coupling terminal or the voltage at the second coupling terminal, and wherein the noise correction circuit includes a first high-pass filter that extracts a first noise signal superimposed on the voltage at the first coupling terminal, a second high-pass filter that extracts a second noise signal superimposed on the voltage at the second coupling terminal, a switch that selects one of the first noise signal and the second noise signal, and a generation circuit that generates the noise correction signal on a basis of a noise signal selected by the switch.

16. An imaging device comprising:

a light-receiving pixel that is configured to generate a pixel signal including a pixel voltage corresponding to an amount of received light;

a first coupling terminal coupled to a first external capacitor;

a first voltage generation circuit that is configured to generate a voltage at the first coupling terminal;

a drive circuit that is configured to drive the light-receiving pixel on a basis of the voltage at the first coupling terminal;

a reference signal generation circuit that is configured to generate a reference signal having a ramp waveform;

a noise correction circuit that is configured to generate a noise correction signal corresponding to the voltage at the first coupling terminal, and is configured to superimpose the noise correction signal on the reference signal;

a comparison circuit that is configured to perform comparison between the pixel signal and the reference signal with the superimposed noise correction signal;

a processing circuit that is configured to calculate a pixel value on a basis of a result of the comparison by the comparison circuit;

a second coupling terminal coupled to a second external capacitor; and a second voltage generation circuit that is configured to generate a voltage at the second coupling terminal, wherein the drive circuit is configured to drive the light-receiving pixel on a basis of the voltage at the first coupling terminal and the voltage at the second coupling terminal, the noise correction circuit is configured to generate the noise correction signal on a basis of the voltage at the first coupling terminal and the voltage at the second coupling terminal, the noise correction circuit is configured to generate the noise correction signal corresponding to at least one of the voltage at the first coupling terminal or the voltage at the second coupling terminal, and wherein the noise correction circuit includes a switch that selects one of the voltage at the first coupling terminal and the voltage at the second coupling terminal, a high-pass filter that extracts a noise signal superimposed on the voltage selected by the switch, and a generation circuit that generates the noise correction signal on a basis of the noise signal.

17. A photodetection device comprising the imaging device according to claim 15.

18. A photodetection device comprising the imaging device according to claim 16.

* * * * *